(12) United States Patent
MacKay et al.

(10) Patent No.: US 11,978,300 B2
(45) Date of Patent: May 7, 2024

(54) SINGLE SPACE PARKING METER

(71) Applicant: J.J. MacKay Canada Limited, New Glasgow (CA)

(72) Inventors: George Allan MacKay, New Glasgow (CA); James George MacKay, New Glasgow (CA); Adrian Ignatius O'Neil, New Glasgow (CA); Robert Steven Cosh, Antigonish (CA); Darren Scott Cameron, New Glasgow (CA); Gregory Emile Chauvin, Brookside (CA); David Andrew McMullin, Ottawa (CA); Michael Brown, Ottawa (CA); Matthew Watson, Ottawa (CA)

(73) Assignee: J.J. MacKay Canada Limited, New Glasgow (CA)

( * ) Notice: Subject to any disclaimer, the term of this patent is extended or adjusted under 35 U.S.C. 154(b) by 259 days.

(21) Appl. No.: 15/750,245

(22) PCT Filed: Aug. 8, 2016

(86) PCT No.: PCT/CA2016/050927
§ 371 (c)(1),
(2) Date: Feb. 5, 2018

(87) PCT Pub. No.: WO2017/024396
PCT Pub. Date: Feb. 16, 2017

(65) Prior Publication Data
US 2018/0225908 A1    Aug. 9, 2018

(30) Foreign Application Priority Data

Aug. 11, 2015  (CA) ...................................... 2900177
Oct. 16, 2015  (CA) ...................................... 2908793
Jun. 9, 2016   (CA) ...................................... 2932667

(51) Int. Cl.
*G07F 17/24*     (2006.01)
*G07F 5/00*      (2006.01)
(Continued)

(52) U.S. Cl.
CPC .............. *G07F 17/248* (2013.01); *G07F 5/00* (2013.01); *G07F 7/088* (2013.01); *G07F 7/0893* (2013.01);
(Continued)

(58) Field of Classification Search
CPC .......... G07F 17/248; G07F 9/10; G07F 17/24; G07F 5/00; G07F 7/088; G07F 7/0893;
(Continued)

(56) References Cited

U.S. PATENT DOCUMENTS 480,108 A    8/1892  Loch
1,189,991 A  7/1916  Mugler
(Continued)

FOREIGN PATENT DOCUMENTS

AT    507762 A1    5/2017
AU    4035701      9/2001
(Continued)

OTHER PUBLICATIONS

Duncan Solutions "Single-Space Meters" brochure (2 pages); Rev. 04/06, 2006 Duncan Solutions, Inc.
(Continued)

*Primary Examiner* — Jeffrey A Shapiro
(74) *Attorney, Agent, or Firm* — Neal L. Slifkin; Harris Beach PLLC

(57) ABSTRACT

A single space parking meter assembly for retrofitting onto an existing coin vault assembly includes a number of parking meter components enclosed within a protective outer covering that is rotatably or slidably engageable with the coin vault assembly when a bottom surface of the
(Continued)

protective outer covering is positioned against or adjacent to an upper surface of the coin vault assembly. A locking mechanism secures the protective outer covering to the coin vault assembly when the protective outer covering is engaged with the coin vault assembly.

11 Claims, 34 Drawing Sheets

(51) Int. Cl.
    *G07F 7/08*         (2006.01)
    *G07F 9/02*         (2006.01)
    *G07F 9/10*         (2006.01)
    *H04B 1/02*         (2006.01)
    *H04W 84/12*       (2009.01)
(52) U.S. Cl.
    CPC ............... *G07F 9/023* (2013.01); *G07F 9/10* (2013.01); *G07F 17/24* (2013.01); *H04B 1/02* (2013.01); *H04W 84/12* (2013.01)
(58) Field of Classification Search
    CPC ...... G07F 9/023; G07F 17/242; G07F 17/244; G07F 17/246; G07D 11/12; G07D 11/18; H04W 84/12; H04B 1/02; G07C 1/30; Y10T 403/7005
    USPC .......................... 705/418; 194/206, 207, 900
    See application file for complete search history.

(56) References Cited

U.S. PATENT DOCUMENTS

| | | |
|---|---|---|
| 1,445,771 A | 2/1923 | Keplinger |
| 1,818,568 A | 8/1931 | Melick |
| D98,810 S | 3/1936 | Magee |
| D100,875 S | 8/1936 | Michaels et al. |
| D101,237 S | 9/1936 | Miller |
| D106,561 S | 10/1937 | Broussard et al. |
| D107,577 S | 12/1937 | McGay et al. |
| 2,118,318 A | 5/1938 | Magee |
| D112,677 S | 12/1938 | Broussard et al. |
| 2,161,046 A | 6/1939 | Rockols |
| D116,805 S | 9/1939 | Reznek et al. |
| 2,229,183 A | 1/1941 | Mitchell |
| 2,261,353 A | 11/1941 | Fedele |
| 2,289,838 A | 7/1942 | Herschede et al. |
| D152,294 S | 1/1949 | Siegel et al. |
| D152,587 S | 2/1949 | Brundage |
| D154,716 S | 8/1949 | Simpson |
| 2,483,805 A | 10/1949 | Broussard et al. |
| 2,495,784 A | 1/1950 | Starts |
| D161,888 S | 2/1951 | Wilkin |
| D162,698 S | 3/1951 | Teague |
| 2,546,433 A | 3/1951 | Dick |
| 2,547,272 A | 4/1951 | Lawson |
| 2,550,433 A | 4/1951 | Tichenor |
| 2,570,920 A | 10/1951 | Clough et al. |
| D166,059 S | 2/1952 | Menhall |
| 2,594,388 A | 4/1952 | Broussard |
| 2,595,124 A | 4/1952 | Campbell |
| D166,753 S | 5/1952 | Jones |
| 2,596,122 A | 5/1952 | Broussard |
| 2,596,123 A | 5/1952 | Broussard |
| 2,596,124 A | 5/1952 | Broussard |
| 2,599,881 A | 6/1952 | Woodruff |
| 2,613,792 A | 10/1952 | Broussard et al. |
| 2,613,871 A | 10/1952 | Broussard et al. |
| 2,618,371 A | 11/1952 | Broussard |
| 2,633,960 A | 4/1953 | Broussard |
| D181,359 S | 11/1957 | Jones |
| 2,818,371 A | 12/1957 | Wessinger |
| 2,822,682 A | 2/1958 | Sollenberger |
| 2,832,506 A | 4/1958 | Hatcher |
| D189,106 S | 10/1960 | Liederman |
| 2,956,525 A | 10/1960 | Blauvelt |
| 2,985,978 A | 5/1961 | Breen et al. |
| 2,988,191 A | 6/1961 | Grant |
| 2,995,230 A | 8/1961 | Moody et al. |
| 3,018,615 A | 1/1962 | Minton et al. |
| 3,046,774 A | 7/1962 | Glock |
| 3,056,544 A | 10/1962 | Sollenberger et al. |
| D199,270 S | 9/1964 | Michaels |
| D200,216 S | 2/1965 | Broussard et al. |
| 3,183,411 A | 5/1965 | Palfi |
| 3,199,321 A | 8/1965 | Soilenberger |
| 3,204,438 A | 9/1965 | Sollenberger |
| 3,208,061 A | 9/1965 | Gervasi et al. |
| 3,262,540 A | 7/1966 | Sollenberger et al. |
| 3,272,299 A | 9/1966 | Sollenberger |
| 3,324,647 A | 6/1967 | Jedynak |
| 3,373,856 A | 3/1968 | Kusters et al. |
| 3,438,031 A | 4/1969 | Fathauer |
| 3,486,324 A | 12/1969 | Andersson |
| 3,519,113 A | 7/1970 | Arzig et al. |
| 3,535,870 A | 10/1970 | Mitchell |
| 3,565,283 A | 2/1971 | Sciacero et al. |
| 3,637,277 A | 1/1972 | Krug et al. |
| 3,666,067 A | 5/1972 | Kaiser |
| 3,694,590 A | 9/1972 | Otterlei |
| 3,721,463 A | 3/1973 | Attwood et al. |
| 3,770,090 A | 11/1973 | Fayling et al. |
| D230,511 S | 2/1974 | Stieber |
| 3,858,165 A | 12/1974 | Pegg |
| D234,606 S | 3/1975 | Gamble |
| 3,873,964 A | 3/1975 | Potter |
| 3,875,555 A | 4/1975 | Potter |
| D235,801 S | 7/1975 | Gore |
| 3,941,989 A | 3/1976 | McLaughlin et al. |
| 3,943,339 A | 3/1976 | Koerner et al. |
| 3,964,590 A | 6/1976 | May et al. |
| 3,975,934 A | 8/1976 | Babai et al. |
| 3,982,620 A | 9/1976 | Kortenhaus |
| 3,991,595 A | 11/1976 | Bahry et al. |
| 3,999,372 A | 12/1976 | Welch et al. |
| 4,001,970 A | 1/1977 | Miyamoto |
| 4,007,564 A | 2/1977 | Chisholm |
| 4,025,791 A | 5/1977 | Lennington et al. |
| 4,031,991 A | 6/1977 | Malott |
| 4,037,700 A * | 7/1977 | Heraty ............... G07F 9/06 194/350 |
| 4,043,117 A | 8/1977 | Maresca et al. |
| D246,917 S | 1/1978 | Sauter |
| RE29,577 E | 3/1978 | Hederich et al. |
| 4,147,707 A | 4/1979 | Alewelt et al. |
| 4,237,710 A | 12/1980 | Cardozo |
| 4,248,336 A | 2/1981 | Fiedler |
| 4,249,648 A | 2/1981 | Meyer |
| 4,264,963 A | 4/1981 | Leach |
| 4,306,219 A | 12/1981 | Main et al. |
| 4,310,890 A | 1/1982 | Trehn et al. |
| 4,317,180 A | 2/1982 | Lies |
| 4,317,181 A | 2/1982 | Teza et al. |
| 4,323,847 A | 4/1982 | Karbowski |
| 4,358,749 A | 11/1982 | Clark |
| 4,379,334 A | 4/1983 | Feagins, Jr. et al. |
| 4,409,665 A | 10/1983 | Tubbs |
| D272,291 S | 1/1984 | Hauser et al. |
| 4,432,447 A | 2/1984 | Tanaka |
| 4,460,080 A | 7/1984 | Howard |
| 4,460,965 A | 7/1984 | Trehn et al. |
| 4,472,706 A | 9/1984 | Hodge et al. |
| 4,474,281 A | 10/1984 | Roberts et al. |
| 4,479,191 A | 10/1984 | Nojima et al. |
| 4,483,431 A | 11/1984 | Pratt |
| 4,491,841 A | 1/1985 | Clark |
| D278,689 S | 5/1985 | Jupe |
| 4,574,936 A | 3/1986 | Klinger |
| 4,615,280 A | 10/1986 | Shoop et al. |
| 4,639,021 A | 1/1987 | Hope |
| D288,441 S | 2/1987 | Lalonde |
| D289,914 S | 5/1987 | Willinger et al. |
| 4,678,994 A | 7/1987 | Davies |

(56) References Cited

U.S. PATENT DOCUMENTS

| | | |
|---|---|---|
| 4,680,717 A | 7/1987 | Martin |
| 4,742,903 A | 5/1988 | Trummer |
| 4,749,074 A | 6/1988 | Ueki et al. |
| D296,795 S | 7/1988 | Bouve |
| 4,763,769 A | 8/1988 | Levasseur |
| 4,798,273 A | 1/1989 | Ward, II |
| 4,809,838 A | 3/1989 | Houserman |
| 4,812,805 A | 3/1989 | Lachat et al. |
| 4,823,928 A | 4/1989 | Speas |
| 4,825,425 A | 4/1989 | Turner |
| 4,827,206 A | 5/1989 | Speas |
| 4,845,484 A | 7/1989 | Ellsberg |
| 4,848,556 A | 7/1989 | Shah et al. |
| 4,851,987 A | 7/1989 | Day |
| 4,872,149 A | 10/1989 | Speas |
| 4,875,598 A | 10/1989 | Dahl |
| 4,880,097 A | 11/1989 | Speas |
| 4,880,406 A | 11/1989 | Van Horn et al. |
| 4,895,238 A | 1/1990 | Speas |
| D307,875 S | 5/1990 | Mallory |
| 4,951,799 A | 8/1990 | Kai |
| 4,967,895 A | 11/1990 | Speas |
| 4,967,985 A | 11/1990 | Deakin |
| 4,976,630 A | 12/1990 | Schuder et al. |
| 4,989,714 A | 2/1991 | Abe |
| 5,027,390 A | 6/1991 | Hughes |
| 5,027,935 A | 7/1991 | Berg et al. |
| 5,029,094 A | 7/1991 | Wong |
| D319,077 S | 8/1991 | Arato et al. |
| 5,036,859 A | 8/1991 | Brown |
| 5,060,777 A | 10/1991 | Van Horn et al. |
| 5,065,156 A | 11/1991 | Bernier |
| 5,076,414 A | 12/1991 | Kimoto |
| 5,088,073 A | 2/1992 | Speas |
| 5,109,972 A | 5/1992 | Van Horn et al. |
| 5,119,916 A | 6/1992 | Van Horn et al. |
| 5,153,525 A | 10/1992 | Hoekman et al. |
| 5,155,614 A | 10/1992 | Carmen et al. |
| 5,158,166 A | 10/1992 | Barson et al. |
| D331,996 S | 12/1992 | Fukutake et al. |
| 5,184,707 A | 2/1993 | Van Horn et al. |
| 5,192,855 A | 3/1993 | Insulander et al. |
| 5,201,396 A | 4/1993 | Kaloi et al. |
| D335,460 S | 5/1993 | Tanaka |
| D336,860 S | 6/1993 | Clough |
| 5,222,076 A | 6/1993 | Ng et al. |
| D337,953 S | 8/1993 | Verborn et al. |
| 5,244,070 A | 9/1993 | Carmen et al. |
| D340,038 S | 10/1993 | Venne et al. |
| 5,259,491 A | 11/1993 | Ward, II |
| 5,266,947 A | 11/1993 | Fujiwara et al. |
| D342,209 S | 12/1993 | Clough |
| 5,273,151 A | 12/1993 | Carmen et al. |
| 5,287,384 A | 2/1994 | Avery et al. |
| 5,293,979 A | 3/1994 | Levasseur |
| 5,298,894 A | 3/1994 | Cerny et al. |
| 5,339,594 A | 8/1994 | Ventura-Berti |
| 5,343,237 A | 8/1994 | Morimoto |
| 5,351,187 A | 9/1994 | Hassett |
| D351,193 S | 10/1994 | Abe |
| 5,351,798 A | 10/1994 | Hayes |
| 5,360,095 A | 11/1994 | Speas |
| D354,047 S | 1/1995 | Leggate et al. |
| D354,835 S | 1/1995 | Brendel |
| 5,382,780 A | 1/1995 | Carmen |
| 5,385,225 A | 1/1995 | Chen et al. |
| 5,402,475 A | 3/1995 | Lesner, Jr. et al. |
| 5,407,049 A | 4/1995 | Yost |
| 5,426,363 A | 6/1995 | Akagi et al. |
| D360,734 S | 7/1995 | Hall |
| D360,737 S | 7/1995 | Helbig, Jr. |
| 5,439,089 A | 8/1995 | Parker |
| 5,442,348 A | 8/1995 | Mushell |
| 5,454,461 A | 10/1995 | Yost |
| D364,165 S | 11/1995 | Esslinger |
| 5,471,139 A | 11/1995 | Zadoff |
| 5,475,373 A | 12/1995 | Speas |
| 5,489,014 A | 2/1996 | Menoud |
| 5,500,517 A | 3/1996 | Cagliostro |
| 5,507,378 A | 4/1996 | Leone |
| 5,526,662 A | 6/1996 | Diekhoff et al. |
| 5,563,491 A | 10/1996 | Tseng |
| 5,568,441 A | 10/1996 | Sanemitsu |
| D375,607 S | 11/1996 | Hall |
| 5,570,771 A | 11/1996 | Yost |
| 5,573,099 A | 11/1996 | Church et al. |
| 5,614,892 A | 3/1997 | Ward, II |
| 5,617,942 A | 4/1997 | Ward, II |
| 5,619,932 A | 4/1997 | Efland et al. |
| 5,640,002 A | 6/1997 | Ruppert et al. |
| 5,642,119 A | 6/1997 | Jacobs |
| 5,648,906 A | 7/1997 | Amirpanahi |
| D381,796 S | 8/1997 | Kittle et al. |
| D381,976 S | 8/1997 | Sandor et al. |
| 5,659,306 A | 8/1997 | Bahar |
| 5,687,129 A | 11/1997 | Kim |
| D388,227 S | 12/1997 | Dallman et al. |
| D388,231 S | 12/1997 | Magee et al. |
| 5,710,743 A | 1/1998 | Dee et al. |
| D391,238 S | 2/1998 | Sakata |
| 5,732,812 A | 3/1998 | Grainger et al. |
| D393,212 S | 4/1998 | Lucas et al. |
| 5,737,710 A | 4/1998 | Anthonyson |
| 5,740,050 A | 4/1998 | Ward, II |
| 5,748,103 A | 5/1998 | Flach et al. |
| D395,133 S | 6/1998 | Mikami et al. |
| 5,761,061 A | 6/1998 | Amano |
| 5,777,302 A | 7/1998 | Nakagawa et al. |
| 5,777,951 A | 7/1998 | Mitschele et al. |
| 5,777,957 A | 7/1998 | Lyman |
| 5,778,067 A | 7/1998 | Jones et al. |
| D396,655 S | 8/1998 | Anderson |
| 5,792,298 A | 8/1998 | Sauer et al. |
| 5,803,228 A * | 9/1998 | Lucas ................ G07F 17/248 |
| | | 194/350 |
| 5,805,083 A | 9/1998 | Sutton et al. |
| 5,806,651 A | 9/1998 | Carmen et al. |
| D400,115 S | 10/1998 | Yaron |
| D400,684 S | 11/1998 | Dallman |
| 5,833,042 A | 11/1998 | Baitch et al. |
| 5,841,369 A | 11/1998 | Sutton et al. |
| 5,842,411 A | 12/1998 | Johnson |
| 5,845,268 A | 12/1998 | Moore |
| 5,852,411 A | 12/1998 | Jacobs et al. |
| D404,025 S | 1/1999 | VanHorne et al. |
| 5,903,520 A | 5/1999 | Dee et al. |
| 5,906,260 A | 5/1999 | Goodrich |
| 5,911,763 A | 6/1999 | Quesada |
| D411,848 S | 7/1999 | Maruska et al. |
| D412,233 S | 7/1999 | Cajacob et al. |
| D412,289 S | 7/1999 | Winwood |
| D413,311 S | 8/1999 | Blalock |
| 5,936,527 A | 8/1999 | Isaacman et al. |
| 5,936,551 A | 8/1999 | Allen et al. |
| 5,940,481 A | 8/1999 | Zeitman |
| 5,946,774 A | 9/1999 | Ramsey et al. |
| 5,954,182 A | 9/1999 | Wei |
| 5,966,345 A | 10/1999 | Dee et al. |
| D419,277 S | 1/2000 | Ishii et al. |
| 6,018,327 A | 1/2000 | Nakano et al. |
| 6,026,946 A | 2/2000 | McCarty, Jr. |
| D421,399 S | 3/2000 | Bennett et al. |
| 6,037,880 A | 3/2000 | Manion |
| D423,181 S | 4/2000 | Dallman |
| D423,755 S | 4/2000 | Ha |
| 6,052,453 A | 4/2000 | Sagady et al. |
| D427,413 S | 6/2000 | Wallace et al. |
| 6,078,272 A | 6/2000 | Jacobs et al. |
| 6,081,205 A | 6/2000 | Williams |
| 6,081,206 A | 6/2000 | Kielland |
| 6,082,153 A | 7/2000 | Schoell et al. |
| D430,045 S | 8/2000 | Omuro et al. |
| 6,098,361 A * | 8/2000 | Roten ................ E04H 12/2269 |
| | | 403/277 |

(56) References Cited

U.S. PATENT DOCUMENTS

| | | | |
|---|---|---|---|
| 6,107,942 A | 8/2000 | Yoo et al. | |
| 6,109,418 A * | 8/2000 | Yost | G07F 17/24 |
| | | | 194/350 |
| 6,111,522 A | 8/2000 | Hiltz et al. | |
| D430,810 S | 9/2000 | Omuro et al. | |
| 6,116,403 A | 9/2000 | Kiehl | |
| 6,121,880 A | 9/2000 | Scott et al. | |
| D431,788 S | 10/2000 | Tuxen et al. | |
| D432,286 S | 10/2000 | Irie | |
| 6,132,152 A | 10/2000 | Kaibach et al. | |
| 6,147,624 A | 11/2000 | Clapper | |
| 6,188,328 B1 | 2/2001 | Ho | |
| 6,193,045 B1 | 2/2001 | Ishida et al. | |
| 6,195,015 B1 | 2/2001 | Jacobs et al. | |
| D439,591 S | 3/2001 | Reidt et al. | |
| RE37,193 E | 5/2001 | Ward, II | |
| 6,227,343 B1 | 5/2001 | Neathway et al. | |
| 6,229,455 B1 | 5/2001 | Yost | |
| 6,230,868 B1 | 5/2001 | Tuxen et al. | |
| 6,236,716 B1 | 5/2001 | Marcus et al. | |
| 6,243,028 B1 | 6/2001 | Krygler et al. | |
| 6,243,029 B1 | 6/2001 | Tomer | |
| 6,275,169 B1 | 8/2001 | Krygler et al. | |
| 6,275,170 B1 * | 8/2001 | Jacobs | G07F 17/246 |
| | | | 340/693.12 |
| D447,519 S | 9/2001 | Pinchuk et al. | |
| D447,714 S | 9/2001 | Cappiello | |
| D448,910 S | 10/2001 | Kit et al. | |
| D449,010 S | 10/2001 | Petrucelli | |
| 6,307,152 B1 * | 10/2001 | Bonilla | H02G 3/0493 |
| | | | 174/483 |
| 6,309,098 B1 | 10/2001 | Wong | |
| D450,253 S | 11/2001 | Marguet | |
| 6,312,152 B2 | 11/2001 | Dee et al. | |
| 6,321,201 B1 | 11/2001 | Dahl | |
| RE37,531 E | 1/2002 | Chaco et al. | |
| 6,340,935 B1 | 1/2002 | Hall | |
| 6,344,806 B1 | 2/2002 | Katz | |
| D454,421 S | 3/2002 | Jeon et al. | |
| D454,807 S | 3/2002 | Cappiello | |
| 6,354,425 B1 | 3/2002 | Tuxen et al. | |
| D456,587 S | 4/2002 | Kit et al. | |
| 6,366,220 B1 | 4/2002 | Elliott | |
| 6,373,401 B2 | 4/2002 | Ho | |
| 6,373,422 B1 | 4/2002 | Mostafa | |
| 6,373,442 B1 | 4/2002 | Thomas et al. | |
| 6,380,851 B1 | 4/2002 | Gilbert et al. | |
| D460,005 S | 7/2002 | Jacquet | |
| D461,728 S | 8/2002 | Tuxen et al. | |
| 6,456,491 B1 | 9/2002 | Flannery et al. | |
| D463,749 S | 10/2002 | Petrucelli | |
| 6,457,586 B2 | 10/2002 | Yasuda et al. | |
| 6,467,602 B2 | 10/2002 | Bench et al. | |
| 6,477,505 B2 * | 11/2002 | Ward, II | G06Q 30/0283 |
| | | | 70/277 |
| 6,477,785 B1 | 11/2002 | Hsu | |
| 6,477,875 B2 | 11/2002 | Field et al. | |
| D467,954 S | 12/2002 | Suzuki et al. | |
| 6,493,676 B1 | 12/2002 | Levy | |
| 6,505,774 B1 | 1/2003 | Fulcher et al. | |
| D471,238 S | 3/2003 | Showers et al. | |
| D472,362 S | 3/2003 | Zerman et al. | |
| 6,539,370 B1 | 3/2003 | Chang et al. | |
| 6,559,776 B2 | 5/2003 | Kalz | |
| 6,575,281 B2 | 6/2003 | Lee | |
| D477,030 S | 7/2003 | Kolls et al. | |
| D481,516 S | 10/2003 | Magee et al. | |
| D485,417 S | 1/2004 | Magee et al. | |
| 6,697,730 B2 | 2/2004 | Dickerson | |
| D488,280 S | 4/2004 | Zerman et al. | |
| 6,731,942 B1 | 5/2004 | Nageli | |
| D490,727 S | 6/2004 | Kido et al. | |
| D492,080 S | 6/2004 | Magee et al. | |
| D492,081 S | 6/2004 | Magee et al. | |
| D492,085 S | 6/2004 | Korte et al. | |
| 6,747,575 B2 | 6/2004 | Chauvin et al. | |
| 6,763,094 B2 | 7/2004 | Conn et al. | |
| D494,730 S | 8/2004 | Magee et al. | |
| 6,791,473 B2 | 9/2004 | Kibria et al. | |
| RE38,626 E | 10/2004 | Kielland | |
| D497,393 S | 10/2004 | Herbst | |
| 6,799,387 B2 | 10/2004 | Pippins | |
| D497,814 S | 11/2004 | Odinotski et al. | |
| D498,795 S | 11/2004 | Nunn | |
| 6,812,857 B1 | 11/2004 | Kassab et al. | |
| 6,823,317 B1 | 11/2004 | Ouimet et al. | |
| 6,856,922 B1 | 2/2005 | Austin et al. | |
| 6,874,340 B1 * | 4/2005 | Berman | E05B 9/084 |
| | | | 70/160 |
| 6,885,311 B2 | 4/2005 | Howard et al. | |
| D505,240 S | 5/2005 | Swaine et al. | |
| 6,889,899 B2 | 5/2005 | Silberberg | |
| D506,509 S | 6/2005 | Nunn | |
| D506,769 S | 6/2005 | Asai | |
| 6,914,411 B2 | 7/2005 | Couch et al. | |
| D508,064 S | 8/2005 | Ramirez | |
| 6,929,179 B2 | 8/2005 | Fulcher et al. | |
| 6,946,974 B1 | 9/2005 | Racunas Jr. | |
| D510,751 S | 10/2005 | Magee et al. | |
| 7,004,385 B1 | 2/2006 | Douglass | |
| 7,014,355 B2 | 3/2006 | Potter, Sr. et al. | |
| 7,019,420 B2 | 3/2006 | Kogan et al. | |
| 7,019,670 B2 | 3/2006 | Bahar | |
| 7,023,360 B2 | 4/2006 | Staniszewski | |
| 7,027,773 B1 | 4/2006 | McMillin | |
| 7,027,808 B2 | 4/2006 | Wesby | |
| 7,028,888 B2 | 4/2006 | Laskowski | |
| 7,029,167 B1 | 4/2006 | Mitschele | |
| D520,883 S | 5/2006 | Hillard et al. | |
| 7,040,534 B2 | 5/2006 | Turocy et al. | |
| 7,046,123 B1 | 5/2006 | Goldberg | |
| D524,834 S | 7/2006 | Dozier et al. | |
| 7,071,839 B2 | 7/2006 | Patel et al. | |
| 7,104,447 B1 | 9/2006 | Lopez et al. | |
| 7,110,762 B1 | 9/2006 | Cameron et al. | |
| 7,114,651 B2 | 10/2006 | Hjelmvik | |
| D535,268 S | 1/2007 | Holger | |
| 7,181,426 B2 | 2/2007 | Dutta | |
| 7,183,999 B2 | 2/2007 | Matthews et al. | |
| D538,505 S | 3/2007 | Kang et al. | |
| 7,188,070 B2 | 3/2007 | Dar et al. | |
| D543,588 S | 5/2007 | Herbert et al. | |
| 7,222,031 B2 | 5/2007 | Heatley | |
| 7,222,782 B2 | 5/2007 | Lute, Jr. et al. | |
| 7,230,545 B2 | 6/2007 | Nath et al. | |
| 7,237,176 B2 | 6/2007 | Briggs et al. | |
| D546,365 S | 7/2007 | Jost et al. | |
| 7,237,716 B2 | 7/2007 | Silberberg | |
| 7,253,747 B2 | 8/2007 | Noguchi | |
| 7,262,737 B2 | 8/2007 | Zarnowitz et al. | |
| 7,284,692 B1 | 10/2007 | Douglass | |
| D559,792 S | 1/2008 | Gemme et al. | |
| 7,319,974 B1 | 1/2008 | Brusseaux | |
| 7,321,317 B2 | 1/2008 | Nath et al. | |
| 7,330,131 B2 | 2/2008 | Zanotti et al. | |
| 7,347,368 B1 | 3/2008 | Gravelle et al. | |
| D570,920 S | 6/2008 | Choi | |
| 7,382,238 B2 | 6/2008 | Kavaler | |
| 7,382,281 B2 | 6/2008 | Kavaler | |
| 7,382,282 B2 | 6/2008 | MacKay et al. | |
| 7,385,484 B2 | 6/2008 | Nath et al. | |
| 7,388,349 B2 | 6/2008 | Elder et al. | |
| 7,388,517 B2 | 6/2008 | Kavaler | |
| 7,391,339 B2 | 6/2008 | Howard et al. | |
| 7,393,134 B2 | 7/2008 | Mitschele | |
| D575,168 S | 8/2008 | King et al. | |
| 7,419,091 B1 | 9/2008 | Scanlon | |
| 7,427,931 B1 | 9/2008 | Kavaler et al. | |
| D579,795 S | 11/2008 | Martinez | |
| 7,445,144 B2 | 11/2008 | Schlabach et al. | |
| D582,125 S | 12/2008 | Kang et al. | |
| D587,141 S | 2/2009 | King et al. | |
| D588,916 S | 3/2009 | DeMarco | |
| D591,181 S | 4/2009 | Kanbar | |

(56) References Cited

U.S. PATENT DOCUMENTS

| | | |
|---|---|---|
| 7,533,802 B1 | 5/2009 | McGinley et al. |
| 7,533,809 B1 | 5/2009 | Robinson et al. |
| 7,554,460 B2 | 6/2009 | Verkleeren et al. |
| D596,374 S | 7/2009 | Kang et al. |
| 7,558,564 B2 | 7/2009 | Wesby |
| 7,579,964 B2 | 8/2009 | Nath et al. |
| D600,152 S | 9/2009 | Stack et al. |
| 7,594,235 B2 | 9/2009 | Moreau |
| D602,225 S | 10/2009 | Lute et al. |
| D604,189 S | 11/2009 | Leer et al. |
| 7,617,120 B2 | 11/2009 | Derasmo et al. |
| D605,145 S | 12/2009 | Kellar |
| 7,624,919 B2 | 12/2009 | Meek et al. |
| 7,632,419 B1 | 12/2009 | Grimbergen et al. |
| 7,671,803 B2 | 3/2010 | Neill et al. |
| 7,679,526 B2 | 3/2010 | Mardirossian |
| 7,699,224 B2 | 4/2010 | Mole |
| D615,274 S | 5/2010 | Kim et al. |
| D617,799 S | 6/2010 | Odhe et al. |
| 7,739,000 B2 | 6/2010 | Kevaler |
| D620,050 S | 7/2010 | Hultzman et al. |
| 7,748,620 B2 | 7/2010 | Gomez et al. |
| 7,772,720 B2 | 8/2010 | McGee et al. |
| 7,780,072 B1 | 8/2010 | Lute et al. |
| 7,783,530 B2 | 8/2010 | Slemmer et al. |
| D624,274 S | 9/2010 | Pendleton |
| D625,305 S | 10/2010 | Bleck et al. |
| 7,806,248 B2 | 10/2010 | Hunter et al. |
| D627,814 S | 11/2010 | Tzeng et al. |
| 7,825,826 B2 | 11/2010 | Welch |
| 7,854,310 B2 | 12/2010 | King et al. |
| 7,855,661 B2 | 12/2010 | Ponert |
| 7,874,482 B2 | 1/2011 | Mitschele |
| D632,740 S | 2/2011 | Adeline |
| D634,417 S | 3/2011 | Abbondanzio |
| D635,035 S | 3/2011 | Matsumoto |
| 7,899,583 B2 | 3/2011 | Mendelson |
| 7,908,149 B2 | 3/2011 | Dar et al. |
| 7,933,841 B2 | 4/2011 | Schmeyer |
| 7,945,670 B2 | 5/2011 | Nakamura |
| D645,223 S | 9/2011 | Bleck et al. |
| 8,035,533 B2 | 10/2011 | Kavaler |
| 8,044,139 B2 | 10/2011 | Youn et al. |
| D651,784 S | 1/2012 | Rohan et al. |
| D652,329 S | 1/2012 | MacKay et al. |
| D652,601 S | 1/2012 | Rohan et al. |
| D652,602 S | 1/2012 | Rohan et al. |
| D652,872 S | 1/2012 | Mougin et al. |
| D653,012 S | 1/2012 | Rohan et al. |
| D653,014 S | 1/2012 | Rohan et al. |
| D653,420 S | 1/2012 | Rohan et al. |
| D653,421 S | 1/2012 | Rohan et al. |
| D653,422 S | 1/2012 | Rohan et al. |
| D653,423 S | 1/2012 | Rohan et al. |
| D653,424 S | 1/2012 | Rohan et al. |
| D654,816 S | 2/2012 | MacKay et al. |
| RE43,245 E | 3/2012 | Leoutsarakos |
| D655,263 S | 3/2012 | Tsai |
| D656,046 S | 3/2012 | MacKay et al. |
| 8,138,950 B1 | 3/2012 | Leung |
| 8,144,034 B2 | 3/2012 | Kavaler |
| D659,557 S | 5/2012 | Jones et al. |
| 8,184,019 B2 | 5/2012 | Chauvin et al. |
| D661,603 S | 6/2012 | MacKay et al. |
| D661,608 S | 6/2012 | Kimmich |
| 8,193,540 B2 | 6/2012 | Huang et al. |
| 8,207,394 B2 | 6/2012 | Feldkamp et al. |
| 8,232,894 B2 | 7/2012 | Weiss et al. |
| 8,250,887 B2 | 8/2012 | MacKay et al. |
| 8,264,401 B1 | 9/2012 | Kavaler |
| 8,279,107 B2 | 10/2012 | Krstanovic et al. |
| D672,525 S | 12/2012 | Lee et al. |
| 8,325,057 B2 | 12/2012 | Salter |
| D674,985 S | 1/2013 | Lee |
| D677,035 S | 2/2013 | Lee et al. |
| D677,714 S | 3/2013 | Helgesson et al. |
| 8,395,532 B2 | 3/2013 | Chauvin et al. |
| 8,402,281 B2 | 3/2013 | Dahl |
| 8,402,380 B2 | 3/2013 | Kikin-Gil et al. |
| D680,156 S | 4/2013 | Hernandez et al. |
| 8,417,715 B1 | 4/2013 | Bruckhaus et al. |
| D681,717 S | 5/2013 | Helgesson et al. |
| 8,450,627 B2 | 5/2013 | Mittleman et al. |
| D683,779 S | 6/2013 | Uemachi et al. |
| D683,794 S | 6/2013 | Randall |
| D683,795 S | 6/2013 | Randall |
| D684,745 S | 6/2013 | Reuter et al. |
| D684,870 S | 6/2013 | Jones et al. |
| 8,479,909 B2 | 7/2013 | King et al. |
| 8,487,754 B2 | 7/2013 | Mitschele |
| D687,809 S | 8/2013 | Bergmann et al. |
| 8,513,832 B2 | 8/2013 | King et al. |
| D689,554 S | 9/2013 | Echanove Hernandez |
| D690,771 S | 10/2013 | Randall |
| D691,165 S | 10/2013 | Attoma |
| 8,566,159 B2 | 10/2013 | King et al. |
| 8,568,055 B2 * | 10/2013 | Marques Lito Velez Grilo .......... E04H 12/2284 403/98 |
| D692,784 S | 11/2013 | Anderssen et al. |
| D693,983 S | 11/2013 | Budde et al. |
| 8,589,216 B2 | 11/2013 | Yu et al. |
| 8,590,687 B2 | 11/2013 | King et al. |
| 8,595,054 B2 | 11/2013 | King et al. |
| D696,484 S | 12/2013 | Budde et al. |
| D696,485 S | 12/2013 | Lee et al. |
| 8,621,245 B2 | 12/2013 | Shearer et al. |
| 8,631,921 B2 | 1/2014 | Jones et al. |
| 8,662,279 B2 | 3/2014 | Jones et al. |
| 8,666,801 B2 | 3/2014 | Cho |
| D702,913 S | 4/2014 | Budde et al. |
| D702,914 S | 4/2014 | Budde et al. |
| 8,684,158 B2 | 4/2014 | Jones et al. |
| 8,710,798 B2 | 4/2014 | Turner |
| D705,090 S | 5/2014 | MacKay et al. |
| 8,727,207 B1 | 5/2014 | Church et al. |
| D707,140 S | 6/2014 | King et al. |
| D707,141 S | 6/2014 | King et al. |
| D707,142 S | 6/2014 | King et al. |
| D707,574 S | 6/2014 | Ku et al. |
| 8,749,403 B2 | 6/2014 | King et al. |
| 8,770,371 B2 | 7/2014 | Mackay et al. |
| 8,770,372 B2 | 7/2014 | Dobbins et al. |
| 8,807,317 B2 | 8/2014 | MacKay et al. |
| D714,165 S | 9/2014 | Salama |
| D715,661 S | 10/2014 | McKaughan et al. |
| D716,156 S | 10/2014 | Jones et al. |
| D716,157 S | 10/2014 | MacKay et al. |
| D716,515 S | 10/2014 | Cha et al. |
| 8,862,494 B2 | 10/2014 | King et al. |
| 8,866,624 B2 | 10/2014 | Ales, III et al. |
| D716,671 S | 11/2014 | Jones et al. |
| 8,884,785 B2 | 11/2014 | Groft et al. |
| 8,936,505 B2 | 1/2015 | Bengtsson |
| D722,740 S | 2/2015 | Budde et al. |
| 8,957,787 B1 | 2/2015 | Al-Hmalan et al. |
| D724,290 S | 3/2015 | Cha et al. |
| D724,811 S | 3/2015 | Reitinger |
| D724,812 S | 3/2015 | Cha et al. |
| D725,504 S | 3/2015 | McEneany et al. |
| D728,190 S | 4/2015 | Sheley |
| 9,002,723 B2 | 4/2015 | King et al. |
| 9,047,712 B2 | 6/2015 | King et al. |
| 9,064,358 B2 | 6/2015 | Lidror |
| D733,585 S | 7/2015 | Jones et al. |
| D735,437 S | 7/2015 | Randall |
| D735,438 S | 7/2015 | Randall |
| D735,439 S | 7/2015 | Randall |
| D735,440 S | 7/2015 | Randall |
| D735,963 S | 8/2015 | Randall |
| D735,964 S | 8/2015 | Randall |
| D735,965 S | 8/2015 | Randall |
| D739,637 S | 9/2015 | Randall |
| D739,638 S | 9/2015 | Randall |

(56) References Cited

U.S. PATENT DOCUMENTS

| | | | |
|---|---|---|---|
| D739,639 S | 9/2015 | Randall |
| 9,123,184 B2 | 9/2015 | Jones et al. |
| 9,127,964 B2 | 9/2015 | Schwarz et al. |
| 9,147,345 B2 | 9/2015 | Agrait |
| D742,090 S | 10/2015 | Randall |
| 9,159,080 B2 | 10/2015 | Fiorucci et al. |
| 9,169,626 B2 | 10/2015 | Guler et al. |
| D742,371 S | 11/2015 | Bopp et al. |
| 9,196,097 B2 | 11/2015 | Jones et al. |
| 9,196,161 B2 | 11/2015 | Lai et al. |
| D746,015 S | 12/2015 | King et al. |
| D746,704 S | 1/2016 | Jones et al. |
| D748,364 S | 1/2016 | King et al. |
| D748,888 S | 2/2016 | King et al. |
| D749,000 S | 2/2016 | King et al. |
| 9,262,915 B2 | 2/2016 | Clem et al. |
| 9,269,216 B2 | 2/2016 | Keilwert |
| D750,513 S | 3/2016 | King et al. |
| D750,978 S | 3/2016 | van Slooten et al. |
| D752,552 S | 3/2016 | D'Ascanio et al. |
| D755,649 S | 5/2016 | King et al. |
| D755,650 S | 5/2016 | King et al. |
| D756,807 S | 5/2016 | King et al. |
| D756,808 S | 5/2016 | King et al. |
| D762,040 S | 7/2016 | King et al. |
| 9,384,554 B2 | 7/2016 | Xu et al. |
| 9,391,474 B2 | 7/2016 | Hunter et al. |
| 9,406,056 B2 | 8/2016 | MacKay et al. |
| 9,407,608 B2 | 8/2016 | Mullick et al. |
| 9,424,691 B2 | 8/2016 | King et al. |
| 9,443,236 B2 | 9/2016 | MacKay et al. |
| 9,489,776 B2 | 11/2016 | Keller et al. |
| 9,494,922 B2 | 11/2016 | MacKay |
| 9,508,198 B1 | 11/2016 | King et al. |
| 9,508,260 B2 | 11/2016 | Shaik |
| 9,519,761 B2 | 12/2016 | Jakobsson |
| 9,524,498 B2 | 12/2016 | Jones et al. |
| 9,536,235 B2 | 1/2017 | Jones et al. |
| 9,536,370 B2 | 1/2017 | Jones et al. |
| D779,771 S | 2/2017 | King et al. |
| D779,772 S | 2/2017 | King et al. |
| D779,773 S | 2/2017 | King et al. |
| 9,580,198 B2 | 2/2017 | Ehrmann et al. |
| D781,024 S | 3/2017 | King et al. |
| D782,349 S | 3/2017 | Konotopskyi et al. |
| 9,601,018 B2 | 3/2017 | Cogill et al. |
| 9,652,921 B2 | 5/2017 | MacKay et al. |
| 9,661,403 B2 | 5/2017 | King et al. |
| 9,685,027 B2 | 6/2017 | King et al. |
| 9,692,256 B2 | 6/2017 | Hunter et al. |
| D791,621 S | 7/2017 | Loye et al. |
| D792,049 S | 7/2017 | Oh et al. |
| 9,697,506 B2 | 7/2017 | Jones et al. |
| 9,707,911 B1 | 7/2017 | Myers et al. |
| D795,523 S | 8/2017 | King et al. |
| 9,728,085 B2 | 8/2017 | Schwarz et al. |
| 9,749,823 B2 | 8/2017 | Rowe et al. |
| D796,355 S | 9/2017 | Cho et al. |
| 9,773,351 B2 | 9/2017 | Hudson et al. |
| D799,992 S | 10/2017 | Ehara |
| D801,304 S | 10/2017 | Kiafoulis et al. |
| D801,405 S | 10/2017 | Shih et al. |
| 9,779,565 B2 | 10/2017 | Rabbat |
| 9,805,518 B2 | 10/2017 | King et al. |
| D802,874 S | 11/2017 | King et al. |
| D802,875 S | 11/2017 | King et al. |
| D802,876 S | 11/2017 | King et al. |
| D802,877 S | 11/2017 | King et al. |
| D802,878 S | 11/2017 | King et al. |
| 9,842,346 B2 | 12/2017 | Fiorucci et al. |
| 9,842,455 B2 | 12/2017 | MacKay et al. |
| D813,059 S | 3/2018 | MacKay et al. |
| D813,838 S | 3/2018 | Pietschmann et al. |
| 9,934,645 B2 | 4/2018 | MacKay et al. |
| 10,069,233 B2 | 9/2018 | Goto |
| D832,553 S | 10/2018 | Angelopoulos et al. |
| 10,089,814 B2 | 10/2018 | King et al. |
| D832,809 S | 11/2018 | Hardi |
| D834,971 S | 12/2018 | Ahn et al. |
| 10,154,029 B1 | 12/2018 | Griffin |
| 10,192,388 B2 | 1/2019 | MacKay et al. |
| D843,973 S | 3/2019 | Klosowski et al. |
| 10,275,650 B2 | 4/2019 | Laaksonen |
| D851,605 S | 6/2019 | Maetani et al. |
| 10,315,665 B2 | 6/2019 | Halder |
| D854,430 S | 7/2019 | Elrod et al. |
| 10,366,546 B2 | 7/2019 | King et al. |
| D858,381 S | 9/2019 | Ahn et al. |
| 10,424,147 B2 | 9/2019 | MacKay et al. |
| D863,074 S | 10/2019 | MacKay et al. |
| D863,075 S | 10/2019 | MacKay et al. |
| D863,076 S | 10/2019 | MacKay et al. |
| D863,987 S | 10/2019 | MacKay et al. |
| D863,988 S | 10/2019 | MacKay et al. |
| 10,464,530 B2 | 11/2019 | Falkson et al. |
| 10,503,990 B2 | 12/2019 | Gleeson-May et al. |
| D872,600 S | 1/2020 | King et al. |
| D879,404 S | 3/2020 | Morishito et al. |
| D882,426 S | 4/2020 | Gross et al. |
| D883,605 S | 5/2020 | Lee et al. |
| D886,649 S | 6/2020 | Lan et al. |
| 10,674,236 B2 | 6/2020 | King et al. |
| 10,691,904 B1 | 6/2020 | Randall et al. |
| 10,741,064 B2 | 8/2020 | Schwarz et al. |
| D901,825 S | 11/2020 | Nelson et al. |
| 10,861,278 B2 | 12/2020 | MacKay et al. |
| 10,861,334 B2 | 12/2020 | Torres |
| D911,857 S | 3/2021 | King et al. |
| RE48,566 E | 5/2021 | Mackay et al. |
| 10,998,612 B2 | 5/2021 | MacKay et al. |
| 11,074,612 B2 | 7/2021 | King et al. |
| D927,998 S | 8/2021 | Ahn et al. |
| D928,639 S | 8/2021 | Ahn et al. |
| 11,100,824 B2 | 8/2021 | King et al. |
| D930,493 S | 9/2021 | Katzenelson |
| 11,132,723 B2 | 9/2021 | King et al. |
| 11,172,274 B2 | 11/2021 | King et al. |
| D938,668 S | 12/2021 | Jia |
| D954,571 S | 6/2022 | Ahn et al. |
| D955,230 S | 6/2022 | King et al. |
| D955,231 S | 6/2022 | King et al. |
| 11,386,420 B2 | 7/2022 | Nolan et al. |
| D959,298 S | 8/2022 | Jones et al. |
| D959,299 S | 8/2022 | Jones et al. |
| D959,997 S | 8/2022 | Jones et al. |
| D960,400 S | 8/2022 | Ding |
| D962,239 S | 8/2022 | Arenas de Jesus et al. |
| 11,423,776 B2 | 8/2022 | Schwarz et al. |
| 11,430,027 B2 | 8/2022 | King et al. |
| 11,436,649 B2 | 9/2022 | King et al. |
| 11,462,109 B2 | 10/2022 | King et al. |
| 11,475,491 B2 | 10/2022 | King et al. |
| D971,033 S | 11/2022 | King et al. |
| D971,034 S | 11/2022 | King et al. |
| D971,035 S | 11/2022 | King et al. |
| D986,082 S | 5/2023 | Jones et al. |
| D986,084 S | 5/2023 | Jones et al. |
| D987,444 S | 5/2023 | King et al. |
| 11,683,617 B2 | 6/2023 | King et al. |
| 11,688,277 B2 | 6/2023 | Schwarz et al. |
| 2001/0012241 A1 | 8/2001 | Dee et al. |
| 2001/0027626 A1 | 10/2001 | Natelli, Jr. |
| 2001/0037928 A1* | 11/2001 | Bench .......... G07F 17/248 194/217 |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0030606 A1 | 3/2002 | Chauvin et al. |
| 2002/0062172 A1* | 5/2002 | Bench .......... G07F 17/248 700/232 |
| 2002/0063035 A1 | 5/2002 | Blad et al. |
| 2002/0074344 A1 | 6/2002 | Long et al. |
| 2002/0080013 A1 | 6/2002 | Anderson, III et al. |
| 2002/0100810 A1 | 8/2002 | Amadeo |

(56) References Cited

U.S. PATENT DOCUMENTS

| | | |
|---|---|---|
| 2002/0109609 A1 | 8/2002 | Potter, Sr. et al. |
| 2002/0109610 A1 | 8/2002 | Katz |
| 2002/0109611 A1 | 8/2002 | Howard |
| 2002/0111768 A1 | 8/2002 | Ghorayeb et al. |
| 2002/0134645 A1 | 9/2002 | Alexander et al. |
| 2003/0010821 A1 | 1/2003 | Silberberg |
| 2003/0017904 A1 | 1/2003 | Lee |
| 2003/0058084 A1 | 3/2003 | O'Hara |
| 2003/0092387 A1 | 5/2003 | Hjelmvik |
| 2003/0112151 A1 | 6/2003 | Chauvin et al. |
| 2003/0112597 A1 | 6/2003 | Smith |
| 2003/0117904 A1* | 6/2003 | Lank .................. G07F 17/24 368/90 |
| 2003/0121754 A1 | 7/2003 | King |
| 2003/0128010 A1 | 7/2003 | Hsu |
| 2003/0128136 A1 | 7/2003 | Spier et al. |
| 2003/0132292 A1 | 7/2003 | Gomez et al. |
| 2003/0132840 A1 | 7/2003 | Bahar |
| 2003/0135407 A1 | 7/2003 | Reinhardt et al. |
| 2003/0140531 A1 | 7/2003 | Pippins |
| 2003/0144905 A1 | 7/2003 | Smith |
| 2003/0144972 A1 | 7/2003 | Cordery et al. |
| 2003/0169183 A1 | 9/2003 | Korepanov et al. |
| 2003/0179107 A1 | 9/2003 | Kibria et al. |
| 2003/0220835 A1 | 11/2003 | Barnes, Jr. |
| 2003/0222792 A1 | 12/2003 | Berman et al. |
| 2003/0229793 A1* | 12/2003 | McCall .................. G07F 19/205 713/186 |
| 2003/0234888 A1 | 12/2003 | Hong et al. |
| 2004/0011099 A1 | 1/2004 | Andersson |
| 2004/0016796 A1 | 1/2004 | Hanna et al. |
| 2004/0039632 A1 | 2/2004 | Han et al. |
| 2004/0040028 A1 | 2/2004 | Moreau |
| 2004/0059693 A1 | 3/2004 | Hausen et al. |
| 2004/0068434 A1 | 4/2004 | Kanekon |
| 2004/0084278 A1 | 5/2004 | Harris et al. |
| 2004/0094619 A1 | 5/2004 | Silberberg |
| 2004/0160905 A1 | 8/2004 | Bernier et al. |
| 2004/0160906 A1 | 8/2004 | Greszczuk et al. |
| 2004/0181496 A1 | 9/2004 | Odinotski et al. |
| 2004/0207530 A1 | 10/2004 | Nielsen |
| 2004/0232878 A1 | 11/2004 | Couch et al. |
| 2004/0243526 A1 | 12/2004 | Krygler et al. |
| 2004/0254840 A1 | 12/2004 | Slemmer et al. |
| 2004/0254900 A1 | 12/2004 | Reinhard |
| 2004/0262379 A1 | 12/2004 | Gomes |
| 2004/0263117 A1 | 12/2004 | Kogan |
| 2004/0264302 A1 | 12/2004 | Ward, II |
| 2005/0029340 A1 | 2/2005 | Ferraro |
| 2005/0035740 A1 | 2/2005 | Elder et al. |
| 2005/0040951 A1 | 2/2005 | Zalewski et al. |
| 2005/0068201 A1 | 3/2005 | Wulff et al. |
| 2005/0099320 A1 | 5/2005 | Nath et al. |
| 2005/0102075 A1 | 5/2005 | Dar et al. |
| 2005/0155839 A1 | 7/2005 | Banks et al. |
| 2005/0168352 A1 | 8/2005 | Tomer |
| 2005/0178639 A1* | 8/2005 | Brumfield .................. G07F 9/04 194/350 |
| 2005/0192911 A1 | 9/2005 | Mattern |
| 2005/0216354 A1 | 9/2005 | Bam et al. |
| 2005/0226201 A1 | 10/2005 | McMillin |
| 2006/0020487 A1 | 1/2006 | Spittel et al. |
| 2006/0021848 A1 | 2/2006 | Smith |
| 2006/0028919 A1 | 2/2006 | Mitschele |
| 2006/0052055 A1 | 3/2006 | Rowse et al. |
| 2006/0072286 A1 | 4/2006 | Tseng |
| 2006/0114159 A1 | 6/2006 | Yoshikawa et al. |
| 2006/0116972 A1 | 6/2006 | Wong |
| 2006/0136131 A1 | 6/2006 | Dugan et al. |
| 2006/0149684 A1 | 7/2006 | Matsuura et al. |
| 2006/0152349 A1 | 7/2006 | Ratnakar |
| 2006/0152385 A1 | 7/2006 | Mandy |
| 2006/0173733 A1 | 8/2006 | Fancher |
| 2006/0227010 A1 | 10/2006 | Berstis et al. |
| 2006/0255119 A1 | 11/2006 | Marchasin et al. |
| 2006/0259354 A1 | 11/2006 | Yan |
| 2006/0267799 A1 | 11/2006 | Mendelson |
| 2007/0011700 A1 | 1/2007 | Johnson |
| 2007/0016539 A1 | 1/2007 | Groft et al. |
| 2007/0017265 A1 | 1/2007 | Andersson |
| 2007/0029825 A1 | 2/2007 | Franklin et al. |
| 2007/0040449 A1 | 2/2007 | Spurlin et al. |
| 2007/0044523 A1 | 3/2007 | Davis |
| 2007/0046651 A1 | 3/2007 | Sinclair |
| 2007/0061155 A1 | 3/2007 | Ji et al. |
| 2007/0074702 A1 | 4/2007 | Nakamura et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0129974 A1 | 6/2007 | Chen et al. |
| 2007/0136128 A1 | 6/2007 | Janacek et al. |
| 2007/0171069 A1 | 7/2007 | Allen |
| 2007/0184852 A1 | 8/2007 | Johnson et al. |
| 2007/0189907 A1 | 8/2007 | Kunihiro et al. |
| 2007/0208499 A1 | 9/2007 | Kwong |
| 2007/0210935 A1 | 9/2007 | Yost et al. |
| 2007/0276724 A1 | 11/2007 | Catt |
| 2007/0285281 A1 | 12/2007 | Welch |
| 2008/0052254 A1 | 2/2008 | Al Amri |
| 2008/0061967 A1 | 3/2008 | Corrado |
| 2008/0071611 A1 | 3/2008 | Lovett |
| 2008/0092343 A1 | 4/2008 | Unda et al. |
| 2008/0093121 A1 | 4/2008 | Webb |
| 2008/0093454 A1 | 4/2008 | Yamazaki et al. |
| 2008/0147268 A1 | 6/2008 | Fuller |
| 2008/0158010 A1 | 7/2008 | Nath et al. |
| 2008/0165030 A1 | 7/2008 | Kuo et al. |
| 2008/0208680 A1 | 8/2008 | Cho |
| 2008/0218383 A1 | 9/2008 | Franklin et al. |
| 2008/0238715 A1 | 10/2008 | Cheng et al. |
| 2008/0245638 A1 | 10/2008 | King et al. |
| 2008/0257965 A1 | 10/2008 | Klein et al. |
| 2008/0265019 A1 | 10/2008 | Artino et al. |
| 2008/0266138 A1 | 10/2008 | Ponert |
| 2008/0270227 A1 | 10/2008 | Al Amri |
| 2008/0277468 A1 | 11/2008 | Mitschele |
| 2008/0289030 A1 | 11/2008 | Poplett |
| 2008/0291054 A1 | 11/2008 | Groft |
| 2008/0296365 A1 | 12/2008 | Schliebe |
| 2008/0319837 A1 | 12/2008 | Mitschele |
| 2009/0026842 A1 | 1/2009 | Hunter et al. |
| 2009/0032368 A1 | 2/2009 | Hunter et al. |
| 2009/0049875 A1 | 2/2009 | Buhl et al. |
| 2009/0057398 A1 | 3/2009 | Douglass et al. |
| 2009/0083149 A1 | 3/2009 | Maekawa et al. |
| 2009/0095593 A1 | 4/2009 | King et al. |
| 2009/0099761 A1 | 4/2009 | Davis et al. |
| 2009/0102726 A1 | 4/2009 | Imano et al. |
| 2009/0109062 A1 | 4/2009 | An |
| 2009/0121889 A1 | 5/2009 | Lin et al. |
| 2009/0137204 A1 | 5/2009 | Chang et al. |
| 2009/0146796 A1 | 6/2009 | Goto et al. |
| 2009/0159674 A1 | 6/2009 | King et al. |
| 2009/0174528 A1 | 7/2009 | Toda et al. |
| 2009/0177580 A1 | 7/2009 | Lowenthal et al. |
| 2009/0183966 A1 | 7/2009 | King et al. |
| 2009/0192950 A1 | 7/2009 | King et al. |
| 2009/0199966 A1 | 8/2009 | Coleman et al. |
| 2009/0254438 A1 | 10/2009 | Johnson, Jr. et al. |
| 2009/0256707 A1 | 10/2009 | Uschold et al. |
| 2009/0267732 A1 | 10/2009 | Chauvin et al. |
| 2009/0284907 A1 | 11/2009 | Regimbal et al. |
| 2009/0287578 A1 | 11/2009 | Paluszek et al. |
| 2009/0315720 A1 | 12/2009 | Clement et al. |
| 2010/0019936 A1 | 1/2010 | Kaveler |
| 2010/0025459 A1 | 2/2010 | Yamada |
| 2010/0026522 A1 | 2/2010 | Ward, II |
| 2010/0030629 A1 | 2/2010 | Ward, II |
| 2010/0032266 A1 | 2/2010 | Stephan |
| 2010/0060479 A1 | 3/2010 | Salter |
| 2010/0103100 A1 | 4/2010 | Yamamoto |
| 2010/0106517 A1 | 4/2010 | Kociubinski et al. |
| 2010/0116883 A1 | 5/2010 | Cost et al. |
| 2010/0153193 A1 | 6/2010 | Ashby et al. |

(56) References Cited

U.S. PATENT DOCUMENTS

| | | |
|---|---|---|
| 2010/0161489 A1 | 6/2010 | Goodall et al. |
| 2010/0168694 A1 | 7/2010 | Gakhar et al. |
| 2010/0187300 A1 | 7/2010 | Ramachandran et al. |
| 2010/0188932 A1 | 7/2010 | Hanks et al. |
| 2010/0241056 A1 | 9/2010 | Lehtoluoto |
| 2010/0241564 A1 | 9/2010 | Miller et al. |
| 2010/0243729 A1 | 9/2010 | Russell et al. |
| 2010/0328104 A1 | 12/2010 | Groft |
| 2010/0332394 A1 | 12/2010 | Ioli |
| 2011/0015934 A1 | 1/2011 | Rowe et al. |
| 2011/0022427 A1 | 1/2011 | Dayan |
| 2011/0037562 A1 | 2/2011 | Braukmann et al. |
| 2011/0057815 A1 | 3/2011 | King et al. |
| 2011/0060653 A1 | 3/2011 | King et al. |
| 2011/0062230 A1 | 3/2011 | Ward, II |
| 2011/0063133 A1 | 3/2011 | Keller et al. |
| 2011/0066297 A1 | 3/2011 | Saberi et al. |
| 2011/0079564 A1 | 4/2011 | Palmer |
| 2011/0093314 A1 | 4/2011 | Redmann et al. |
| 2011/0106329 A1* | 5/2011 | Donnelly ............... B60L 53/65 700/291 |
| 2011/0122036 A1 | 5/2011 | Leung et al. |
| 2011/0133613 A1* | 6/2011 | Descamps ............... G07F 9/06 312/223.1 |
| 2011/0158331 A1 | 6/2011 | Kavaler et al. |
| 2011/0203901 A1 | 8/2011 | King et al. |
| 2011/0204847 A1 | 8/2011 | Turner |
| 2011/0205087 A1 | 8/2011 | Kell et al. |
| 2011/0210827 A1 | 9/2011 | Lidror |
| 2011/0213656 A1 | 9/2011 | Turner |
| 2011/0218940 A1 | 9/2011 | Bergstrom et al. |
| 2011/0221624 A1 | 9/2011 | Kavaler |
| 2011/0222957 A1* | 9/2011 | Marques Lito Velez Grilo .......... E02D 27/42 403/4 |
| 2011/0241442 A1 | 10/2011 | Mittleman et al. |
| 2011/0241604 A1* | 10/2011 | Anderson ............... B60L 8/003 320/101 |
| 2011/0261548 A1 | 10/2011 | Gandhi |
| 2011/0276519 A1* | 11/2011 | MacKay ............... G04C 11/026 705/418 |
| 2011/0289985 A1* | 12/2011 | MacKay ............... E05B 27/0007 70/1.5 |
| 2011/0313822 A1 | 12/2011 | Burdick |
| 2011/0316716 A1 | 12/2011 | MacKay et al. |
| 2011/0320243 A1 | 12/2011 | Khan |
| 2011/0320256 A1 | 12/2011 | Fiorucci et al. |
| 2012/0026015 A1 | 2/2012 | Kavaler |
| 2012/0073222 A1* | 3/2012 | Sargentini ............... E04B 1/7612 52/235 |
| 2012/0078686 A1 | 3/2012 | Bashani |
| 2012/0084210 A1 | 4/2012 | Farahmand |
| 2012/0092528 A1 | 4/2012 | Jung et al. |
| 2012/0143657 A1 | 6/2012 | Silberberg |
| 2012/0158466 A1 | 6/2012 | John |
| 2012/0173171 A1 | 7/2012 | Bajwa et al. |
| 2012/0185325 A1 | 7/2012 | Shani |
| 2012/0197806 A1 | 8/2012 | Hill |
| 2012/0208521 A1 | 8/2012 | Häger et al. |
| 2012/0213351 A1* | 8/2012 | Boyce ............... H04M 1/0291 379/167.01 |
| 2012/0215375 A1 | 8/2012 | Chang |
| 2012/0222935 A1* | 9/2012 | MacKay ............... G06Q 20/352 194/210 |
| 2012/0223841 A1* | 9/2012 | Chauvin ............... G06Q 20/32 340/870.02 |
| 2012/0255333 A1* | 10/2012 | MacKay ............... E05B 17/2092 70/357 |
| 2012/0273322 A1 | 11/2012 | MacKay et al. |
| 2012/0285790 A1 | 11/2012 | Jones et al. |
| 2012/0285791 A1 | 11/2012 | Jones et al. |
| 2012/0285792 A1 | 11/2012 | Jones et al. |
| 2012/0285793 A1 | 11/2012 | Jones et al. |
| 2012/0286036 A1 | 11/2012 | Jones et al. |
| 2012/0286968 A1 | 11/2012 | Jones et al. |
| 2012/0292385 A1 | 11/2012 | MacKay et al. |
| 2013/0005445 A1 | 1/2013 | Walker et al. |
| 2013/0016952 A1 | 1/2013 | Knuth |
| 2013/0021201 A1 | 1/2013 | del Castillo et al. |
| 2013/0027218 A1 | 1/2013 | Schwarz et al. |
| 2013/0085928 A1 | 4/2013 | McKinney |
| 2013/0099943 A1 | 4/2013 | Subramanya |
| 2013/0116952 A1 | 5/2013 | Chai |
| 2013/0124270 A1 | 5/2013 | Tziperman et al. |
| 2013/0124320 A1 | 5/2013 | Karner |
| 2013/0143536 A1 | 6/2013 | Ratti |
| 2013/0238406 A1 | 9/2013 | King et al. |
| 2013/0257589 A1 | 10/2013 | Mohiuddin et al. |
| 2013/0262275 A1 | 10/2013 | Outwater et al. |
| 2013/0285455 A1 | 10/2013 | Hunter et al. |
| 2014/0040028 A1 | 2/2014 | King et al. |
| 2014/0041301 A1 | 2/2014 | Oakely et al. |
| 2014/0058805 A1 | 2/2014 | Paesler et al. |
| 2014/0108107 A1 | 4/2014 | Jones et al. |
| 2014/0129158 A1 | 5/2014 | Shea |
| 2014/0158767 A1 | 6/2014 | Ramaci |
| 2014/0165885 A1 | 6/2014 | Denny |
| 2014/0172518 A1 | 6/2014 | King et al. |
| 2014/0174880 A1* | 6/2014 | MacKay ............... G07F 1/043 194/203 |
| 2014/0174881 A1 | 6/2014 | King et al. |
| 2014/0210646 A1 | 7/2014 | Subramanya |
| 2014/0213176 A1 | 7/2014 | Mendelson |
| 2014/0214499 A1 | 7/2014 | Hudson et al. |
| 2014/0214500 A1 | 7/2014 | Hudson et al. |
| 2014/0218527 A1 | 8/2014 | Subramanya |
| 2014/0229246 A1 | 8/2014 | Ghaffari |
| 2014/0231505 A1 | 8/2014 | King et al. |
| 2014/0257943 A1 | 9/2014 | Nerayoff et al. |
| 2014/0279565 A1 | 9/2014 | Trump et al. |
| 2014/0289025 A1 | 9/2014 | King et al. |
| 2014/0319211 A1 | 10/2014 | MacKay et al. |
| 2014/0344891 A1 | 11/2014 | Mullick et al. |
| 2015/0000511 A1 | 1/2015 | Engl |
| 2015/0029041 A1 | 1/2015 | Liu et al. |
| 2015/0045984 A1 | 2/2015 | Hui et al. |
| 2015/0068827 A1 | 3/2015 | Makitalo et al. |
| 2015/0084786 A1 | 3/2015 | King et al. |
| 2015/0106172 A1 | 4/2015 | Salama |
| 2015/0120336 A1 | 4/2015 | Grokop et al. |
| 2015/0129391 A1 | 4/2015 | Jones et al. |
| 2015/0134460 A1 | 5/2015 | Tian et al. |
| 2015/0179070 A1 | 6/2015 | Sandbrook |
| 2015/0191178 A1 | 7/2015 | Roy et al. |
| 2015/0235503 A1 | 8/2015 | King et al. |
| 2015/0242605 A1 | 8/2015 | Du et al. |
| 2015/0278969 A1 | 10/2015 | Benoy et al. |
| 2015/0283902 A1 | 10/2015 | Tuukkanen |
| 2015/0288713 A1 | 10/2015 | Lawrence et al. |
| 2015/0288932 A1 | 10/2015 | Smith et al. |
| 2015/0294526 A1* | 10/2015 | Vogt ............... E01F 9/615 29/428 |
| 2015/0302057 A1 | 10/2015 | Kealey et al. |
| 2015/0332587 A1 | 11/2015 | Schwarz et al. |
| 2015/0356604 A1 | 12/2015 | Kim et al. |
| 2015/0371483 A1 | 12/2015 | Sun |
| 2015/0376891 A1 | 12/2015 | Laurindo |
| 2016/0001782 A1 | 1/2016 | Fiedler |
| 2016/0012418 A1 | 1/2016 | MacKay et al. |
| 2016/0012602 A1 | 1/2016 | Xu et al. |
| 2016/0040699 A1* | 2/2016 | Nayar ............... F24S 25/65 403/164 |
| 2016/0055322 A1 | 2/2016 | Thomas |
| 2016/0069557 A1 | 3/2016 | Rückgauer |
| 2016/0086397 A1 | 3/2016 | Phillips |
| 2016/0133085 A1 | 5/2016 | Eagon et al. |
| 2016/0163119 A1 | 6/2016 | Bashani |
| 2016/0181688 A1 | 6/2016 | Gu et al. |
| 2016/0267340 A1 | 9/2016 | Jensen |
| 2016/0268838 A1 | 9/2016 | Hunter et al. |
| 2016/0288753 A1 | 10/2016 | Greene et al. |
| 2016/0321714 A1 | 11/2016 | King et al. |
| 2016/0371915 A1 | 12/2016 | MacKay et al. |

(56) References Cited

U.S. PATENT DOCUMENTS

| | | |
|---|---|---|
| 2017/0032485 A1 | 2/2017 | Vemury |
| 2017/0032582 A1 | 2/2017 | Moran et al. |
| 2017/0034600 A1 | 2/2017 | King et al. |
| 2017/0083043 A1 | 3/2017 | Bowers et al. |
| 2017/0094517 A1 | 3/2017 | Jakobsson |
| 2017/0096123 A1 | 4/2017 | Gennermann et al. |
| 2017/0098339 A1 | 4/2017 | Keller et al. |
| 2017/0116857 A1 | 4/2017 | Moran et al. |
| 2017/0148230 A1 | 5/2017 | Richard |
| 2017/0154368 A1 | 6/2017 | Jones et al. |
| 2017/0168155 A1 | 6/2017 | Richard |
| 2017/0186054 A1 | 6/2017 | Fish et al. |
| 2017/0193734 A1 | 7/2017 | King et al. |
| 2017/0197586 A1 | 7/2017 | Kawamura et al. |
| 2017/0206716 A1 | 7/2017 | King et al. |
| 2017/0213262 A1 | 7/2017 | Kelley, II et al. |
| 2017/0256983 A1 | 9/2017 | Hunter et al. |
| 2017/0262882 A1 | 9/2017 | Shina |
| 2017/0299400 A1 | 10/2017 | Joung et al. |
| 2017/0320501 A1 | 11/2017 | Li et al. |
| 2017/0323227 A1 | 11/2017 | Sadeghi |
| 2017/0323513 A1 | 11/2017 | Jones et al. |
| 2017/0325082 A1 | 11/2017 | Rowe et al. |
| 2017/0369071 A1 | 12/2017 | Gould et al. |
| 2018/0018179 A1 | 1/2018 | Scheufler et al. |
| 2018/0025549 A1 | 1/2018 | King et al. |
| 2018/0025550 A1 | 1/2018 | Hudson et al. |
| 2018/0025629 A1 | 1/2018 | Schwarz et al. |
| 2018/0061172 A1 | 3/2018 | MacKay et al. |
| 2018/0068337 A1 | 3/2018 | Fiorucci et al. |
| 2018/0082488 A1 | 3/2018 | King et al. |
| 2018/0082489 A1 | 3/2018 | King et al. |
| 2018/0082490 A1 | 3/2018 | King et al. |
| 2018/0160282 A1 | 6/2018 | van de Poll |
| 2018/0225908 A1 | 8/2018 | MacKay et al. |
| 2018/0225909 A1 | 8/2018 | MacKay et al. |
| 2018/0322534 A1 | 11/2018 | King et al. |
| 2018/0339708 A1 | 11/2018 | Geller |
| 2018/0342165 A1 | 11/2018 | Sweeney et al. |
| 2019/0062914 A1 | 2/2019 | King et al. |
| 2019/0066424 A1 | 2/2019 | Hassani et al. |
| 2019/0073837 A1 | 3/2019 | Oliver |
| 2019/0114869 A1 | 4/2019 | MacKay et al. |
| 2019/0131819 A1 | 5/2019 | Bell |
| 2019/0220011 A1 | 7/2019 | Della Penna |
| 2019/0227954 A1 | 7/2019 | Shi |
| 2019/0236940 A1 | 8/2019 | Schwarz et al. |
| 2019/0378368 A1 | 12/2019 | MacKay et al. |
| 2020/0127801 A1 | 4/2020 | Sengupta et al. |
| 2020/0136229 A1 | 4/2020 | MacKay et al. |
| 2020/0153270 A1 | 5/2020 | Hunter et al. |
| 2020/0160263 A1 | 5/2020 | Kuettner |
| 2020/0276503 A1 | 9/2020 | Marchiorello |
| 2020/0310528 A1 | 10/2020 | Upmanue et al. |
| 2020/0334581 A1 | 10/2020 | Skaling |
| 2020/0349666 A1 | 11/2020 | Hodge et al. |
| 2020/0364967 A1 | 11/2020 | Spice |
| 2021/0065263 A1 | 3/2021 | King et al. |
| 2021/0067846 A1 | 3/2021 | King et al. |
| 2021/0319485 A1 | 10/2021 | King et al. |
| 2021/0344218 A1 | 11/2021 | Hunter et al. |
| 2021/0407348 A1 | 12/2021 | King et al. |
| 2022/0030335 A1 | 1/2022 | King et al. |
| 2022/0076303 A1 | 3/2022 | King et al. |
| 2022/0076304 A1 | 3/2022 | King et al. |
| 2022/0076305 A1 | 3/2022 | King et al. |
| 2023/0005369 A1 | 1/2023 | King et al. |
| 2023/0057773 A1 | 2/2023 | King et al. |
| 2023/0072870 A1 | 3/2023 | Marvi et al. |

FOREIGN PATENT DOCUMENTS

| | | | |
|---|---|---|---|
| AU | 200227724 A1 | 1/2003 | |
| AU | 2006203554 A1 | 9/2006 | |
| AU | 2014239914 B2 | 9/2014 | |
| CA | 2260925 A1 | 5/1979 | |
| CA | 2233931 A1 | 4/1997 | |
| CA | 2248347 C | 10/1997 | |
| CA | 2448347 C | 10/1997 | |
| CA | 2511461 C | 10/1997 | |
| CA | 2260925 A1 | 1/1998 | |
| CA | 2186406 A1 * | 3/1998 | ........... G07F 17/248 |
| CA | 2227833 C | 7/1998 | |
| CA | 2346908 A1 | 4/2000 | |
| CA | 2302922 C | 9/2000 | |
| CA | 2352968 A1 | 4/2001 | |
| CA | 2373400 A1 | 8/2001 | |
| CA | 2401429 A1 | 9/2001 | |
| CA | 2377010 A1 | 10/2001 | |
| CA | 2357179 A1 | 3/2002 | |
| CA | 2437722 A1 | 8/2002 | |
| CA | 2387540 C | 11/2002 | |
| CA | 2453369 A1 | 1/2003 | |
| CA | 2363915 | 5/2003 | |
| CA | 2363915 A1 | 5/2003 | |
| CA | 2413198 A1 | 5/2003 | |
| CA | 2414132 A1 | 6/2003 | |
| CA | 2453369 | 1/2004 | |
| CA | 2443677 C | 3/2004 | |
| CA | 2517717 | 9/2004 | |
| CA | 2595309 A1 | 7/2006 | |
| CA | 2631699 A1 | 6/2007 | |
| CA | 2622164 C | 8/2008 | |
| CA | 122930 | 9/2008 | |
| CA | 126745 | 9/2008 | |
| CA | 2693911 A1 | 1/2009 | |
| CA | 2650192 A1 | 7/2009 | |
| CA | 2650195 A1 | 7/2009 | |
| CA | 2650195 C | 7/2009 | |
| CA | 2933066 A1 | 7/2009 | |
| CA | 2745368 C | 7/2010 | |
| CA | 134041 | 9/2010 | |
| CA | 134042 | 9/2010 | |
| CA | 2773132 C | 3/2011 | |
| CA | 2773135 A1 | 3/2011 | |
| CA | 2770093 A1 | 5/2012 | |
| CA | 2870544 C | 5/2012 | |
| CA | 2870592 A1 | 5/2012 | |
| CA | 2773250 C | 9/2012 | |
| CA | 142346 | 7/2013 | |
| CA | 145137 | 7/2013 | |
| CA | 155382 | 5/2015 | |
| CA | 155383 | 5/2015 | |
| CA | 155391 | 5/2015 | |
| CA | 156990 | 5/2015 | |
| CA | 156991 | 5/2015 | |
| CA | 156992 | 5/2015 | |
| CA | 156993 | 5/2015 | |
| CA | 156994 | 5/2015 | |
| CA | 156995 | 5/2015 | |
| CA | 157067 | 5/2015 | |
| CA | 157068 | 5/2015 | |
| CA | 157069 | 5/2015 | |
| CA | 161049 | 10/2015 | |
| CA | 160598 | 2/2016 | |
| CA | 163369 | 2/2016 | |
| CA | 163370 | 2/2016 | |
| CA | 2900177 A1 | 2/2017 | |
| CA | 2908793 A1 | 2/2017 | |
| CA | 2932667 A1 | 2/2017 | |
| CA | 168171 | 3/2017 | |
| CA | 168172 | 3/2017 | |
| CA | 168173 | 3/2017 | |
| CA | 168198 | 3/2017 | |
| CA | 168199 | 3/2017 | |
| CA | 168200 | 3/2017 | |
| CA | 171649 | 11/2017 | |
| CA | 171650 | 11/2017 | |
| CA | 171651 | 11/2017 | |
| CA | 171652 | 11/2017 | |
| CA | 171653 | 11/2017 | |
| CA | 171654 | 11/2017 | |
| CA | 3046774 | 12/2019 | |
| CA | D3189362 | 6/2021 | |

(56) References Cited

FOREIGN PATENT DOCUMENTS

| | | |
|---|---|---|
| CA | D3189363 | 6/2021 |
| CA | D3189364 | 6/2021 |
| CA | D3189365 | 6/2021 |
| CA | D3189366 | 6/2021 |
| CN | 1037604 A | 11/1989 |
| CN | 2395344 Y | 9/2000 |
| CN | 2470887 Y | 1/2002 |
| CN | 2544352 Y | 4/2003 |
| CN | 1549990 A | 11/2004 |
| CN | 201303054 Y | 9/2009 |
| CN | 305987969 | 8/2020 |
| DE | 2804085 A1 | 8/1978 |
| DE | 2750193 A1 | 5/1979 |
| DE | 102005041290 A1 | 3/2007 |
| EP | 0265328 A1 | 4/1988 |
| EP | 0329129 A3 | 8/1989 |
| EP | 0933288 A2 | 4/1999 |
| EP | 0933288 A2 | 8/1999 |
| EP | 0980055 A1 | 2/2000 |
| EP | 1227448 | 7/2002 |
| EP | 1327962 A2 | 7/2003 |
| EP | 1376491 A1 | 2/2004 |
| EP | 1748393 A1 | 1/2007 |
| EP | 1128350 B1 | 10/2007 |
| EP | 1898360 A1 | 3/2008 |
| EP | 2215605 B1 | 8/2012 |
| EP | 1898360 B8 | 2/2013 |
| EP | 002416206-0001 A1 | 3/2014 |
| EP | 002416206-0002 A1 | 3/2014 |
| EP | 002416206-0003 A1 | 3/2014 |
| EP | 002479352-0001 A1 | 6/2014 |
| EP | 002479352-0002 A1 | 6/2014 |
| EP | 002479352-0003 A1 | 6/2014 |
| EP | 002479360-0001 A1 | 6/2014 |
| EP | 002479360-0002 A1 | 6/2014 |
| EP | 002479360-0003 A1 | 6/2014 |
| EP | 002479428-0001 A1 | 6/2014 |
| EP | 002479428-0002 A1 | 6/2014 |
| EP | 002479428-0003 A1 | 6/2014 |
| EP | 003076702-0001 A1 | 4/2016 |
| EP | 003076702-0002 | 4/2016 |
| EP | 003076702-0003 A1 | 4/2016 |
| EP | 003076702-0004 A1 | 4/2016 |
| EP | 003076702-0005 A1 | 4/2016 |
| EP | 003076702-0006 A1 | 4/2016 |
| EP | 003462183-0001 A1 | 11/2016 |
| EP | 003462183-0002 A1 | 11/2016 |
| EP | 003462183-0003 A1 | 11/2016 |
| EP | 003462183-0004 A1 | 11/2016 |
| EP | 003462183-0005 A1 | 11/2016 |
| EP | 003462183-0006 A1 | 11/2016 |
| EP | 004415164-0001 | 10/2017 |
| EP | 004415164-0002 | 10/2017 |
| EP | 004415164-0003 | 10/2017 |
| EP | 004415164-0004 | 10/2017 |
| EP | 004415164-0005 | 10/2017 |
| EP | 004415164-0006 | 10/2017 |
| EP | 3582195 | 12/2019 |
| FR | 2600448 A1 | 12/1987 |
| FR | 2837583 A1 | 9/2003 |
| FR | 2928678 | 9/2009 |
| FR | 2979726 | 3/2013 |
| GB | 1237579 | 6/1971 |
| GB | 1283555 | 7/1972 |
| GB | 1431862 | 4/1976 |
| GB | 2077475 A | 12/1981 |
| GB | 2155228 A | 9/1985 |
| GB | 2156894 A * | 10/1985 |
| GB | 2284919 A | 6/1995 |
| GB | 2298510 A | 9/1996 |
| GB | 2461397 | 6/2010 |
| IL | 149880 A | 6/2007 |
| JP | 58121494 A | 7/1983 |
| JP | 3437661 | 2/1989 |
| JP | S6437661 A | 2/1989 |
| JP | H01165494 | 6/1989 |
| JP | H01303026 | 12/1989 |
| JP | H028692 A | 1/1990 |
| JP | H0261711 A | 3/1990 |
| JP | H02180623 A | 7/1990 |
| JP | H03253992 | 11/1991 |
| JP | H0487533 A | 3/1992 |
| JP | H08305998 A | 11/1996 |
| JP | 2002074430 A | 3/2002 |
| JP | 2002099640 A | 4/2002 |
| JP | 2002528799 A | 9/2002 |
| JP | 2003169133 A | 6/2003 |
| JP | 3441832 | 9/2003 |
| JP | 2003527701 A | 9/2003 |
| JP | 2005242888 A | 9/2005 |
| JP | 2005267430 A | 9/2005 |
| JP | 2007052773 A | 3/2007 |
| JP | 4240927 B2 | 3/2009 |
| JP | 4247079 | 4/2009 |
| JP | 2011060206 A | 3/2011 |
| JP | 5238316 | 7/2013 |
| JP | 5259000 B1 | 8/2013 |
| KR | 20000016671 A | 3/2000 |
| KR | 20000030290 | 6/2000 |
| KR | 20010028481 A | 4/2001 |
| KR | 102005038077 A | 4/2005 |
| KR | 20060088085 | 8/2006 |
| KR | 100693204 B1 | 3/2007 |
| KR | 1020080026282 A | 3/2008 |
| KR | 20080041730 A | 5/2008 |
| MX | 2008007047 A | 8/2008 |
| NZ | 20020530606 A | 11/2006 |
| WO | 198100778 A1 | 3/1981 |
| WO | 1995020204 | 7/1995 |
| WO | 199611453 A1 | 4/1996 |
| WO | 199712345 A1 | 4/1997 |
| WO | 1997033341 A1 | 9/1997 |
| WO | 199737328 A1 | 10/1997 |
| WO | 199804080 A1 | 1/1998 |
| WO | 200059201 A1 | 10/2000 |
| WO | 2000059201 | 10/2000 |
| WO | 200124127 A1 | 4/2001 |
| WO | WO2001024127 A1 | 4/2001 |
| WO | 200169541 A1 | 9/2001 |
| WO | 200180157 A1 | 10/2001 |
| WO | 2002063570 A2 | 8/2002 |
| WO | 2002084600 | 10/2002 |
| WO | 2003005324 A1 | 1/2003 |
| WO | 2003009238 | 1/2003 |
| WO | 2003009238 A1 | 1/2003 |
| WO | 2003065322 | 8/2003 |
| WO | 2004012352 A1 | 2/2004 |
| WO | 2005027035 A1 | 3/2005 |
| WO | 2005031494 A2 | 4/2005 |
| WO | 2006076773 A1 | 7/2006 |
| WO | 2006095352 A2 | 9/2006 |
| WO | 2007063530 A2 | 6/2007 |
| WO | 2009009854 A1 | 1/2009 |
| WO | 2009154787 A2 | 12/2009 |
| WO | 2010008610 A2 | 1/2010 |
| WO | 2010062105 | 6/2010 |
| WO | 2010071972 A1 | 7/2010 |
| WO | 2010071974 A1 | 7/2010 |
| WO | 2011029061 A2 | 3/2011 |
| WO | 2011029062 A2 | 3/2011 |
| WO | 2012015453 A1 | 2/2012 |
| WO | 2012092609 A2 | 7/2012 |
| WO | 2012154902 A1 | 11/2012 |
| WO | 2012154913 A2 | 11/2012 |
| WO | 2013016453 A2 | 1/2013 |
| WO | 2013019273 | 2/2013 |
| WO | 2013049418 A2 | 4/2013 |
| WO | 2014014494 A1 | 1/2014 |
| WO | 2014127384 | 8/2014 |
| WO | 2014127384 A1 | 8/2014 |
| WO | 2014152369 A3 | 9/2014 |
| WO | 2017024396 A1 | 2/2017 |

(56) References Cited

FOREIGN PATENT DOCUMENTS

| WO | 2017024397 A1 | 2/2017 |
|---|---|---|
| WO | WO2017024396 A1 | 2/2017 |
| WO | WO2017024397 A1 | 2/2017 |

OTHER PUBLICATIONS

Duncan Solutions—VM Pay-by-Spcae Multi-Space Meter brochure, 2013 (2 pages).
Duncan, Duncan VM—Solar Power meter photograph, pre-Mar. 2011 (1 page).
Duncan Solutions, Duncan VS, 2006 (2 pages).
McCullagh, D., "Hackers: We can bypass San Francisco e-parking meters," Jul. 30, 2009, http://news.cnet.com (2 pages).
Exhibit 1003—Declaration of Todd Magness in Support of Petition for Inter Partes Review of U.S. Pat. No. 7,854,310, dated Oct. 21, 2015 (70 pages).
Exhibit 1004—Declaration of Anderson Moore in Support of Petition for Inter Partes Review of U.S. Pat. No. 8,595,054, dated Oct. 21, 2015 (19 pages).
Exhibit 1005—U.S. Appl. No. 60/741,920, filed Dec. 2, 2005 (20 pages).
Exhibit 1009—Tung, Y., "Design of an Advanced On-street Parking Meter," Thesis, Rochester Institute of Technology, 2001 (75 pages).
Exhibit 1010—Christian, S. E., "Parking Meter Winding Up for Computer Age," Chicago Tribune, May 19, 1995 (6 pages).
Exhibit 1011—Associated Press, "New parking meters based on computer," The San Diego Union, Feb. 1, 1987 (1 page).
Exhibit 1012—Lunden, J., Good Morning America transcript, Nov. 6, 1986 (3 pages).
Exhibit 1013—LUKE Parking Station ad (p. 28), Parking Today, vol. 10, No. 4, Apr. 2005 (64 pages)—PART 1.
Exhibit 1014—Blass, E., "Changing times," Lansing State Journal, Feb. 19, 1987 (1 page).
Exhibit 1015—Gabriele, M.C., "Electronic Parking Meters Rival Mechanical Units," American Metal Market/Metalworking News, Sep. 29, 1986 (1 page).
Exhibit 1016—Sandler, L., "Lovely VISA, meter maid: Use credit card to park," Milwaukee Journal Sentinel, Jun. 13, 2005 (1 page).
Exhibit 1017—Item for Finance Commitee, "Capital Works Reserve Fund, Head 708—Capital Subventions and Major Systems and Equipment," FCR(Mar. 2002)18, May 24, 2002 (15 pages).
Exhibit 1018—Anonymous, "Happy %#@! Anniversary, First Parking Meter Installed Jul. 16, 1935," The Expired Meter News, Views, Information on Driving in Chicago, Jul. 16, 2009 (10 pages).
Exhibit 1019—Anonymous, "Parking Meter Patented 72 Years Ago Today", The Expired Meter News, Views Information on Driving in Chicago, May 24, 2010 (6 pages).
Exhibit 1032—U.S. Pat. No. 5,570,771 to Jacobs, Nov. 5, 1996 (29 pages).
Exhibit 1034—Anonymous, "Smart Cards and Parking," TC-06001, Smart Card Alliance Transportation Council White Paper, Jan. 2006 (52 pages).
Exhibit 1037—Catalog Entry for Exhibit 1009, Tung, Y., "Design of an advanced on-street parking meter," Oct. 18, 2015 (2 pages).
Exhibit 1038—POM Parking Meters website, Oct. 20, 2015 (4 pages).
IPS Group Inc., Exhibit 2001, Design of an advanced on-street parking meter, Jan. 12, 2016 (2 pages).
IPS Group Inc., Exhibit 2002, About RIT Digital Media Library, Jan. 12, 2016 (1 page).
IPS Group Inc., Exhibit 2003, The U.S. Conference of Mayors Presents 'Best-Practice' Awards, Jan. 20, 2012 (2 pages).
IPS Group Inc., Exhibit 2004, City of Los Angeles, Card & Coin Parking Meter Lease, Nov. 29, 2010 (4 pages).
IPS Group Inc., Exhibit 2005, City of Culver City, California, Approval of a Contract with IPS Group Inc., for the Sole-Source Purchase of 1,000 Parking Meters, Dec. 12, 2011 (3 pages).
IPS Group Inc., Exhibit 2006, City of San Luis Obispo City Manager Report, Award of Credit Card Meters and Service Contract, RFP Specification No. 91137, Jan. 20, 2012 (5 pages).
IPS Group Inc., Exhibit 2007, Walnut Creek, Alternate Downtown Parking Pay Technology, Oct. 20, 2011 (4 pages).
IPS Group Inc., Exhibit 2008, How M2M Maximizes Denver's Revenue, Oct. 2011 (4 pages).
IPS Group Inc., Exhibit 2009, Somerville, MA, T&P Introduces User-Friendly Parking Meters & Service Upgrades with Electronic Meter Pilot, Apr. 19, 2011 (2 pages).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pages).
Flatley, J., "In San Francisco, hackers park for free," posted Jul. 31, 2009, www.engadget.com (1 page).
Digital Payment Technologies, Response to Request for Proposal for Multi-Space Parking Meters, City of Fort Lauderdale, Jan. 13, 2010 (89 pages).
Howland, S., "How M2M Maximizes Denver's Revenue," FieldTechnologiesOnline.com, Oct. 2011, pp. 9-12 (4 pages).
MAX Dual Space Meter advertisement, Jun. 25, 2015 (2 pages).
IPS Multi Bay Parking Meter product description, http://www.design-industry.com.au/work/multi-bay-parking-meter/, Oct. 6, 2015 (6 pages).
Reino Parking Systems: On-Street Service Procedures, Jun. 29, 2004 (19 pages).
Reino Meter Advertisement, The power of a paystation, Parking Today, Aug. 2003 (1 page).
Duncan Solutions/Reino, RSV3 Digital Parking Meter, Jul. 5, 2011 (2 pages).
Reino, RSV3 brochure, Nov. 10, 2007 (4 pages).
Digital Payment Technologies, Sierra Wireless Case Study, Dec. 7, 2009 (2 pages).
IPS Single Bay Parking Meter product description, http://www.design-industry.com.au/work/ips-single-parking-meter/, Oct. 6, 2015 (6 pages).
StreetSmart Technology, LLC, "Technical Specifications and System Features for the StreetSmart Solution" Brochure, May 2011 (8 pages).
Digital Payment Technologies, Digital Payment Technologies and PXT Payments Forge Partnership To Bring Cities Smart Parking Meters and Merchant Loyalty Debit Cards, www.digitalpaytech.com, Apr. 27, 2010 (2 pages).
(Cell Net Data Systems) "First Wireless Monitoring of Parking Meters Results in Theft Arrests Using CellNet Data Systems Technology," PRNewswire, May 11, 1999 (3 pages).
Basu et al., "Networked Parking Spaces: Architecture and Appliances," MCL Technical Report No. 07-01-2002, Proc. IEEE Vehicular Transportation Conference, Vancouver, Canada, Sep. 2002 (10 pages).
Burden et al., "Near Field Communications (NFC) in Public Transport," Digital Identity Forum, 2006 (18 pages).
Exhibit 1013—LUKE Parking Station ad (p. 28), Parking Today, vol. 10, No. 4, Apr. 2005 (64 pages)—Part 2.
Written Opinion issued in application No. PCT/US2012/037229, dated Jan. 28, 2013.
Written Opinion issued in application No. PCT/US2012/037205, dated Oct. 4, 2012.
Office Action issued in U.S. Appl. No. 13/545,871, dated Apr. 12, 2013.
Office Action issued in U.S. Appl. No. 13/545,871, dated Aug. 6, 2013.
Office Action issued in U.S. Appl. No. 13/545,871, dated Dec. 28, 2012.
Office Action issued in U.S. Appl. No. 13/545,871, dated Nov. 28, 2012.
Office Action issued in U.S. Appl. No. 13/546,918, dated Apr. 15, 2013.
Office Action issued in U.S. Appl. No. 13/546,918, dated Dec. 5, 2013.

(56) References Cited

OTHER PUBLICATIONS

Office Action issued in U.S. Appl. No. 13/546,918, dated May 8, 2014.
Office Action issued in U.S. Appl. No. 13/546,918, dated Sep. 26, 2012.
Office Action issued in U.S. Appl. No. 14/094,382, dated Aug. 5, 2014.
Office Action issued in U.S. Appl. No. 14/094,382, dated Dec. 26, 2014.
Office Action issued in U.S. Appl. No. 14/325,134, dated Apr. 1, 2015.
Office Action in U.S. Appl. No. 14/325,134, dated Nov. 24, 2015.
Office Action issued in U.S. Appl. No. 14/743,691, dated May 13, 2016.
Office Action issued in U.S. Appl. No. 14/743,691, dated Sep. 2, 2016.
Office Action issued in U.S. Appl. No. 14/698,806, dated Dec. 14, 2015.
Office Action issued in U.S. Appl. No. 15/220,228, dated Jun. 16, 2017.
Office Action issued in U.S. Appl. No. 15/802,298, dated Apr. 2, 2018.
Office Action issued in U.S. Appl. No. 29/477,402, dated Apr. 9, 2015.
Office Action issued in U.S. Appl. No. 29/477,176, dated May 4, 2015.
Office Action issued in U.S. Appl. No. 29/477,200, dated Apr. 9, 2015.
Office Action issued in U.S. Appl. No. 29/477,201, dated Apr. 9, 2015.
Office Action issued in U.S. Appl. No. 29/477,204, dated Apr. 9, 2015.
Office Action issued in U.S. Appl. No. 29/477,321, dated May 15, 2015.
Office Action issued in U.S. Appl. No. 29/477,324, dated Apr. 23, 2015.
Office Action issued in application No. CA 2770093, dated Jul. 5, 2012 (5 pages).
Office Action issued in U.S. Appl. No. 14/094,382, dated Mar. 24, 2015 (16 pages).
Interview Summary issued in U.S. Appl. No. 12/059,909, dated Jun. 29, 2011 (3 pages).
Interview Summary issued in U.S. Appl. No. 12/095,914, dated Apr. 11, 2011 (3 pages).
Interview Summary issued in U.S. Appl. No. 12/355,734, dated Apr. 6, 2012 (3 pages).
Notice of Allowance issued in U.S. Appl. No. 13/410,831, dated Oct. 11, 2013 (31 pages).
Notice of Allowance issued in U.S. Appl. No. 13/141,977, dated Jul. 29, 2016 (10 pages).
Notice of Allowance issued in U.S. Appl. No. 13/545,871, dated May 28, 2013 (9 pages).
Notice of Allowance issued in U.S. Appl. No. 13/546,918, dated Feb. 26, 2015 (10 pages).
Notice of Allowance issued in U.S. Appl. No. 13/546,918, dated Jun. 19, 2015 (19 pages).
Notice of Allowance issued in U.S. Appl. No. 13/546,918, dated Mar. 28, 2016 (28 pages).
Notice of Allowance issued in U.S. Appl. No. 13/546,918, dated Nov. 20, 2015 (9 pages).
Notice of Allowance issued in U.S. Appl. No. 14/864,170, dated Aug. 3, 2017 (25 pages).
Notice of Allowance issued in U.S. Appl. No. 14/325,134, dated Apr. 28, 2016 (7 pages).
Notice of Allowance issued in U.S. Appl. No. 14/325,134, dated Feb. 3, 2016 (7 pages).
Notice of Allowance issued in U.S. Appl. No. 15/220,228, dated Aug. 4, 2017 (20 pages).
Notice of Allowance issued in U.S. Appl. No. 29/477,339, dated Apr. 1, 2015 (3 pages).
Notice of Allowance issued in U.S. Appl. No. 29/477,402, dated Aug. 3, 2015 (3 pages).
Notice of Allowance issued in U.S. Appl. No. 29/477,405, dated Apr. 1, 2015 (10 pages).
Notice of Allowance issued in U.S. Appl. No. 13/545,871, dated Dec. 16, 2013 (10 pages).
Notice of Allowance issued in U.S. Appl. No. 29/433,549, dated Feb. 27, 2014 (59 pages).
Notice of Allowance issued in U.S. Appl. No. 29/489,572, dated Jun. 11, 2014 (9 pages).
Office Action issued in application No. U.S. Appl. No. 08/418,018, dated Jan. 17, 1997 (11 pages).
Office Action issued in U.S. Appl. No. 08/418,018, dated Jul. 25, 1997 (6 pages).
Office Action issued in U.S. Appl. No. 08/959,109, dated Apr. 1, 2011 (7 pages).
Office Action issued in U.S. Appl. No. 08/959,109, dated Apr. 23, 2013 (5 pages).
Office Action issued in U.S. Appl. No. 08/959,109, dated Aug. 5, 2011 (7 pages).
Office Action issued in U.S. Appl. No. 08/959,109, dated Jan. 26, 1998 (9 pages).
Office Action issued in U.S. Appl. No. 08/959,109, dated May 25, 2012 (4 pages).
Office Action issued in U.S. Appl. No. 08/959,109, dated Nov. 21, 2012 (24 pages).
Office Action issued in U.S. Appl. No. 12/059,909, dated Jul. 27, 2011 (15 pages).
Office Action issued in U.S. Appl. No. 12/355,734, dated Apr. 6, 2012 (39 pages).
Office Action issued in U.S. Appl. No. 12/355,734, dated Dec. 7, 2011 (28 pages).
Office Action issued in U.S. Appl. No. 12/355,740, dated Dec. 20, 2011 (12 pages).
Office Action issued in U.S. Appl. No. 12/355,740, dated Sep. 15, 2011 (6 pages).
Office Action issued in U.S. Appl. No. 12/430,733, dated Sep. 14, 2011 (7 pages).
Office Action issued in U.S. Appl. No. 12/973,109, dated Apr. 30, 2012 (11 pages).
Office Action issued in U.S. Appl. No. 12/973,109, dated Dec. 13, 2011 (12 pages).
Office Action issued in U.S. Appl. No. 12/973,109, dated Jan. 28, 2013 (16 pages).
Office Action issued in U.S. Appl. No. 13/141,977, dated Aug. 1, 2013 (37 pages).
Office Action issued in U.S. Appl. No. 13/141,977, dated May 8, 2013 (29 pages).
Office Action issued in U.S. Appl. No. 13/141,977, dated Oct. 11, 2012 (29 pages).
Office Action issued in U.S. Appl. No. 13/141,983, dated Jun. 14, 2013 (27 pages).
Office Action issued in U.S. Appl. No. 13/141,983, dated Oct. 22, 2013 (47 pages).
Office Action issued in U.S. Appl. No. 13/410,831, dated Feb. 12, 2013 (11 pages).
Office Action issued in U.S. Appl. No. 13/410,831, dated Jul. 12, 2013 (6 pages).
Office Action issued in U.S. Appl. No. 13/410,831, dated May 28, 2013 (7 pages).
Office Action issued in U.S. Appl. No. 13/410,831, dated Nov. 6, 2012 (11 pages).
Office Action issued in U.S. Appl. No. 13/529,914, dated Jun. 21, 2013 (8 pages).
Office Action issued in U.S. Appl. No. 13/529,914, dated Sep. 27, 2013 (18 pages).
Office Action issued in application No. CA 2745365, dated Aug. 26, 2011 (4 pages).
Office Action issued in application No. CA 2745365, dated Jun. 5, 2012 (2 pages).
Office Action issued in application No. CA 2745365, dated Mar. 1, 2012 (6 pages).

(56) References Cited

OTHER PUBLICATIONS

Office Action issued in application No. CA 2745365, dated Jul. 4, 2012 (2 pages).
Office Action issued in application No. CA 2745368, dated Aug. 4, 2011 (2 pages).
Office Action issued in application No. CA 2745368, dated Nov. 1, 2011 (3 pages).
Office Action issued in application No. CA 2770093, dated Apr. 10, 2013 (2 pages).
Office Action issued in application No. CA 2770093, dated Jun. 11, 2014 (2 pages).
Office Action issued in application No. CA 2770093, dated Oct. 15, 2014 (3 pages).
Office Action issued in application No. CA 2770093, dated Oct. 29, 2012 (2 pages).
Office Action issued in application No. CA 2773250, dated Mar. 26, 2015 (10 pages).
Office Action issued in application No. CA 2773250, dated Jun. 20, 2013 (3 pages).
Office Action issued in application No. CA 2773250, dated Jun. 30, 2014 (3 pages).
Office Action issued in application No. CA 2773250, dated Mar. 12, 2014 (5 pages).
Office Action issued in application No. CA 2773250, dated Nov. 12, 2014 (10 pages).
Office Action issued in application No. CA 2773250, dated Oct. 7, 2013 (4 pages).
Office Action issued in application No. CA 2870544, dated Jan. 19, 2015 (5 pages).
Office Action issued in application No. CA 2870544, dated Oct. 15, 2015 (6 pages).
Co_pending_U.S. Appl. No. 15/826,587.
Co_pending_U.S. Appl. No. 15/826,584.
Co_pending_U.S. Appl. No. 15/826,583.
Co_pending_U.S. Appl. No. 15/474,773.
Office_Action_of_U.S. Appl. No. 14/027,011_dated Sep. 25, 2015.
Office_Action_of_U.S. Appl. No. 14/027,011_dated Apr. 21, 2016.
Office_Action_of_U.S. Appl. No. 13/928,058_dated Feb. 2, 2016.
Office_Action_of_U.S. Appl. No. 13/928,058_dated Dec. 3, 2015.
Office_Action_of_U.S. Appl. No. 14/027,011_dated Dec. 29, 2017.
Office_Action_of_U.S. Appl. No. 14/185,691_dated Jun. 17, 2015.
Office_Action_of_U.S. Appl. No. 14/185,691_dated Oct. 7, 2015.
Office_Action_of_U.S. Appl. No. 14/297,525_dated Jun. 19, 2015.
Office_Action_of_U.S. Appl. No. 14/698,806_dated May 13, 2016.
Office_Action_of_U.S. Appl. No. 14/811,641_dated May 2, 2016.
Office_Action_of_U.S. Appl. No. 14/811,641_dated Oct. 5, 2016.
Office_Action_of_U.S. Appl. No. 15/208,056_dated Jun. 9, 2017.
Office_Action_of_U.S. Appl. No. 15/208,056_dated Oct. 11, 2017.
Office_Action_of_U.S. Appl. No. 15/465,165_dated Oct. 12, 2017.
Office_Action_of_U.S. Appl. No. 15/633,290_dated Jan. 5, 2018.
Office_Action_of_U.S. Appl. No. 15/705,085_dated Dec. 15, 2017.
Office_Action_of_U.S. Appl. No. 15/826,584_dated Feb. 9, 2018.
Office_Action_of_U.S. Appl. No. 15826587_dated Mar. 8, 2018.
POM_APML_Photo_4Xfront.
POM_APML_Photo_10_03_11_1537.
POM_APML_Photo_10_03_11_1538.
POM_APML_Photo_10_03_11_1539.
POM_APM_Photo_apm2xcrop.
POM_APM_Photo_apm2xyellow.
POM_APML_Photo_DSC06379.
POM_APML_Photo_DSC06380.
POM_APML_Photo_DSC06381.
POM_APM_Photo_DSC06382.
POM_APM_Photo_DSC06383.
POM_APM_Photo_DSC06384.
POM_APM_Photo_DSC06385.
POM_APM_Photo_DSC06386.
POM_APM_Photo_DSC06387.
POM_APM_Photo_DSC06389.
POM_APM_Photo_DSC06390.
POM_APM_Photo_DSC06391.
POM_APM_Photo_DSC06393.
POM_APM_Photo_DSC06394.
POM_APM_Photo_DSC06395.
POM_APM_Photo_IMG_20120423_00336.
POM_APM_Photo_IMG_20120423_00337.
POM_APM_Photo_IMG_20120423_00338.
POM_APM_Photo_IMG_20120423_00339.
POM_APM_Photo_IMG_20120423_00340.
POM_APM_Photo_IMG_20120423_00341.
POM_APM_Photo_IMG_20120423_00342.
POM_APM_Photo_IMG_20120423_00344.
POM_APM_Photo_IMG_20120423_00346.
POM_APM_Photo_IMG_20120423_00348.
POM_APM_Photo_IMG_20120423_00350.
POM_APM_Photo_IMG_20120423_00351.
MacKay Custodian TM Multi-Space Machine Configuration Guide, 2003-2005 (184 pages).
Reino International, Recommended Cashbox Handling Guidelines, Version 2.0, Nov. 26, 2003 (7 pages).
Digital Payment Technologies, Credit Card Processing with LUKE and SHELBY, Dec. 2007 (15 pages).
Duncan Solutions—Intermec CN50 webpage, Mar. 8, 2011 (2 pages).
Duncan Solutions—Motorola MC75 webpage, Mar. 8, 2011 (2 pages).
Duncan Solutions—AutoCITE brochure, 2013 (2 pages).
Duncan Solutions13 AutoCITE TM X3 Handheld Computer, 2013 (2 pages).
Ambravan, B., "Improved-Clarity Polycarbonate (PC) Resins used in liniLED PU," http://organiclighting.com/tag/polycarbonate-pc-resins/, Sep. 26, 2016 (1 page).
Intrinsyc Software International, Inc., Intrinsyc and Digital Pioneer Partner on Development of New Leading Edge Parking Terminal Solution, Aug. 14, 2003 (2 pages).
Shaheen, S., "Smart Parking Management Field Test: A Bay Area Rapid Transit (BART) District Parking Demonstration," Institute of Transportation Studies, UC Davis, Jan. 1, 2005 (139 pages).
Micrel, Application Note 51 Frequency Hopping Techniques, Jun. 2006, Rev. 1.0 (8 pages).
Cardinal Tracking Inc.—MobileCite brochure, dated prior to Jun. 15, 2015 (2 pages).
The United States Conference of Mayors Press Release, "The U.S. Conference of Mayors Presents 'Best-Practice' Awards," Jan. 20, 2012 (3 pages).
Reino, Operator User Manual, 2003 (106 pages).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pages).
Reino, Parking Systems RSV2 Service Manual, Version 3.1, Dec. 2003 (78 pages).
Duncan Solutions, Pay-by-Space Parking Meters, Customer Support Manual, Jul. 2006 (216 pages).
Bayless et al., "Smart Parking and the Connected Consumer," IDS America Research, Dec. 2012 (39 pages).
Bernspang, F., "Smart Parking using Magnetometers and Mobile Applications," Master's Thesis, Master of Science in Engineering Technology, Computer Science and Engineering, Lulea University of Technology, Nov. 2010-May 2011 (35 pages).
Cosgrove, D., "SmartPark," Senior Project Report, Jun. 12, 2013 (20 pages).
Spyker, R. L., "Predicting capacitor run time for a battery/capacitor hybrid source," Power Electronic Drives and Energy Systems for Industrial Growth, 1998, abstract only (2 pages).
Video link, "PhotoViolationHandHeldUnit TM" https://web.archive.org/web/20080222104246/http://www.photoviolation.com/videos/HHU.wmv, Photo Violation Technologies Corp., dated prior to Jun. 15, 2015.

(56) References Cited

OTHER PUBLICATIONS

Video link, "The PBS Solution" https://web.archive.org/web/20080222104246/http://www.photoviolation.com/videos/PBS.wmv, Photo Violation Technologies Corp., dated prior to Jun. 15, 2015.
Video link, "The PVM Solution" https://web.archive.org/web/20080222104246/http://www.photoviolation.com/videos/PVM.wmv, Photo Violation Technologies Corp., dated prior to Jun. 15, 2015.
Video link, "Park Card Meter TM System," https://web.archive.org/web/20080222104246/http://www.photoviolation.com/videos/PCM.wmv, Photo Violation Technologies Corp., dated prior to Jun. 15, 2015.
Information Disclosure Statement by Applicant filed for U.S. Appl. No. 12/355,734 dated May 23, 2012 (2 pages).
Information Disclosure Statement by Applicant filed for U.S. Appl. No. 12/355,740 dated May 23, 2012 (2 pages).
Information Disclosure Statement by Applicant filed for U.S. Appl. No. 12/875,959 dated May 24, 2012 (2 pages).
Information Disclosure Statement by Applicant filed for U.S. Appl. No. 12/875,975 dated May 24, 2012 (2 pages).
Information Disclosure Statement by Applicant filed for U.S. Appl. No. 12/355,734 dated Oct. 23, 2012 (2 pages).
Transmittal of Information Disclosure Statement by Applicant filed for U.S. Appl. No. 12/973,109 dated May 31, 2012 (2 pages).
U.S. Appl. No. 15/474,773, filed Mar. 30, 2017 (68 pages).
Byrd Dennis, Parking Meter Manufacturer Sees Bright Future for New Sun-Powered Devices, Los Angeles Times, May 14, 1989 (2 pages).
Design U.S. Appl. No. 29/466,267, filed Sep. 5, 2013 (19 pages).
Design U.S. Appl. No. 29/466,268, filed Sep. 5, 2013 (19 pages).
Design U.S. Appl. No. 29/466,269, filed Sep. 5, 2013 (19 pages).
Design U.S. Appl. No. 29/477,176, filed Dec. 19, 2013 (24 pages).
Design U.S. Appl. No. 29/477,195, filed Dec. 19, 2013 (21 pages).
Design U.S. Appl. No. 29/477,196, filed Dec. 19, 2013 (21 pages).
Design U.S. Appl. No. 29/477,339, filed Dec. 20, 2013 (21 pages).
Design U.S. Appl. No. 29/477,402, filed Dec. 20, 2013 (24 pages).
Design U.S. Appl. No. 29/477,405, filed Dec. 20, 2013 (24 pages).
Design U.S. Appl. No. 29/520,918, filed Mar. 18, 2015 (23 pages).
Design U.S. Appl. No. 29/521,401, filed Mar. 23, 2015 (24 pages).
AU315846—Figures.
AU315847—Figures.
AU314132—Figures.
AU315845—Figures.
Written Opinion issued in application No. PCT/IB2006/054574, dated Oct. 27, 2008.
*Duncan Parking Technologies, Inc v. IPS Group Inc.*; Case IPR2016-01144; Patent Owner's Preliminary Response dated Sep. 8, 2016 (58 pages).
*Duncan Parking Technologies, Inc v. IPS Group Inc.*; Case IPR2016-01145; Patent Owner's Preliminary Response dated Sep. 8, 2016 (52 pages).
Applicant's response to Office Action dated Sep. 25, 2015; U.S. Appl. No. 14/027,011.
Specification of Co-Pending U.S. Appl. No. 15/465,165, filed Mar. 21, 2017.
*Duncan Parking Technologies, Inc v. IPS Group Inc*; Case IPR2016-00068; Decision Denying Institution of Inter Partes Review; dated Mar. 30, 2016 (13 pages).
*Duncan Parking Technologies, Inc. v. IPS Group Inc*; Case IPR2016-00070; Decision Denying Institution of Inter Partes Review; dated Apr. 1, 2016 (17 pages).
*Duncan Parking Technologies, Inc. v. IPS Group Inc*; Case IPR2016-00069; Decision Denying Institution of Inter Partes Review; dated Apr. 1, 2016 (13 pages).
*Duncan Parking Technologies, Inc. v. IPS Group Inc*; Case IPR2016-00067; Decision Granting Institution of Inter Partes Review; dated Mar. 30, 2016 (19 pages).
*Duncan Parking Technologies, Inc. v. IPS Group Inc.*; Case IPR2016-00067; Patent Owner's Response; dated Jul. 12, 2016 (32 pages).
*Duncan Parking Technologies, Inc. v. IPS Group Inc.*; Case IPR2016-00067; Preliminary Response; dated Jan. 29, 2016 (38 pages).
*Duncan Parking Technologies, Inc. v. IPS Group Inc.*; Case IPR2016-00067; Scheduling Order; dated Mar. 30, 2016 (9 pages).
*Duncan Parking Technologies, Inc. v. IPS Group Inc.*; Case IPR2016-00068; Patent Owner's Preliminary Response dated Feb. 1, 2016 (48 pages).
*Duncan Parking Technologies, Inc. v. IPS Group Inc.*; Case IPR2016-00069; Patent Owner's Preliminary Response dated Feb. 1, 2016 (48 pages).
*Duncan Parking Technologies, Inc. v. IPS Group Inc.*; Case IPR2016-00070; Preliminary Response; dated Feb. 1, 2016 (49 pages).
*Duncan Parking Technologies, Inc. v. IPS Group Inc.*; Case: To Be Assigned; U.S. Pat. No. 7,854,310; Petition for Inter Partes Review; dated Jun. 3, 2016 (70 pages).
International Preliminary Report on Patentability and Written Opinion issued on application No. PCT/IB2006/054574, dated Mar. 10, 2009.
International Preliminary Report on Patentability and Written Opinion issued in application No. PCT/US2010/047906, dated Mar. 6, 2012.
International Preliminary Report on Patentability and Written Opinion issued on application No. PCT/US2010/047907, dated Mar. 6, 2012.
*Duncan Parking Technologies, Inc. v. IPS Group Inc.*; Case IPR2016-00067; Patent Owner's Mandatory Notices dated Nov. 6, 2015 (4 pages).
International Search Report issued on application No. PCT/CA2012/000191, dated Jun. 20, 2012.
International Search Report issued in application No. PCT/CA2007/001266, dated Apr. 21, 2008.
International Search Report issued in application No. PCT/CA2009/001657, dated Feb. 17, 2010.
International Search Report issued in application No. PCT/IB2006/054574, dated Oct. 27, 2008.
International Search Report issued in application No. PCT/US2010/047906, dated Mar. 30, 2011.
International Search Report issued in application No. PCT/US2010/047907, dated Apr. 26, 2011.
International Search Report issued in application No. PCT/US2012/048190, dated Jan. 22, 2013.
International Search Report issued in application No. PCT/US2013/021201, dated Apr. 30, 2013.
International Search Report issued in application No. PCT/US2012/037205, dated Oct. 4, 2012.
International Search Report issued in application No. PCT/US2012/037229, dated Jan. 28, 2013.
International Preliminary Report on Patentability and Written Opinion issued in application No. PCT/CA2012/000191, dated Sep. 3, 2013.
International Search Report and Written Opinion issued in application No. PCT/CA2016/050927, dated Nov. 25, 2016.
International Search Report and Written Opinion issued in application No. PCT/CA2016/050928, dated Oct. 12, 2016.
International Search Report issued in application No. PCT/CA2009/001058, dated Nov. 12, 2009.
Office Action issued in U.S. Appl. No. 29/477,329, dated May 22, 2015.
Office Action issued in U.S. Appl. No. 13/141,977, dated May 28, 2015.
Office Action issued in U.S. Appl. No. 13/468,881, dated Sep. 4, 2013.
Office Action issued in U.S. Appl. No. 14/811,641, dated Oct. 5, 2016.
Office Action issued in U.S. Appl. No. 14/979,104, dated May 5, 2016.
Office Action issued in U.S. Appl. No. 29/455,221, dated Jan. 13, 2014.
Office Action issued in U.S. Appl. No. 14/864,170, dated Apr. 19, 2017.
Office Action issued in U.S. Appl. No. 14/864,170, dated Oct. 7, 2016.

(56) References Cited

OTHER PUBLICATIONS

Office Action issued in U.S. Appl. No. 15/160,646, dated Apr. 14, 2017.
Office Action issued in U.S. Appl. No. 14/325,134, dated Jul. 21, 2015.
*Duncan Parking Technologies, Inc.* v. *IPS Group Inc.*; Case: To Be Assigned; Petition For Inter Partes Review; dated Jun. 3, 2016 (79 pages).
*Duncan Parking Technologies, Inc.* v. *IPS Group Inc.*; Case: IPR2016-00067; Petition For Inter Partes Review; dated Oct. 22, 2015 (66 pages).
*Duncan Parking Technologies, Inc.* v. *IPS Group Inc.*; Case: IPR2016-00068; Petition For Inter Partes Review; dated Oct. 22, 2015 (64 pages).
*Duncan Parking Technologies, Inc.* v. *IPS Group Inc.*; Case: IPR2016-00069; Petition For Inter Partes Review; dated Oct. 22, 2015 (67 pages).
*Duncan Parking Technologies, Inc.* v. *IPS Group Inc.*; Case: IPR2016-00070; Petition For Inter Partes Review; dated Oct. 22, 2015 (61 pages).
Request for Continued Examination, dated May 31, 2012 in U.S. Appl. No. 12/973,109 (3 pages).
Request for Continued Examination, dated Mar. 30, 2012 in U.S. Appl. No. 12/355,734 (3 pages).
Request for Continued Examination, dated Sep. 27, 2011 in U.S. Appl. No. 12/059,909 (1 page).
Supplementary European Search Report issued in application No. EP 07784953, dated Jul. 1, 2010 (1 page).
Duncan Solutions—Eagle CK brochure, 2013 (2 pages).
Written Opinion issued in application No. PCT/CA2012/000191, dated Jun. 20, 2012 (5 pages).
Duncan Solutions—Eagle 2100 brochure, 2013 (2 pages).
On-street Parking Automatic Toll Collector System Proposal For Jinan City dated May 2005 (41 pages).
DAT Self-service System Limited, User Manual for DAT Focus Meter, Version 1.0, Date: May 2005, pp. 1-39 (39 pages) (no translation).
Photo Violation Technologies—Revolutionizing the Industry by Perfecting How People Park, https://web.archive.org/web/20060813094459/http://photoviolation.com/, Aug. 13, 2006 (65 pages).
Photo Violation Technologies—Revolutionizing the Industry by Perfecting How People Park, https://web.archive.org/web/20060823100739/http://photoviolation.com/, Aug. 23, 2006 (68 pages).
Photo Violation Technologies—Revolutionizing the Industry by Perfecting How People Park, https://web.archive.org/web/20080222104246/http://photoviolation.com/, Feb. 22, 2008 (47 pages).
Photo Violation Technologies—Revolutionizing the Industry by Perfecting How People Park, https://web.archive.org/web/20060110041849/http://photoviolation.com/, Jan. 10, 2006 (57 pages).
Photo Violation Technologies—Revolutionizing the Industry by Perfecting How People Park, https://web.archive.org/web/20060715195511/http://photoviolation.com/, Jul. 15, 2006 (49 pages).
Photo Violation Technologies—Revolutionizing the Industry by Perfecting How People Park, https://web.archive org/web/20070628195927/http://photoviolation.com/, Jun. 28, 2007 (49 pages).
Photo Violation Technologies Corp., https://web.archive.org/web/20040401225217/http://photoviolation.com/, Apr. 1, 2004 (50 pages).
Photo Violation Technologies Corp., https://web.archive.org/web/20131118213440/http://photoviolation.com/, Nov. 18, 2013 (8 pages).
YouTube video, "The PhotoViolationMeter TM" https://www.youtube.com/watch?v=YEFuebnwn_Y, Dec. 15, 2006 (2 pages).
Bridge IR Goup, Inc., Changing the Way the World Pays for On-Street Parking, Research Report, United States—Technology Processing Systems/Products, Dec. 6, 2006 (23 pages).
Barefoot, D., "There'll be lies, there'll be tears, a jury of your peers," DarrenBarefoot.com: Dec. 2005, pp. 8-9 (39 pages).
Photo Violation Technologies Corp.—Products, Oct. 2, 2015 (3 pages).
Photo Violation Technologies Corp. Press Releases, Jul. 18, 2005-Jan. 17, 2006 (9 pages).

The Patented PhotoViolationMeter Solution book view, dated Mar. 28, 2006—Part 1 of 2 (12 pages).
PhotoViolationMeter pamphlet, dated Jan. 18, 2006 (2 pages).
The PhotoViolationMeter Case Study, Photo Violation Technologies Corp., Dec. 15, 2005 (4 pages).
Transcript & Screenshots of https://web. archive.org/web/20080222104246/http://www.photoviolation.com/videos/HHU.wmv, Photo Violation Technologies Corp.—"PhotoViolationHandHeldUnitTM," dated prior to Jun. 15, 2015 (7 pages).
Transcript & Screenshots of https://web.archive.org/web/20080222104246/http://www.photoviolation.com/videos/PBS.wmv, Photo Violation Technologies Corp.—"The PDS Solution," dated prior to Jun. 15, 2015 (10 pages).
Transcript & Screenshots of https://web.archive.org/web/20080222104246/http://www.photoviolation.com/videos/PVM.wmv, Photo Violation Technologies Corp.—"The PVM Solution," dated prior to Jun. 15, 2015 (17 pages).
Transcript & Screenshots of https://web.archive.org/web/20080222104246/http://www.photoviolation.com/videos/PCM.wmv, Photo Violation Technologies Corp.—"ParkCardMeter TM System," dated prior to Jun. 15, 2015 (6 pages).
Byrd, Dennis, "City officials plug solar-powered parking meters, Electronic eye ends free parking," Lawrence Journal World, Apr. 30, 1989, p. 11C (1 Page).
Anonymous, "The Originators of Metered Parking, Series II, APM-E Mechanism, Service Manual," POM Incorporated, May 23, 2006 revision (22 pages).
POM APM Solar Powered Meter advertisements, dated Apr. 28, 2010 (5 pages).
CWT MAX Single/Dual Space Meter, Technical Data, May 18, 2016 (4 pages).
Digital Payment Technologies—LUKE brochure, dated prior to Jun. 15, 2015 (4 pages).
Digital Payment Technologies, Request for Proposal #B09030—Parking Pay Stations, City of Dover, New Hampshire, Oct. 22, 2008 (part 1; 110 pages).
Digital Payment Technologies, Request for Proposal #B09030—Parking Pay Stations, City of Dover, New Hampshire, Oct. 22, 2008 (part 2; 160 pages).
Digital Payment Technologies, Technologies Launches Luke II Multi-Space Parking Pay Station, May 16, 2011 (3 pages).
Digital Payment Technologies—LUKE website, https://web.archive.org/web/20061025094839/http:www.digitalpaytech.com/luke.html, Oct. 25, 2006 (5 pages).
The Patented PhotoViolationMeter Solution book view, dated Mar. 28, 2006—Part 2 of 2 (12 pages).
"Happy Anniversary, First Parking Meter Installed Jul. 16, 1935", TheExpiredMeter.com, Jul. 16, 2009, 10pgs.
"An Excerise in Changing the Business: Advertising Vending Machines", Jim Bonfield, www.adweek.com/agencyspy, Feb. 7, 2008,4 pgs.
Duncan Solutions Brochure, "Single-Space Meters: Smart technology for true system integration and intelligent parking management", www.duncansolutions.com, Apr. 2006, 2 pgs.
"Technology breakthrough counters abuse of disabled parking", Scoop Media, Press Release: Car Parking Technology, New Zealand, Dec. 7, 2011,1 pg.
"The PhotoViolation Meter TM", YouTube Video, https://www.youtube.com/watch?v=YEFuebnwn_Y, Dec. 15, 2006.
Digital Payment Technologies, "Technologies Launches Luke II Multi-Space Parking Pay Station", Source: Marketwire News Releases, May 16, 2011 (3 pgs).
Photo Violation Technologies CorpTM; "The Patented PhotoViolationMeterTM Solution" book view; dated Mar. 28, 2006 (12 pgs).
Transcript & Screenshot of Photo Violation Technologies Corp.—"PhotoViolationHandHeldUnit™", (7 pgs).
Transcript & Screenshot of Photo Violation Technologies Corp.—"The PBS Solution," (10 pgs).
Transcript & Screenshot of Photo Violation Technologies Corp.—"The PVM Solution," (17 pgs).
No change for car park charge—Just RingGo.pdf.

(56) References Cited

OTHER PUBLICATIONS

Parking Pay Stations—Cocoa Beach, FL—Official Website.pdf.
SEDADI Card & Coin Meter Lease—City of LA—Nov. 29, 2010 (4pgs).
IPS_Group_Inc_Vehicle_Detection_Sensors_6_pgs_webpage.
The_Klinghardt_Brain_Solutions_Protocol_Klinghardtinstitute_com_2_pgs.
EBAY_listing_AMANO_MCGANN_MSM_METRIC_ELITE_LS_SOLAR_2022.
Nebraska_Innovation_Campus_Additional_way_to_pay_metered_street_parking_at_NIC_2022.
SEDADI_Card_and_Coin_Meter_Lease_City_of_LA_Nov_29_2010_4pgs.
No_change_for_car_park_charge_Just_RingGo_July_6_2017.
Parking_Pay_Stations_Cocoa_Beach_FL_Official_Website.
ALIBABA_com_Ticket_Dispenser_Parking_Management_System_Auto_Pay_Station_Product_12_pgs.pdf.
IPS_Group_com_M5_Single_Space_Smart_Meter_2022_2_pgs.pdf.
IPS_Group_com_Vehicle_Detection_Stereoscopic_Smart_Sensors_2022_2_pgs.pdf.
Made_in_China_Pay_Station_for_Payment_Parking_Meter_with_Solar_3_pgs.
PAR_KUT_com_Pay_Station_Shelters_3_pgs.
GARRA_et_al_A_Privacy_Preserving_Pay_by_Phone_Parking_System_2017_10pgs.
R_Maitra_Payphones_Parking_Meters_Vending_Machines_Feb_2001.

* cited by examiner

SINGLE SPACE PARKING METER

TECHNICAL FIELD

The current disclosure relates to single space parking meters and in particular to single space parking meters that may be retrofit to existing coin vault housings.

BACKGROUND

Traditional single space parking meters comprise a number of components. The metering functionality is provided by a meter mechanism that is received within a protective lower housing. An upper housing may be secured to the lower housing to retain the meter mechanism within the protective housing. These protective housing components are traditionally made of either a lighter weight cast metal such as ZAMAC which is an alloy made of Zinc Aluminum Magnesium and Copper or of a much heavier cast ductile iron. The lower housing is secured on top of a coin vault housing that contains a coin canister that stores coins inserted into the parking meter. Earlier models of coin vault housings were made of light weight ZAMAK; however, as parking has increased in cost, to provide more security to the cash in the coin vault municipalities have replaced most of these light weight alloy coin vault housings with a heavier model made out of ductile cast iron. The functionality of the parking meter may be updated by replacing the meter mechanism while retaining the housing components.

Most upgrades or retrofits to these traditional single space parking meters are based and/or rely upon the use of the existing metal casings or housings. This retrofit approach potentially can save a city or municipality on overall retrofit cost, as they only need to purchase the internal parking meter mechanism that will fit into these existing metal housings.

Notwithstanding the advantages of using the existing traditional meter housing that the parking meter mechanism is typically placed into, such traditional housing acts as a constraint on which and how features may be offered in a newer electronic parking meter and how such features may be offered. Features in this regard include, but are not limited to, display, customer input/interaction, power generation and storage, wireless communications, and payment-related features. Often the above features included in electronic parking meter retrofits which involve traditional housings are constrained, limited or compromised in some fashion by the physical constraints of existing traditional housings. For example a traditional housing can restrict the placement and size of a number of components, including a display, user input buttons or controls, a solar panel, a battery, and payment devices. Integrating new features into a smaller constrained space also introduces serviceability challenges. Traditional single space parking meter housings are further restricted by their requirement to provide a method to interlock with and secure the parking meter mechanism within the existing traditional lower housings. Retrofit solutions which introduce a new electronic parking meter that reuses part of the existing physical meter housing may also introduce a new housing cap, cover or other panel-like component to secure and protect the new parking meter mechanism while attempting to increase available space or add new meter features. These housing caps, covers, or panels may add additional weight to the retrofit solution, and may unintentionally introduce gaps, or tolerance sloppiness such that the retrofit solution does not offer the same level of physical security as provided with the original housing cap or cover.

The traditional metal housings being primarily made of cast iron or other metal alloys offer more than adequate security to the meter mechanism; however, they are also quite heavy to transport and costly to repair or replace. Most traditional metal housings must be painted regularly, as exposed metals will rust and oxidize over time, and will require attention or eventual replacement. Rust stains in this regard represent an unsightly streetscape to the parking public. Simply replacing the old meter mechanism with new meter technology which is placed into an existing traditional housing that may be worn, rusty, or heavily weathered does little to improve public confidence or bring attention to the new and improved meter mechanisms that may be placed inside.

Further, if the meter mechanism has to be removed and a replacement meter mechanism is not available, the open housing is exposed to the elements and vandalism, and, furthermore, exposed metal edges of the open housing pose an injury risk to the public.

An electronic parking meter, including protective housing, that offers advantages over previous electronic parking meter retrofit and housing approaches, and that is not constrained to use an existing lower housing of a single space parking meter, is desirable.

SUMMARY

In accordance with the present disclosure, there is provided a single space parking meter for retrofitting onto an existing coin vault housing, the parking meter comprising: a saddle plate adapted to be received over a portion of the existing coin vault housing; and a parking meter assembly comprising: parking meter components for metering parking time; a rear cover; a front cover separable from the rear cover; a bottom plate adapted to releasably secure to the saddle plate; and a locking mechanism adapted to secure the front cover and rear cover together and secure the bottom plate to the saddle plate.

In accordance with a further embodiment of the parking meter, the rear cover is attached to the bottom plate to form a rear assembly.

In accordance with a further embodiment of the parking meter, the parking meter components are coupled to the front cover to form a front assembly.

In accordance with a further embodiment of the parking meter, the front assembly is slidably engageable with the rear assembly.

In accordance with a further embodiment of the parking meter, the rear assembly comprises one or more rails on which the front assembly is slidably engageable.

In accordance with a further embodiment of the parking meter, the one or more rails are located on edges of the rear cover.

In accordance with a further embodiment of the parking meter, one or more rail guides of the front assembly are slidably engageable with the rear assembly.

In accordance with a further embodiment of the parking meter, the one or more rail guides of the front assembly are formed as separate components and attached to the edges of the front cover of the front assembly.

In accordance with a further embodiment of the parking meter, the locking mechanism prevents the front assembly from sliding relative to the rear assembly when the locking mechanism is engaged.

In accordance with a further embodiment of the parking meter, the locking mechanism is attached to a lower lock plate attached to the front assembly.

In accordance with a further embodiment of the parking meter, the locking mechanism is attached to a lower lock plate attached to the rear assembly.

In accordance with a further embodiment of the parking meter, the bottom plate comprises an elevated overhang extending upwards through the lower lock plate when the parking meter is assembled, and wherein the locking mechanism comprises at least one moveable arm positioned under the elevated overhang in a locked position to secure the front assembly to the rear assembly.

In accordance with a further embodiment of the parking meter, wherein the saddle plate is secured to the existing coin vault housing using a plurality of bolts having a non-threaded portion extending away from the saddle plate when secured and having a large diameter head.

In accordance with a further embodiment of the parking meter, the bottom plate comprises a plurality of key holes having a large diameter opening aligned with the large diameter head of the bolts securing the saddle plate to the coin vault housing, the key holes further comprising a smaller diameter opening extending from the larger diameter opening to allow the non-threaded portion of the bolts to be received when the bottom plate is rotated or twisted, the large diameter head of the bolts preventing the bottom plate from separating from the saddle plate when the non-threaded portion of the bolts is received in the smaller diameter opening.

In accordance with a further embodiment of the parking meter, the locking mechanism prevents rotation of the bottom plate relative to the saddle plate when engaged.

In accordance with a further embodiment of the parking meter, the locking mechanism interferes with the saddle plate to prevent the rotation of the bottom plate.

In accordance with a further embodiment of the parking meter, the front assembly and the rear assembly when secured together provide a protective housing having a generally cylindrical shape.

In accordance with a further embodiment of the parking meter, the front cover comprises a flat recessed portion providing a location for user interaction components.

In accordance with a further embodiment of the parking meter, the user interaction components comprise a display for presenting information to a user and one or more input controls allowing the user to interact with the parking meter.

In accordance with a further embodiment of the parking meter, the display and input controls are provided by a touch screen display.

In accordance with a further embodiment of the parking meter, the user interaction components further comprise one or more payment means.

In accordance with a further embodiment of the parking meter, the payment means comprises a coin chute for receiving coins of different denominations.

In accordance with a further embodiment of the parking meter, the payment means comprises a magnetic stripe and/or chip card reader for receiving payment information from a payment card.

In accordance with a further embodiment of the parking meter, the payment means comprises a contactless payment reader for receiving payment information from a contactless payment device.

In accordance with a further embodiment of the parking meter, an antenna for the contactless payment reader is located within the flat recessed portion of the front cover.

In accordance with a further embodiment of the parking meter, the antenna for the contactless payment reader surrounds at least a portion of, or is in close proximity to, the display.

In accordance with a further embodiment of the parking meter, the antenna for the contactless payment reader is located on a portion of the front cover transitioning from the flat recessed portion of the front cover to the generally cylindrical portion of the front cover.

In accordance with a further embodiment of the parking meter, wherein the front cover comprises a cylindrical recess at a top of the parking meter assembly.

In accordance with a further embodiment, the parking meter further comprises a solar panel located within the cylindrical recess.

In accordance with a further embodiment of the parking meter, an arcuate portion of the cylindrical recess is further recessed to form an antenna recess.

In accordance with a further embodiment, the parking meter further comprises a cellular antenna located within the antenna recess.

In accordance with a further embodiment of the parking meter, the front assembly comprises a battery compartment for receiving at least one battery.

In accordance with a further embodiment of the parking meter, the battery compartment comprises a primary battery compartment and a secondary battery compartment.

In accordance with a further embodiment of the parking meter, the battery compartment is pivotally attached to the front assembly to allow the battery compartment to pivot outwards to provide access to the batteries.

In accordance with a further embodiment of the parking meter, the battery compartment comprises a latching mechanism for preventing the battery compartment from pivoting outwards unintentionally.

In accordance with a further embodiment of the parking meter, the rear cover is formed from an extrusion.

In accordance with a further embodiment of the parking meter, the rear cover is formed out of folded stainless steel.

In accordance with a further embodiment of the parking meter, one or more of the rear cover, the front cover, and the bottom plate are formed from injection molded plastic.

In accordance with a further embodiment of the parking meter, wherein one or more of the rear cover, the front cover, and the bottom plate are formed from injection molded polycarbonate co-polymer resins.

In accordance with a further embodiment of the parking meter, the bottom plate is attached to the rear cover by a plurality of threaded bolts or rods passing through the bottom plate and extended cylindrical extrusions on the rear cover.

In accordance with a further embodiment of the parking meter, the bottom plate and rear cover are formed out of stainless steel and welded together.

In accordance with a further embodiment of the parking meter, the bottom plate is made from injection molded plastic, the rear cover is formed out of stainless steel and the bottom plate is attached to the rear cover by using bolts through a series of mounting holes that align to the stainless steel rear cover.

In accordance with a further embodiment of the parking meter, wherein the saddle plate comprises: a lower profile matching an upper profile of the existing coin vault housing; an upper profile matching a lower profile of the parking meter assembly; and a transition section transitioning from the lower profile to the upper profile.

In accordance with a further embodiment of the parking meter, the saddle plate is rigidly and fixedly attached to the coin vault housing and the parking meter assembly is rotatably engageable with the saddle plate.

In accordance with a further embodiment of the parking meter, a plurality of bolts secure the saddle plate to the coin vault housing, and the bottom plate comprises a plurality of key holes engageable with the plurality of bolts when the parking meter assembly is rotated.

In accordance with a further embodiment, the parking meter further comprises a solar panel assembly that is removably engageable with the parking meter assembly, wherein the solar panel assembly comprises a solar panel.

In accordance with a further embodiment of the parking meter, the solar panel is rotatably adjustable.

In accordance with a further embodiment of the parking meter, the solar panel can be vertically angled or sloped to two or more different positions.

In accordance with the present disclosure, there is further provided a single space parking meter assembly for retrofitting onto an existing coin vault assembly, the coin vault assembly comprising a coin vault housing, the parking meter assembly comprising: a locking mechanism; at least one battery for supplying power for the parking meter assembly; a display; at least one payment means for accepting payment for parking time selected from the group comprising a coin chute, a card slot and a contactless payment reader; a radio transceiver; and a protective outer covering that at least partially houses the locking mechanism, the at least one battery, the display, the at least one payment means, and the radio transceiver; and wherein the protective outer covering is rotatably or slidably engageable with the coin vault assembly when a bottom surface of the protective outer covering is positioned against or adjacent to an upper surface of the coin vault assembly, and the locking mechanism secures the protective outer covering to the coin vault assembly when the protective outer covering is engaged with the coin vault assembly.

In a further embodiment of the parking meter assembly, the existing coin vault assembly is fitted with a saddle plate adapted to be received over a portion of the coin vault housing, wherein the saddle plate is rigidly and fixedly attached to the coin vault housing, and the protective outer covering is rotatably or slidably engageable with the coin vault assembly when a bottom surface of the protective outer covering is positioned against or adjacent to an upper surface of the saddle plate.

In a further embodiment of the parking meter assembly, the protective outer covering comprises a front cover, a rear cover and a bottom plate.

In a further embodiment of the parking meter assembly, the protective outer covering comprises a front cover, a rear cover and a bottom plate, wherein the front cover and rear cover are slidably engageable with one another, and wherein the bottom plate is rotatably or slidably engageable with the coin vault assembly when the bottom plate is positioned against or adjacent to an upper surface of the coin vault assembly.

In a further embodiment of the parking meter assembly, the locking mechanism when engaged prevents rotation or sliding of the bottom plate, and prevents sliding of the front cover relative to the rear cover.

In a further embodiment, the parking meter assembly, further comprises a solar panel assembly that is removably engageable with the parking meter assembly, wherein the solar panel assembly comprises a solar panel.

In a further embodiment of the parking meter assembly, the solar panel is rotatably adjustable.

In a further embodiment of the parking meter assembly, the solar panel can be vertically angled or sloped to two or more different positions.

In accordance with a further embodiment of the parking meter, the protective outer covering is formed from injection molded plastic.

In accordance with a further embodiment of the parking meter, the protective outer covering is formed from injection molded polycarbonate co-polymer resins.

In accordance with the present disclosure, there is further provided a method for retrofitting a single space parking meter assembly onto an existing coin vault assembly, the coin vault assembly comprising a coin vault housing, the method comprising: disassembling an existing parking meter to the existing coin vault housing; rotatably or slidably engaging a protective outer covering of the parking meter assembly with the coin vault assembly when a bottom surface of the protective outer covering is positioned against or adjacent to an upper surface of the coin vault assembly; and securing by way of a locking mechanism the protective outer covering to the coin vault assembly once the protective outer covering has been engaged with the coin vault assembly.

In a further embodiment of the method, the step of rotatably or slidably engaging a protective outer covering of the parking meter assembly with the existing coin vault assembly also comprises the step of rigidly and fixedly attaching a saddle plate to the coin vault housing, wherein the saddle plate is adapted to be received over a portion of the existing coin vault housing, and the protective outer covering rotatably or slidably engages the saddle plate.

In accordance with the present disclosure, there is further provided a single space parking meter assembly comprising: a front assembly comprising: a solar panel; a radio communication component; a payment component; metering components; and a front housing to be exposed to the external environment; and a rear assembly slidably engageable with the front assembly, the rear assembly comprising: a bottom plate securable to existing parking infrastructure at a parking location; a rear housing to be exposed to the external environment wherein the rear housing is secured to the bottom plate; a lock assembly preventing relative sliding between the front assembly and the rear assembly.

In a further embodiment of the single space parking meter, the bottom plate comprises a plurality of key holes each having a large diameter opening and a small diameter opening extending from the large diameter opening, the large diameter opening sized to allow a bolt head of a bolt to pass through and the small diameter opening sized to allow a neck of the bolt to pass through but prevent the bolt head to pass through.

In a further embodiment of the single space parking meter, the key holes are aligned to allow bolt heads of securing bolts secured to the existing parking infrastructure to pass through the plurality of key holes and to allow necks of the securing bolts to enter the small openings of the respective key holes when the rear assembly is twisted, rotated or slid relative to the securing bolts.

In a further embodiment of the single space parking meter, the lock assembly comprises a vertical locking component preventing the relative sliding between the front assembly and the bottom assembly, and a rotational locking component preventing relative rotation or sliding of the rear assembly relative to the securing bolts.

In a further embodiment of the single space parking meter, wherein the rotational locking component comprises a pivotable locking arm comprising at least one protrusion, which in a locked position extends through an opening in the bottom plate into an aperture of the parking infrastructure to prevent rotation or sliding of the rear assembly.

In a further embodiment of the single space parking meter, the vertical locking component comprises a cylindrical lock secured to the bottom plate and comprising a rotatable hook that engages a locking rod of the front assembly when in a locked position to prevent relative movement between the front assembly and the rear assembly.

In a further embodiment of the single space parking meter, the vertical locking component cannot engage the front assembly if the rotational locking component is in an unlocked position.

In a further embodiment of the single space parking meter, the radio communication component comprises a removable radio module slidably engageable with the front assembly.

In a further embodiment of the single space parking meter, the removable radio module is securable to the front assembly using a thumbscrew.

In a further embodiment of the single space parking meter, the removable radio module comprises an electrical connection that mates to a corresponding connection of the front assembly when the radio module is engaged with the front assembly.

In a further embodiment of the single space parking meter, the payment component comprises one or more payment modules that are each individually securable to the front assembly.

In a further embodiment of the single space parking meter, the one or more payment modules are securable to the front assembly using thumbscrews.

In a further embodiment of the single space parking meter, the one or more payment modules comprises one or more of: a coin chute module; contact-based card reader module; and a contactless payment reader module.

In a further embodiment of the single space parking meter, the solar panel is located within a solar panel module.

In a further embodiment of the single space parking meter, the solar panel module is slidably engageable with the front housing.

In a further embodiment of the single space parking meter, one or more of the rear housing, the front housing, and the bottom plate are formed from injection molded plastic.

In a further embodiment of the single space parking meter, one or more of the rear housing, the front housing, and the bottom plate are formed from injection molded polycarbonate co-polymer resins.

In a further embodiment of the single space parking meter, the rear assembly and front assembly comprise one or more rails or rail guides, respectively, and at least one of the one or more rails or rail guides comprises one or more of: a spring-catch assembly; and, a removable or detachable rail or rail guide for allowing release, separation or detachment of the front assembly relative to the rear assembly.

In a further embodiment of the single space parking meter, the parking meter assembly further comprises a hinge joining the first and second portions and which allows rotation of the second portion relative to the first portion.

In accordance with the present disclosure, there is further provided a single space parking meter comprising: an internal mounting structure, a plurality of removable components secured to the internal structure using tool-less connectors; and a main processing board comprising a processor communicatively coupled to at least one of the removable components and providing metering functionality for a parking location.

In a further embodiment of the single space parking meter, the plurality of removable components comprises one or more of: a coin chute; a contact-based payment reader; and a contactless payment reader.

In a further embodiment of the single space parking meter, the plurality of removable components comprises: a radio communication component.

In a further embodiment of the single space parking meter, the plurality of removable components comprises: a solar panel module.

In a further embodiment of the single space parking meter, the tool-less connectors comprise thumbscrews.

BRIEF DESCRIPTION OF THE DRAWINGS

Embodiments are described herein with reference to the appended drawings, in which.

DETAILED DESCRIPTION

Figure 1:
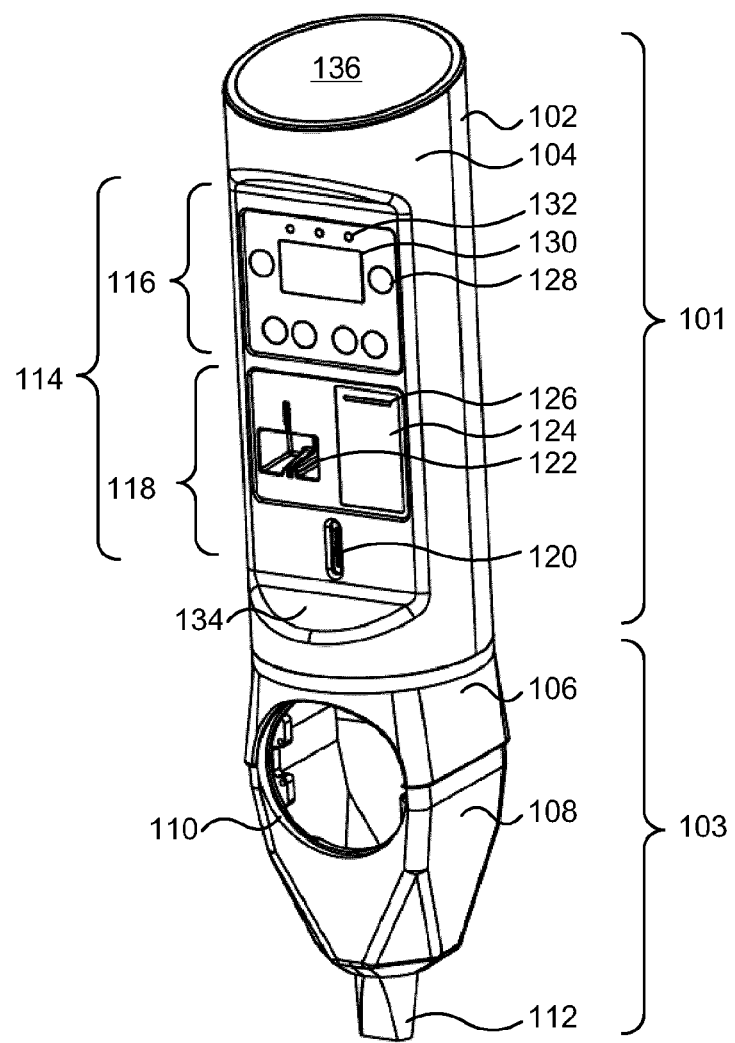
FIG. 1 depicts a front isometric view of a single space parking meter.

A single space parking meter is described that can be retrofit to an existing coin vault housing. By retrofitting the existing coin vault to fit the single space parking meter, it is possible to provide improved designs that are not constrained by having to fit a meter mechanism within an existing lower housing as with previous parking meter mechanisms. As described further herein, the retrofit parking meter comprises a saddle plate that may be mounted to the existing coin vault housing. A single space parking meter may be mounted directly to the saddle plate, and as such the design is not constrained by a meter mechanism having to be received within, or be secured to, an existing lower housing. The parking meter may comprise a rear assembly that includes a bottom plate for connecting the rear assembly to the saddle plate. A front assembly, providing the main parking meter mechanism components, may be connected to the rear assembly. The retrofit parking meter may allow an improved user interface and user experience since the parking meter mechanism is not constrained by an existing housing.

Plastic components have been used with success in single space parking meters for many years. These include some components attached to the housings and exposed to the external elements. Specific component examples include clear plastics such as Lexan for the domes or windows that cover a user display, LED indicators, or a solar panel. Additionally, internally to the parking meter, components made of molded plastic are generally widely accepted and used. Specific component examples may include coin guides, and coin reader covers and chute. However, until now the exterior housings that the meter mechanisms are placed into have traditionally been made of cast metal alloy or cast ductile iron. This was done primarily for security concerns, as plastic on or as the exterior housing was seen as being prone to UV degradation and generally inferior to an equivalent metal housing component.

There have been ongoing scientific and technological developments and advancements in plastics, particularly in the area of formulations combining polycarbonate (PC) and co-polymers. For example, Lexan EXL resin produced by Sabic is a co-polymer formulation of polycarbonate and polysiloxane resulting in plastic with extreme impact performance and low temperature ductility. Having high heat and humidity resistance characteristics, plastics such as Sabic Lexan EXL resin formulations can also include flame retardant and UV-stabilizers. Polycarbonate co-polymer resins may be used to provide parking meters, and in particular parking meter housings, that meet challenging weatherability, aging, strength, chemical resistance, flame retardance, and impact and drop test toughness requirements, even in cold outdoor environments.

In addition to providing greater flexibility for the design of a parking meter mechanism, the retrofit parking meter described herein may provide improved security and/or safety. In previous parking meters, when the parking meter mechanism is removed from the lower housing, for example for repair, and a replacement is not immediately available, an open lower housing remains on the street. The open lower housing presents a target for vandalism, which may require subsequent costly replacement of the lower housing. In the retrofit parking meter described herein, when a parking meter assembly is removed from the street, the coin vault housing remains, optionally along with the saddle plate. As such, an open lower housing is not present on the street.

Further, the current parking meter design may be manufactured using a number of techniques that improve manufacturability. For example, portions of the parking meter housing may be manufactured using metal extrusions, or formed and welded stainless steel, rather than more expensive metal or alloy castings. Further, portions of the housing or outer covering of the parking meter may be formed using high strength plastics, co-polymers and/or resins. Such plastic housing components or other parts may be made by way of injection molding. Polycarbonate co-polymer resins may be used in the parking meter components, including particularly the housing components, to provide lower cost, lighter weight, improved corrosion resistance, high strength and impact resistance components.

Further still, while the current retrofit parking meter provides greater flexibility for the design of, as well as the feature set provided by, the parking meter, the existing coin vault housing is still retained. Municipalities and cities may have a large existing investment in coin collection methods and equipment based on the use and design of existing coin vault housings and coin canisters contained therein, and as such it may be undesirable to change the coin vault housing design and/or operation.

Further as the use of coin as a payment option diminishes, some municipalities may decide to offer these same current retrofit parking meters without a coin payment option, or they may not offer this payment option in areas with high vandalism or theft. The parking public would still have multiple non-cash payment options and a standard user experience. Such non-coin payment retrofit meters may alternatively have a saddle plate that transitions directly to a pole adapter rather than to the existing coin vault housing.

Further, and unlike traditional parking meter mechanisms in which components are permanently or least semi-permanently secured, the parking meter of the present disclosure may make use of quick-connect connections for securing components, such as radio boards or modules, as well as payment components or modules, such as contact-based card readers, coin chutes, and contactless payment readers within the parking meter. The quick-connect connections may simplify the maintenance process as individual components that may have failed or malfunctioned may now be quickly and easily replaced with functioning components. Similarly, the modules or components may be easily and quickly replaced with new modules or components that provide improved performance, updated configurations or new/different features. For example, a radio module may be replaced with a new version that provides increased transmission range while reducing power consumption. The quick-connect connections may be employed so as to secure the removable components or modules to an internal structure of the single space parking meter using tool-less connectors (e.g., thumbscrews). In turn, a main processing board of the single space parking meter, which includes a processor, may be communicatively coupled to one or more of the removable components and may provide metering functionality for a parking location.

Although various retrofit parking meter designs are possible, FIGS. 1 to 17 describe details for one specific design. It will be appreciated that other specific designs, such as those described with reference to FIGS. 18-34 are possible based on the use of a saddle plate to allow a new parking meter assembly to be secured to a coin vault assembly comprising an existing coin vault housing.

Although the following description refers to single space parking meters, it is possible for the parking meters to provide metering functionality for two or more spaces. It will be appreciated that a single space parking meter refers to a style of parking meters that historically metered only a single parking space. Single space parking meters are typically located along a street and affixed to posts adjacent to the parking spaces being metered. As an example of metering multiple parking spots, a single space parking meter located on a post in between two parking spots may be configured to provide metering of the parking space located to the left of the parking meter as well as the parking space located to the right of the parking meter. Single space parking meters are typically differentiated from multi-space meters, such as pay-and-display meters, pay-by-space meters and pay-by-plate meters, by their size. Multi space meters, which are typically provided in larger cabinets, are typically located one or a few per block, or per parking area such as a parking lot. The larger cabinets of multi space meters may allow for additional peripheral equipment such as thermal type receipt or ticket printers, paper currency readers, full alpha-numeric keypads, higher capacity cash cans, and correspondingly larger batteries and solar panels. In contrast, multiple single space meters, even when metering multiple parking spots, are typically located on a single block, or parking area such as a small parking lot. The single space meters are typically much smaller in size than multi-space meters.

FIG. 1 depicts a front isometric view of a retrofit single space parking meter 100. The parking meter 100 comprises a parking meter assembly 101 that is connected to a coin vault assembly 103. The coin vault assembly 103 may comprise a saddle plate 106, which in turn may be secured to a coin vault housing 108. The coin vault housing provides an opening 110, secured by a door or covering (not shown), through which a coin vault or canister can be inserted and removed. The coin vault assembly may include or be attached to a lower protrusion 112 for use in directly securing the coin vault assembly, and indirectly the attached parking meter assembly 101, to a post or other structure. As described in further detail with reference to FIGS. 4 and 5, the saddle plate 106 is secured to the coin vault housing 108 and provides a mounting structure to which the parking meter assembly 101 may be releasably secured. Alternatively, a saddle plate may be attached to any non-coin vault housing base structure that provides a mounting structure or surface that may transition or connect to a post or other structure. In the further alternative, the parking meter embodiments described herein may, in addition to being securable to such existing parking infrastructure as a coin vault housing, be securable to other existing parking infrastructure with or without the use of a saddle plate.

The parking meter assembly 101 comprises a protective outer covering. As depicted, the protective outer covering comprises a rear cover or housing 102, a front cover or housing 104 and a bottom plate (not visible in FIG. 1). One or more of the protective outer covers may be made of high-impact plastic or polycarbonate co-polymer resins. As described further herein, the protective outer covering may engage with the coin vault assembly when a bottom surface of the protective outer covering is positioned against or adjacent to an upper surface of the coin vault assembly. The parking meter assembly further includes a number of parking meter components for providing a functioning parking meter. Particular components included in a parking meter may vary depending upon the specific requirements of a city, municipality, or other potential purchaser of parking meters. The front cover 104 and rear cover 102 may be securely joined together in order to provide a secure housing to protect the parking meter components against an external environment, including dirt, dust, rain and snow, as well as from vandalism. Although the secure housing is depicted as being provided by two interacting housing components, namely, the front cover 104 and the rear cover 102, it is contemplated that additional covers, or portions of the housing, may be provided. When in use, the rear cover 102, front cover 104, parking meter components and bottom plate are coupled together and secured to the saddle plate 106 by a locking mechanism. The locking mechanism may be provided by a single locking component securing all of the parking meter assembly components to the saddle plate. Alternatively, the locking mechanism may include a plurality of locking components. For example, one locking component may secure the rear cover 102, the front cover 104 and the bottom plate together, and a second locking component may secure the bottom plate, and as such the rest of the parking meter assembly 101, to the saddle plate 106. The separate locking components may be operated or actuated individually. Although it is possible for the individual locking components to be operated individually, it may be desirable to operate all of the locking components together. As described further with regard to FIGS. 15 and 16, a locking mechanism may be provided that operates a plurality of locking components from a single actuator, namely, a locking cylinder.

The rear cover 102 and the front cover 104 of the parking meter assembly 101 may provide a generally cylindrical appearance to or shape for the parking meter assembly. Although the appearance of the parking meter assembly 101 may be a design aesthetic that may be varied based on different design factors, a cylindrical appearance may provide a more attractive parking meter assembly than a non-cylindrical assembly. In addition to providing a visually pleasing appearance, the cylindrical shape may improve the strength of the parking meter to withstand physical attacks since the cylindrical nature of the housing eliminates, or at least reduces, the number of corners in the housing, as a corner may provide a weak point. The front cover 104 may have a recessed flat portion 114 that provides a location for user interaction. The recessed flat portion 114 may comprise an information area 116 for presenting information to a user as well as providing input controls for interacting with and controlling the parking meter assembly 101. The recessed flat portion may also include a payment area 118 for providing a plurality of different payment mechanisms. For example, a coin chute, including an opening 120 for inserting coins into the coin chute, may be provided along with a card slot 122 for accepting payment via a magnetic stripe or chip card. The card slot 122 as depicted is verticallyoriented. Optionally, the card slot may be horizontally-orientated and/or angled so as to shed away any water in the vicinity of the card slot (e.g., the card slot may be sloped downwardly in the direction away from the parking meter). The payment area 118 may also have an area 124 for making payment via a contactless payment device. The tap area 124 may include an industry-recognized logo and/or a message such as "tap here" for directing a user with respect to where the contactless payment device should be held to effect payment. The tap area 124 may also include one or more progress indicators, which may for example be a band of light emitting diodes (LEDs) 126 for providing an indication of the progress of the transaction, which may include color-based indications (e.g., green indicates a successful transaction). Although depicted as a separate tap area 124 in the payment area 118, contactless payment readers may be provided at other locations including, for example surrounding, or in close proximity to, the display 130, or on a lower non-vertical or angled surface 134 that provides a transition from the recessed flat portion 114 to the cylindrical perimeter of the front cover 104. The contactless payment readers and/or antennas therefor may alternatively be mounted such that they are attached to or mounted on top of a surface of the housing, such as on top of one or more surfaces of the front cover as opposed to being flush mounted and/or hidden behind a front cover surface(s). In this regard, a number of locations for the contactless payment reader and corresponding antenna are possible. For example: a self-contained contactless payment reader device, such as an after-market contactless payment reader device may include a built-in antenna, and may be located or mounted either behind the front cover surface or on top of the front cover surface; or, alternatively, a contactless payment reader device may be physically separate from but connected to its corresponding antenna, and either one or both of the reader and the antenna may be located or mounted either behind the front cover surface or on top of the front cover surface (such that if the antenna is mounted externally and the reader is mounted internally, there would be a connection between the two through the front cover). For instances where the contactless payment reader and/or antenna are mounted on the surface of the front cover, they may be mounted by way of bolt and/or adhesive, and the may be protected by suitable plastic or other protective covering for protection against vandalism and the elements. In the case of a contactless reader mounted on the surface of the front cover, it may extend outwardly from such surface or sit higher on the surface. The front cover 104 may be made from a polycarbonate copolymer resin, which may be substantially transparent to radio frequency (RF) signals, allowing greater flexibility in where the tap area for the contactless payment reader may be located. In addition, and depending on the layout of components, either the information (or user interaction) area 116 or payment area 118 may include a keypad (not shown) for entering information, such as a PIN or license plate number for carrying out transactions. Further, the recessed flat portion 114 that provides a location for user interaction may be illuminated with one or more lights (not shown), such as LED-type lights, that may be positioned at or near where the top of the flat portion 114 transitions from the recessed flat portion 114 to the cylindrical perimeter of the front cover 104.

As depicted in FIG. 1, the information area 116 may include one or more input controls 128 for interacting with and controlling the parking meter. For example, the input controls 128 may include buttons for increasing and decreasing an amount of time to be purchased, an OK button, a cancel button and one or more additional input controls which may be used for navigating one or more options or menus presented on a display 130. For example, if the parking meter is for two parking spots, left and right buttons may be included so that a user may indicate which spot he/she is paying for. Individual buttons may alternatively be combined into a keypad array, arranged horizontally above or below the user display or vertically to the left or right of the display.

The individual buttons and/or individual keys of a keypad array may use piezo-style switches, buttons or actuators, which are substantially or fully sealed from external environmental elements, thus making them advantageous for use in outdoor equipment. The keypad array may provide an electrical interface in the form of one or two conductors for each normally open or normally closed piezo-style switch, button or actuator in the array. Alternatively, to reduce the number of conductors, the keypad array electrical interface may use a circuit that implements a one, two or three-wire communications protocol, such as inter-integrated circuit (I2C) bus, serial peripheral interface (SPI) bus, or a custom protocol. In this regard, the number of input/output (I/O) lines or conductors required to detect switch states may be reduced or minimized. This form of electrical interface provides improved flexibility, as a keypad array with just a few buttons can use the same electrical interface as a keypad array with many buttons. For example a two-button, a six-button, or a 40-button keypad array could all be implemented using the same electrical interface. Further, reducing the number of conductors as described may also advantageously free up I/O on a meter's controller, and/or use an existing bus already used by the meter to manage other peripherals.

In addition to the display 130 for presenting information to a user, the information (or user interaction) area 116 may further include one or more status LEDs 132 for communicating a status of the parking meter at a distance. For example, the status LEDs may be used by parking enforcement personnel to determine which parking meters have expired time, have purchased time remaining, are malfunctioning, etc. without having to closely inspect the meter. The status LEDs may employ one color or more than one color in order to convey one or more statuses to parking enforcement personnel with respect to the parking meter, which, for example, may be a parking meter for a single parking spot or two parking spots. It is possible to replace the status LEDs 132 with other indications that can be understood from a distance, such as flashing of the display, or magnetic "flip dots". However, the status LEDs, particularly when flashing a low duty cycle, draw relatively very little power, and as such are preferable for remaining on for long periods of time, whereas powering the relatively large display 130, even if only flashing, may consume a significantly greater amount of power. Additionally, although depicted as separate display and input components, it is contemplated that the input controls 128 and the display 130 may be provided by a single touch screen display, which may or may not provide color graphics. Although different types of touch screen sensors may be used, the chosen technology would preferably offer relatively low power consumption, which preferably allows the touch screen sensor circuits to remain active during operational periods, even when the main display is off, so that any tap or touch to the display screen by the user will activate the meter. A touch screen display may allow some or all other user input controls to be eliminated. Alternatively, an additional touch or proximity sensor located anywhere on the meter front surface that has a relatively low power consumption may be used to detect an initial user proximity or interaction with the parking meter, which may permit the parking meter to power on additional components such as the touch screen display. The touch screen sensor would preferably be robust, resistant to abuse and vandalism, and function reliably in outdoor environments, including extreme heat and cold, as well as with a gloved finger. Although not depicted in the Figures, the parking meter may comprise a printer, including paper roll, and opening in the front cover for dispensing receipts for users upon payment of parking time.

As is well understood, single space parking meters are powered by one or more internal battery packs. The batteries may be supplemented, and/or charged, by a solar panel 136. Although other positions are possible, locating a solar panel 136 at the top of the parking meter assembly is a desirable location. While the solar panel 136 is depicted in the Figures as being in a fixed, forward sloping orientation, it will be appreciated that the cylindrical shape of the exterior housing allows for an adjustable solar panel assembly that can be rotated at the time of installation such that the solar panel may be orientated to point in any direction. Typically, the direction to be pointed is due south for the northern hemisphere. The adjustable solar panel assembly may be allowed to be adjusted to any one of two or more vertical slopes or angles relative to the horizon. Although not depicted in the Figures, the solar panel 136 at the top of the meter may also be optionally augmented with one or more additional flexible type solar panels attached to the exterior of the smooth cylindrical surface of the rear cover 102.

Figure 2:
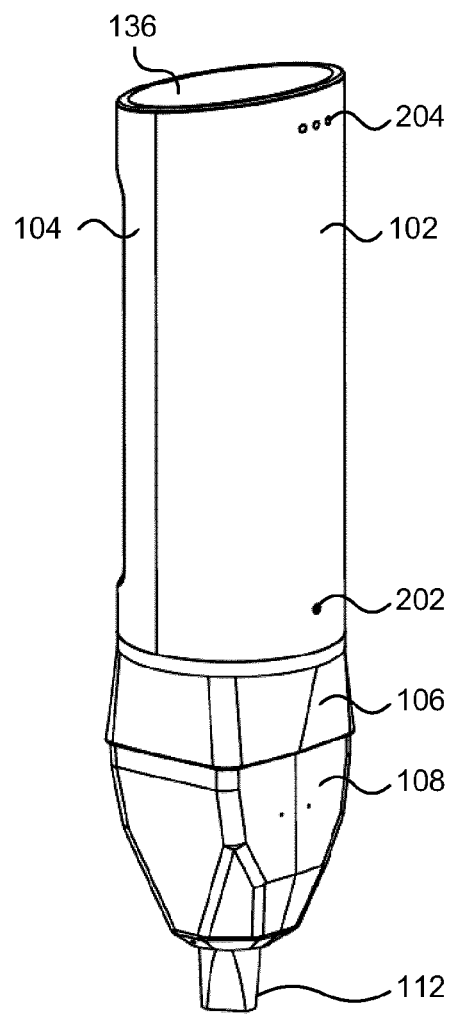
FIG. 2 depicts a rear isometric view of the single space parking meter.
Figure 3:
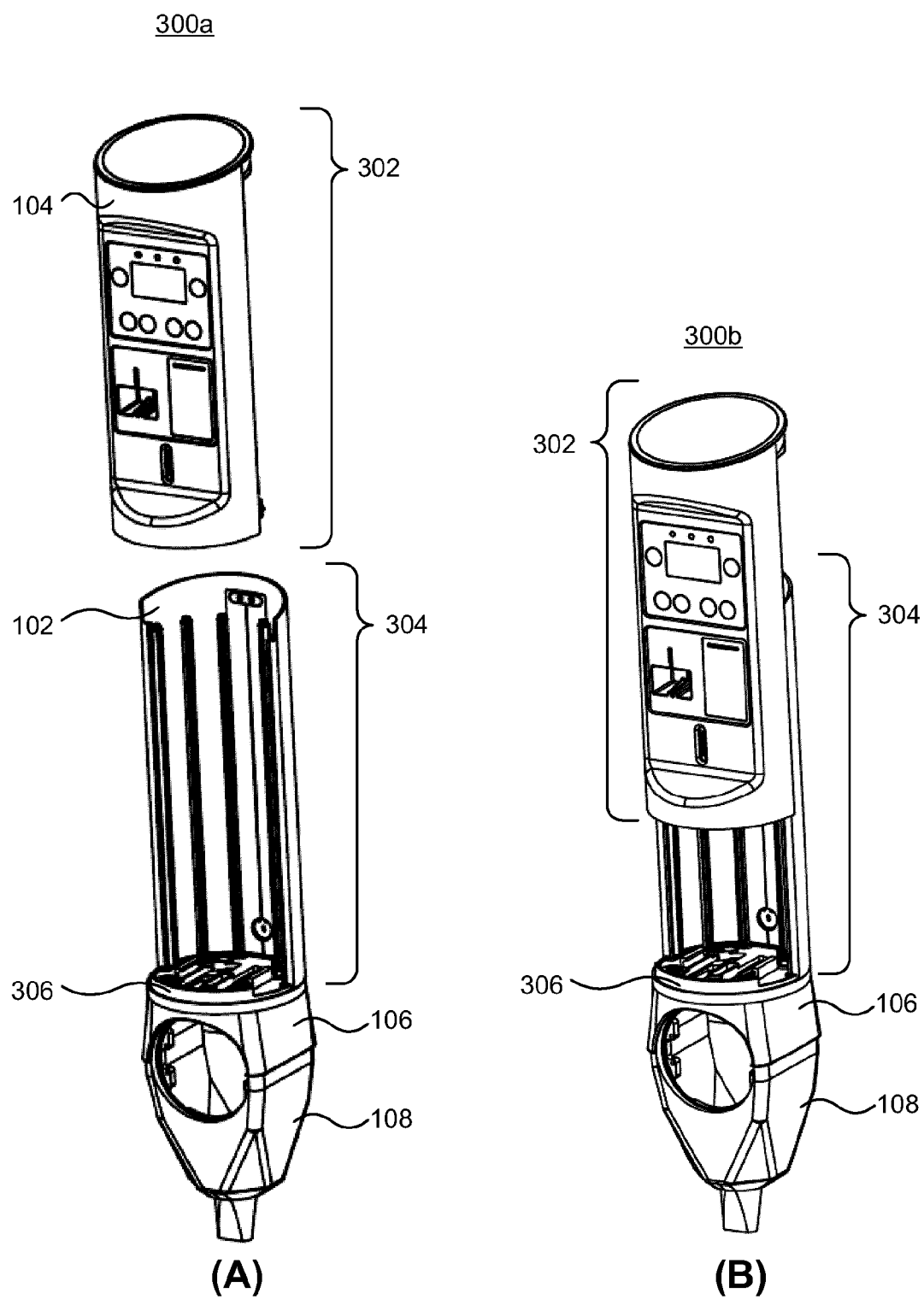
FIG. 3A depicts a front isometric view of the parking meter with the meter mechanism fully removed.
FIG. 3B depicts a front isometric view of the parking meter with the meter mechanism partially removed.

FIG. 2 depicts a rear isometric view of a single space parking meter. The parking meter 100 comprises the rear cover 102, which may be a generally smooth cylindrical extrusion. The rear cover may include one or more rear status LEDs 204. The rear status LEDs 204 may serve a similar purpose as the status LEDs 132 located on the front cover 102. The rear status LEDs 204 allow a parking enforcement agent to determine the status of the parking meter from a distance. Further, one or more of the front or rear status LEDs may be dual color type, such that the LEDs may powered by the meter control circuits and may illuminate as either red or green in colour in order to indicate a space is either expired or paid, respectively. In this fashion the parking status of a single space or multiple spaces may be readily discerned by a parking attendant observing the front or rear LEDs. While not depicted, the rear cover may also provide a clear widow that allows two or more brightly coloured and/or highly visible enforcement "flip-dots" (also known as "flip-discs"). The "flip-dots" may be magnetically energized, and each individual "flip-dot" may have a different colour on each side of it. A particular colour serves to represent a particular status of a specific parking space managed by the meter. Such "flip-dots" may be easily visible from enforcement vehicles or by walking parking attendants even in bright sunlight.

FIG. 3A depicts a front isometric view of the parking meter 300a with the meter mechanism fully removed. FIG. 3B depicts a front isometric view of the parking meter 300b with the meter mechanism partially removed. As depicted, the parking meter assembly 101 may be comprised of two sub-assemblies, namely, a front assembly 302, and a rear assembly 304. The rear assembly 304 may be secured to the saddle plate 106 as described in further detail with reference to FIGS. 5 to 9. The rear assembly 304 may comprise a bottom plate 306 and the rear cover 102, which may be secured to the bottom plate 306. The bottom plate 306 may be permanently, or semi-permanently, attached to the coin vault housing 108 or saddle plate 106. The front assembly 302 may be slidably engageable with the rear assembly 304 to allow the front assembly 302 to be removed from the rear assembly. As depicted, the front assembly 302 may be fully removed (FIG. 3A), or partially removed or partially installed (FIG. 3B). That is, the front assembly 302 may engage with and slide down or up rails or profiles of the rear assembly 304 in order to secure the front assembly 302 to the rear assembly 304. In this regard, the front assembly 302 may comprise rail guides that engage with the rails of the rear assembly 304. The rail guides of the front assembly 302 may be formed as part of the front cover 104, or may be provided as separate components that may be attached to the front cover 104. It will be appreciated that the opposite configuration—i.e., rail guides on the rear assembly and rails on the front assembly—may also be possible, and that the variations and embodiments described herein may similarly be reverse vis-à-vis the front and rear assemblies. Additionally or alternatively, the front cover of the front assembly may include side edge surfaces that provide a bearing surface that in conjunction with bearing surfaces of an internal structure of the front assembly capture the rails of the rear assembly and allow the front assembly to slide up and down the rear assembly.

The front assembly 302 may be locked to the rear assembly 304 using a locking mechanism, which may be operated via a keyhole 202 in the rear cover 102 as depicted in FIG. 2. The locking mechanism may be affixed to the rear cover and engage with and secure the front cover in the locked position, or alternatively the locking mechanism may be affixed to the front cover and engage with and secure the rear cover when in the locked position. The front assembly 302 may be removed and replaced as a complete assembly, for example, by fully raising or lifting the front assembly vertically until its bottom end clears the rails of the rear assembly. Partially or fully raising the front assembly 302 from the rear assembly 304 may be done to, for example, inspect components or perform routine maintenance such as replacing batteries or clearing card reader or coin chute blockages. The rails may provide a spring-catch assembly (not shown) that allows the front assembly 302 to be lifted and held at any one of multiple partially raised positions which allows hands free service work and testing of the meter to be carried out while in the partially raised or lifted position. Releasing the spring-catch would release the front assembly 302 allowing it to freely slide up or down on the rails or profiles. Alternatively, the front assembly 302 may be raised to a first position such that the rail guides of the front assembly 302 may be released from the rails of the rear assembly 304 at this first position, while the bottom of the front assembly 302 remains engaged with the rear assembly. Under this alternative configuration, there would also be a hinge, such as a telescoping or folded metal rod, located at a release point. For example, the hinge may be fixed at or near the top of the front assembly at one of its ends (such as at or near the top of the rail guides) and at the other end fixed at or near the top of the rear assembly (such as at or near the top of the rails). Releasing, separating or detaching the front assembly from the rear assembly at the release point allows the hinge to unfold or extend to a stopping point and the front assembly to tilt forward to a non-vertical or horizontal position. The bottom of the front assembly that remains engaged with the bottom of the rear assembly is pivotably configured at such bottom location so as to allow the front assembly to rotate forward from its vertical position to the more horizontal position. Such pivotable configuration may require that the rail guides at the bottom of the front assembly be partially releasable or hinge-able relative to the bottom of the rails and/or bottom of the rear assembly in order to allow for the rotation of the front assembly. Such rotation, which involves pivoting or hinging about an axis at the bottom location, thus allows for the back side or internally-facing components of the front assembly to be exposed for service work. The ability to raise the front assembly in this regard is advantageous for more openly exposing some or all of the internal parking meter components as compared with traditional single space parking meters. This may make repair, servicing and/or replacement of such components easier and/or quicker. With respect to the coin chute, a mirror (not shown) may be positioned just above a coin inspection slot or opening for the purpose of facilitating or making easier the inspection of the coin chute for blockages. Alternatively, payment devices may have quick release knobs allowing them to be disengaged from a normally fixed/rigid position on the front cover, such that they can be quickly and easily inspected, serviced and/or removed without the use of tools.

Figure 4:
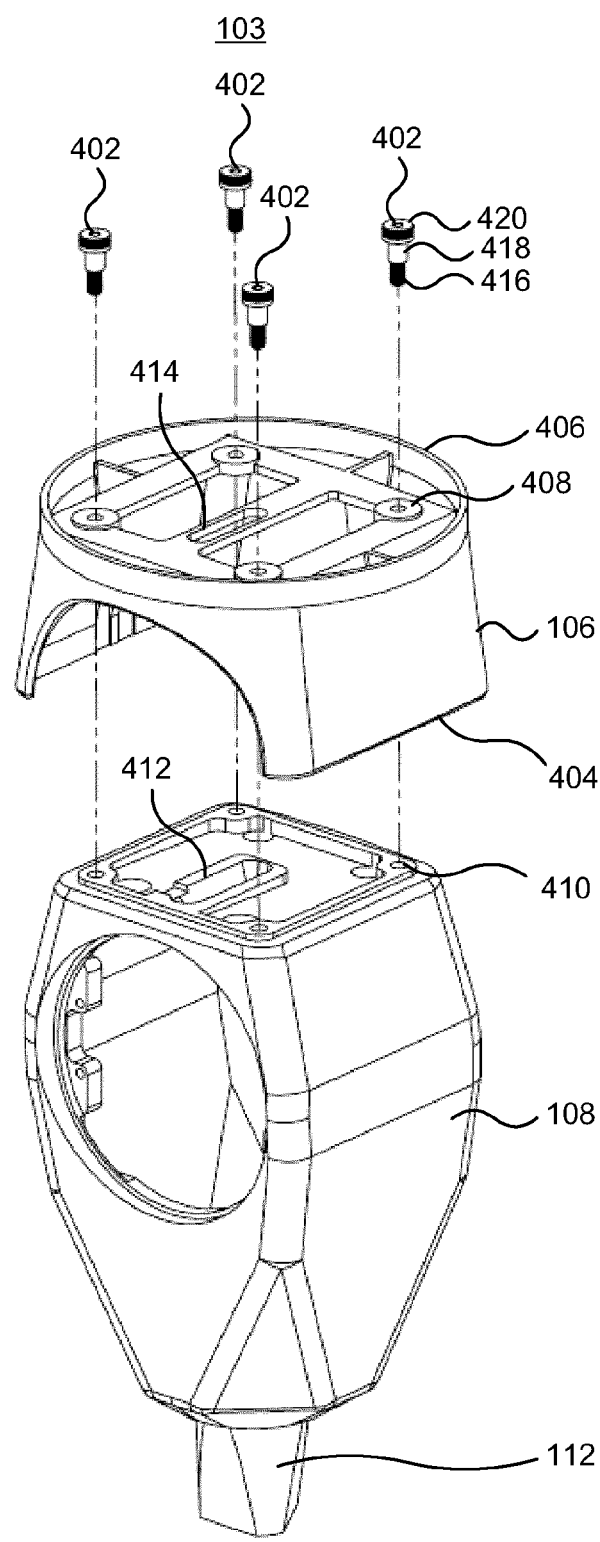
FIG. 4 depicts a front isometric view of a coin vault housing and retrofit saddle.

FIG. 4 depicts a front isometric view of a coin vault assembly 103. The coin vault assembly 103 may comprise a coin vault housing 108 and retrofit saddle plate 106. A parking meter assembly may be engaged to the coin vault assembly. The saddle plate 106 and bolts 402 allow a parking meter mechanism to be connected to existing coin vault housing 108. The saddle plate 106 can provide flexibility in designing the parking meter mechanism since it does not need to be received within, or otherwise mate with, an existing lower housing. The saddle plate 106 further allows new parking meter designs, such as the parking meter assembly 101 described herein, to operate with existing coin vault housings 108, which is beneficial since cities and municipalities, or other purchasers of parking meters, may have invested in collection equipment, such as coin carts, as well as training of coin collection agents regarding collection methods. Accordingly, it is desirable to allow new parking meter designs to function with existing coin vaults.

A bottom portion of the saddle plate 106 is adapted to fit over a top of the coin vault housing 108. In this regard, the saddle plate has a lower profile 404 that generally matches the profile of the coin vault housing. The lower profile 404 includes a cutout to allow a door (not shown) to the coin vault housing, which would be located at opening 110, to open and close thereby permitting insertion and removal of a coin vault or canister. The saddle plate 106 further comprises an upper profile 406 that generally matches a lower profile of the parking meter assembly 101. As described above, the parking meter assembly is generally cylindrical in shape, and as such the upper profile 406 of the saddle plate 106 is generally circular. The saddle plate 106 may provide a smooth transition between the lower profile 404 and the upper profile 406. In addition to providing an appealing visual appearance to the parking meter, the transition that the saddle plate may provide may also reduce potential areas of attack by vandals by presenting a smoother exposed surface.

Existing coin vault housings generally conform to a common bolt pattern used for securing a traditional lower housing to the coin vault housing. The upper surface of the coin vault housing 108 also includes a coin opening 412 through which coins can enter the coin vault housing 108. Above the coin vault housing 108, coins may pass through a corresponding coin opening 414 in the saddle plate 106. The coin vault housing 108 further has an upper surface that includes a plurality of threaded holes 410. The saddle plate 106 may include a plurality of matching holes 408 that align with the threaded holes 410 of the coin vault housing to allow the saddle plate 106 to be rigidly connected to the coin vault housing 108. It will be appreciated that while the saddle plate may be removed from the coin vault housing 108, such removal is generally considered to be infrequent. The saddle plate 106 provides a securing mechanism for securing the saddle plate 106 to the coin vault housing 108. The saddle plate 106 also provides a securing mechanism that allows the parking meter assembly 101 to be secured to the saddle plate 106, and as such to the coin vault housing 108. Although described above as two separate securing mechanisms, the two securing mechanisms may be interrelated. For example, as depicted in FIG. 4, the saddle plate 106 may be secured to the coin vault housing 108 using a plurality of bolts 402. Each of the bolts 402 may comprise a threaded portion 416 and a non-threaded portion 418 that provides a shoulder extending radially past the threaded portion 416 as depicted in FIG. 4. The bolts may be inserted through the holes 408 in the saddle plate 106 and threaded into the threaded holes 410 of the coin vault housing 108. The larger non-threaded shoulder portion 418 acts as a bolt head in securing the saddle plate 106 to the coin vault housing 108. The non-threaded shoulder portion 418 that acts as a bolt head also provides a standoff with respect to a larger diameter head 420 of bolt 402. The larger diameter head 420 may pass through corresponding large diameter holes in the bottom plate 306 of the parking meter assembly 101. Details regarding the bottom plate 306 are discussed below with respect to FIGS. 8 and 9. By placing the parking meter assembly 101 on the saddle plate 106, and twisting or rotating the parking meter assembly 101, which includes the bottom plate 306 of such assembly 101, the standoff non-threaded portion 418 of the bolts 402 may enter a smaller diameter or spaced opening of the bottom plate 306 that is connected to the larger diameter opening. The combination of the larger diameter head 420 and smaller opening will, as a result, prevent retraction or lifting of the parking meter assembly 101, including bottom plate 306. Accordingly, the bolts 402, in cooperation with matching components such as threaded holes and appropriately sized openings in the bottom plate 306 of the parking meter assembly 101, may provide both the securing mechanism for securing the saddle plate 106 to the lower housing 108 as well as the securing mechanism for securing the parking meter assembly 101 to the saddle plate 106. Securing the parking meter assembly 101 as a whole to the saddle plate 106, and having the ability to easily or quickly remove the parking meter assembly 101 as a whole from the saddle plate 106, all as described herein, is advantageous in that the typical approach of leaving behind a traditional lower housing with exposed metal edges may be avoidable.

In the alternative to having the parking meter assembly 101 be placed on the saddle plate 106 and twisted or rotated so as to prevent retraction or lifting of the parking meter assembly 101, including bottom plate 306, the parking meter assembly 101 may be secured to the coin vault housing 108 using other fastening techniques such as screws or bolts, wherein the bottom plate 306 is not rotatable in the manner as described above. In this regard, the parking meter assembly 101, including bottom plate 306, may be permanently, or semi-permanently, attached to the coin vault housing 108.

Figure 5:
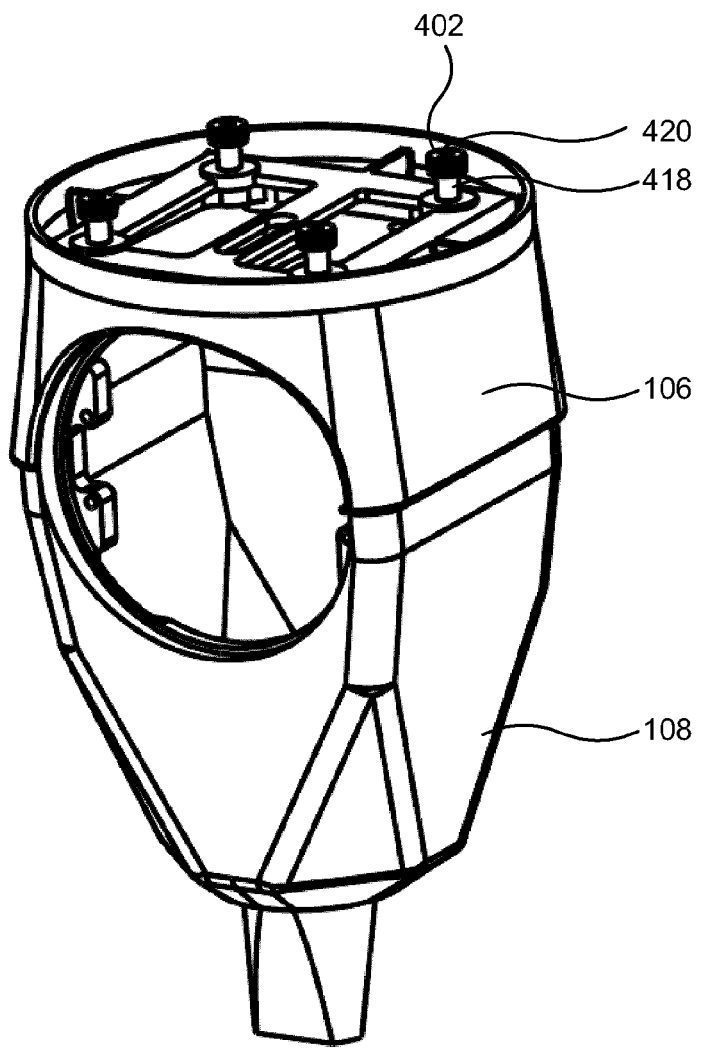
FIG. 5 depicts the retrofit saddle attached to the coin vault housing.

FIG. 5 depicts the coin vault assembly 103 comprising the retrofit saddle 106 attached to the coin vault housing 108. As depicted, the bolts 402 may be threaded into the threaded holes of the coin vault housing, and the shoulders of the non-threaded portions of the bolts 418 also secure the saddle plate 106 to the coin vault housing 108. Once fully threaded into the threaded holes of the coin vault housing 108, the non-threaded portions of the bolts 418 stand off from the saddle plate and allow a bottom plate to capture the non-threaded portion 418 in an opening. The large diameter head 420 of the bolts 402 prevents the bottom plate from being withdrawn from the saddle plate 106, including from the bolts 402. The securing mechanism for securing the parking meter assembly 101, including in particular the bottom plate 306 of the parking meter assembly 101, is described in further detail with regard to FIGS. 6 to 9.

Alternatively, the coin vault assembly may be provided without the saddle plate. By way of example only, bolts 402 as described above may be secured to the coin vault housing 108, and the parking meter assembly, including bottom plate, rear cover and front cover, may be coupled to the bolts and coin vault housing in the manner described herein. Such a parking meter assembly may or may not take a cylindrical form. Further, although referred to as a coin vault assembly, it is possible to provide an assembly that allows a parking meter assembly to be secured to a post or other structure without providing an actual housing for a coin vault. Such assemblies may be useful to allow cities or municipalities to provide similar parking meters, some of which include coin vaults and some of which do not include coin vaults. Having a mix of parking meters available may be useful for addressing areas of high vandalism or theft.

Figure 6:
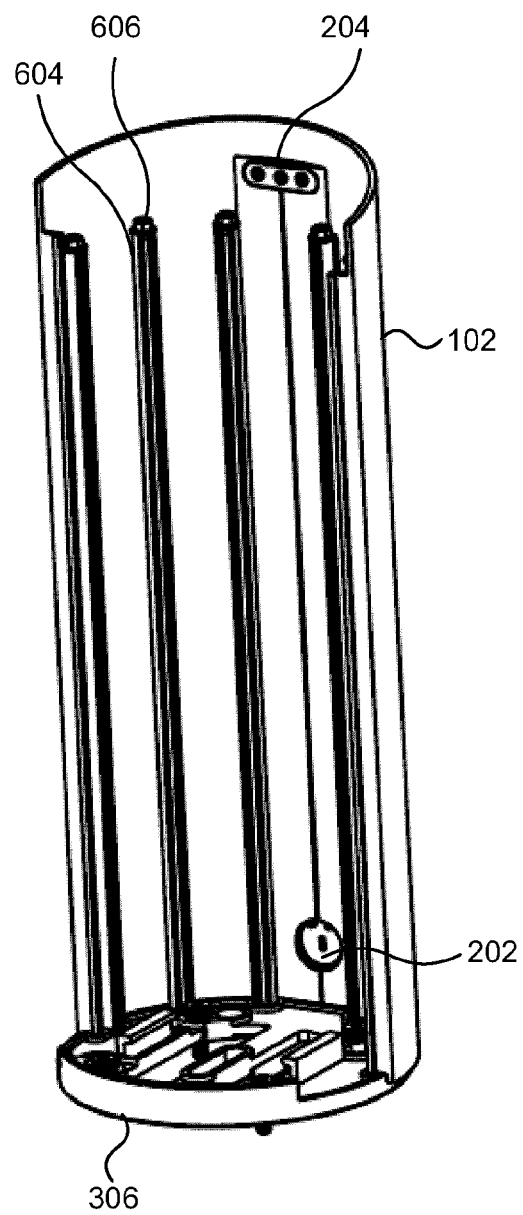
FIG. 6 depicts an isometric view of a rear assembly comprising a rear cover and bottom plate.

FIG. 6 depicts an isometric view of a rear assembly. The rear assembly 304 may comprise the rear cover 102 described above, which provides a portion of a protective housing for the parking meter, as well as the bottom plate 306. As described in further detail with reference to FIG. 6, the rear cover 102 may be formed as an extrusion that is cut to the required length and subsequently machined to provide the desired component. Alternatively the rear cover 102 may be formed from rolled and formed stainless steel. As depicted, the extrusion may include a plurality of extended cylindrical portions 604 that extend down a length of the rear cover. The extrusion may be machined to remove an upper most portion from the extended cylindrical portions 604. A bolt (not visible in FIG. 6) may extend through the bottom plate 306 and the extended cylindrical portions 604. A nut 606 may be used to secure the bolt. With the bolt secured within the extended cylindrical portion 604, the bottom plate 306 may be secured to the rear cover 102. Alternatively a rear cover 102 formed from rolled and formed stainless steel may be welded to the bottom plate 306.

Figure 7:
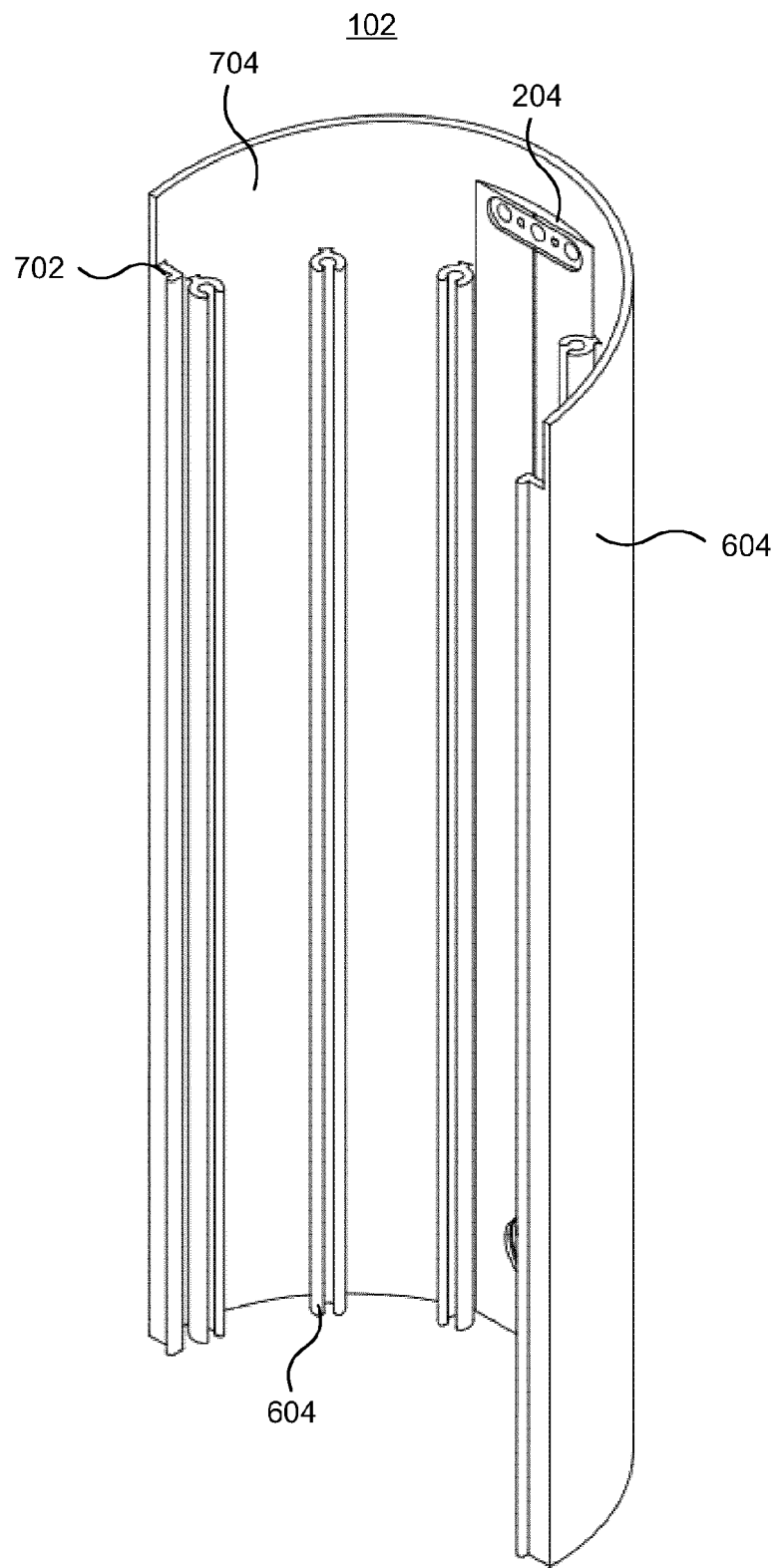
FIG. 7 depicts an isometric view of the rear cover.

FIG. 7 depicts an isometric view of the rear cover. As depicted, the rear cover 102 may be formed as an extrusion that has been machined to provide additional features. The machining may include boring a hole for a lock as well as machining a location for the rear status LEDs 204. The extrusion of the rear cover 102 includes rails, protrusions or similar structures 702 that the front assembly can engage with, and slide up and down on. The rails 702 may be located on the circumferential ends of the semi-circular rear cover 102. As depicted in FIG. 7, the extended cylindrical portions 604 may comprise a slit running the length of each extended cylindrical portion 604. The slits allow the rear cover 102 to be formed as an extrusion. An upper portion 704 of the rear cover extrusion is machined to remove an upper portion of the rails 702 and an upper portion of the extended cylindrical portions 604. The machining of the upper portion 704 of the rear cover allows the front assembly 302 to be received within the rear cover 102. While a rear cover formed as an extrusion as described above may include formed rails 702 that the front assembly can engage with, it should be recognized that equivalent rails, protrusions or structures can be created using a rear cover created from formed and folded stainless steel, or injection molded high strength plastic or polycarbonate co-polymer resins. Injection molded covers may include one or more formed vertical channels around the inside perimeter of the cylindrical wall which may accept hardened reinforcing rods that extend from the bottom plate up to the top of the cylinder. The vertical channels may take the form of extended cylindrical portions 604. The reinforcement rods may be used to augment the high strength housing, and act as a deterrent to vandal attack using hack saws, or other common cutting tools. Similar reinforcements may be applied to injection molded covers or housings in strategic areas, such as connection points, surrounding openings, or in likely points of attack by vandals. The reinforcing metal components may be inserted into formed channels, pockets, or similar structures for receiving the reinforcing components. Additionally or alternatively, the reinforcing metal components may be incorporated into the injection molded covers using an over molding technique.

Figure 8:
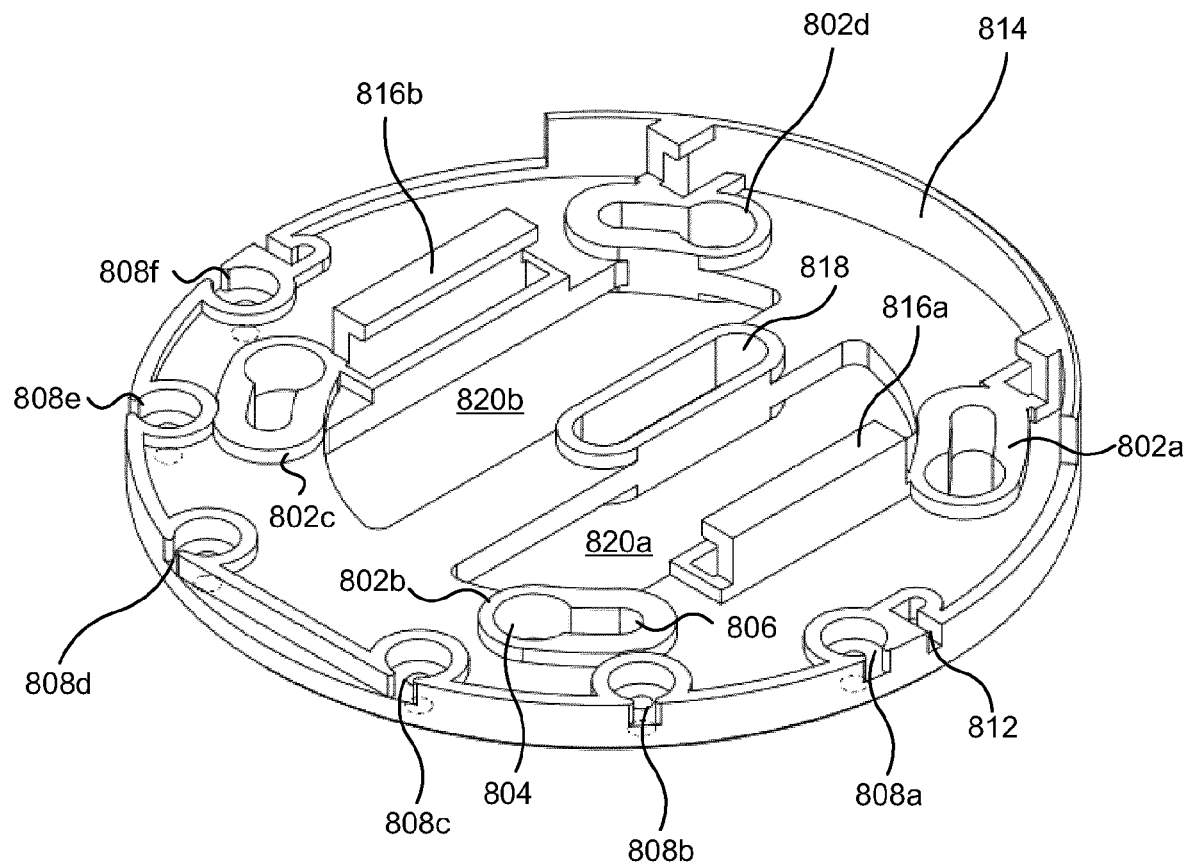
FIG. 8 depicts an isometric view of the bottom plate.

FIG. 8 depicts a rear isometric view of the bottom plate. The bottom plate 306 includes a plurality of key holes 802a, 802b, 802c, 802d (referred to collectively as key holes 802) that allow the bottom plate 306 to be secured to the saddle plate 106. Each of the key holes 802 comprise a large diameter opening 804 and an extended opening of a smaller diameter 806 connected to the large diameter opening 804. It is noted that the large diameter opening 804 and smaller diameter opening are only labeled for key hole 802b for simplicity of the Figure. As described above, the saddle plate 106 may be secured by bolts 402 that have a non-threaded portion 418 extending away from the saddle plate 106 when secured and a large diameter head 420. The large diameter head 420 of the bolts 402 can pass through the large diameter opening 804 of the key holes 802. The bottom surface of the large diameter head 420 passes over, although it may contact, the upper surface of the bottom plate 306 in the region of the key holes 802. When the bottom plate is rotated or twisted in a clockwise direction, the non-threaded portion 418 of the bolts 402 enters into the extended smaller diameter opening 806 of the key holes 802. Since the larger diameter heads 420 of the bolts 402 are larger than and therefore cannot pass through the smaller diameter openings 806 of the key holes 802, the bottom surfaces of the large diameter heads 420 engage with the upper surface of the bottom plate in the vicinity of the key holes 802 and secure the bottom plate 306 to the saddle plate 106. The upper surface of each of the key holes 802 may be machined or tapered such that the overall thickness at the end of the extended opening of a smaller diameter 806 that is away from the large diameter opening 804 is higher than at the start of the extended opening of a smaller diameter 806 (i.e., the end of the extended opening of a smaller diameter 806 that meets the large diameter opening 804), such that as the bottom plate is rotated or twisted in a clockwise direction, any clearance gap between the bottom surfaces of the large diameter heads 420 and the upper surfaces of the keyholes 802 is eliminated or minimized at or near the end of the clockwise rotation. The bottom plate 306 may be secured to the rear cover 102 by bolts or rods extending through mounting holes 808a, 808b, 808c, 808d, 808e, 808f (referred to collectively as holes 808). The holes 808 may have a recess for receiving a lower portion of the injection molded or extruded features of the rear cover 102. The bottom plate may include a raised lip 814 at the front to provide a secure mating surface at the bottom of the front cover of the front assembly. The bottom plate may further include a coin opening 818 that aligns with the coin opening 412 of the coin vault housing 108. The bottom plate is depicted with large openings 820a, 820b, which may simply reduce an amount of material required for the bottom plate. The bottom plate 306 may further include a securing component used to secure the front assembly to the bottom plate, and as such to the rear cover and rear assembly as a whole. The securing components may comprise elevated overhangs 816a, 816b that can engage with a corresponding finger, bar or similar structure of a lock to prevent vertical movement of the front assembly relative to the rear assembly, including relative to bottom plate 306. A particular lock is described further with reference to FIGS. 15 and 16.

As described above, the rear cover may include rails, protrusions or similar structures that can engage with corresponding features of the front assembly. Accordingly, the front assembly may be engaged to the rear cover 102 by sliding the front assembly down the rails 702 of the rear cover. The rear cover 102 may be secured to the bottom plate 306 by bolts or threaded rods extending through the extended cylindrical portions 604 on the interior of the rear cover 102. Alternatively, the bottom plate 306 may be welded to the rear cover 102. The bottom plate 306 may be secured to the saddle 106 plate by a twist or rotation lock mechanism on the extended bolts 402 securing the saddle plate 106 to the coin vault housing 108. Accordingly, if the bottom plate 306 is prevented from rotating, the bottom plate 306 and the attached rear cover 102 will not be able to be removed from the saddle plate 106 and coin vault housing 108. Further, if the front assembly 302 is prevented from being slid vertically on or along the rear cover rails 702, the entire parking meter assembly 101 will be rigidly secured to the existing coin vault housing 108.

While the above has described the bottom plate 306 as being secured to the saddle plate, or bolts securing the saddle plate to the coin vault housing, it is contemplated that the bottom plate 306 may be secured to a coin vault assembly that does not include a saddle plate in a similar manner. Further, the bottom plate may be secured to a mounting assembly, which may provide the same or similar mounting points as the coin vault assembly for engaging with the parking meter assembly; however, the mounting assembly may not include a coin vault housing.

Figure 9:
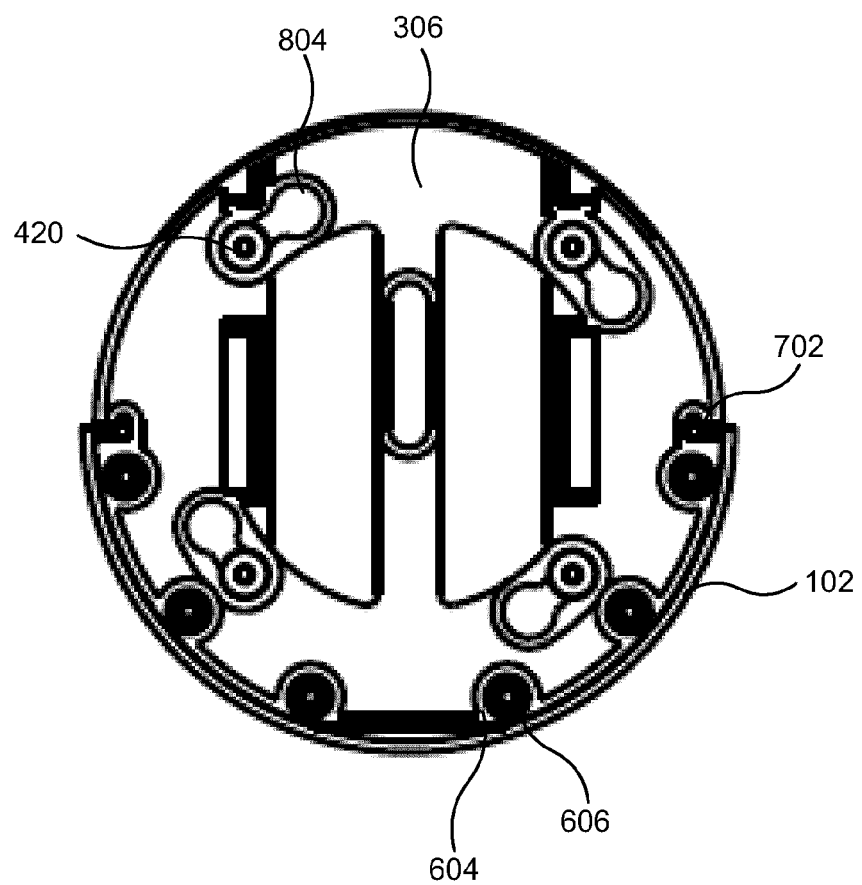
FIG. 9 depicts a top view of the rear cover and bottom plate.

FIG. 9 depicts a top view of the rear cover 102 and bottom plate 306 secured to the saddle plate 106. As depicted in FIG. 9, when the bottom plate 306 is rotated or twisted in the clockwise direction, the large diameter heads 420 of the bolts 402 secure the bottom plate 306 to the saddle plate 106. The nuts 606 secure the bolts passing through the extended cylindrical portions 604 of the rear cover 102 to the bottom plate 306. The rail like structures 702 upon which the front assembly may slidably engage are depicted in the Figure.

Figure 10:
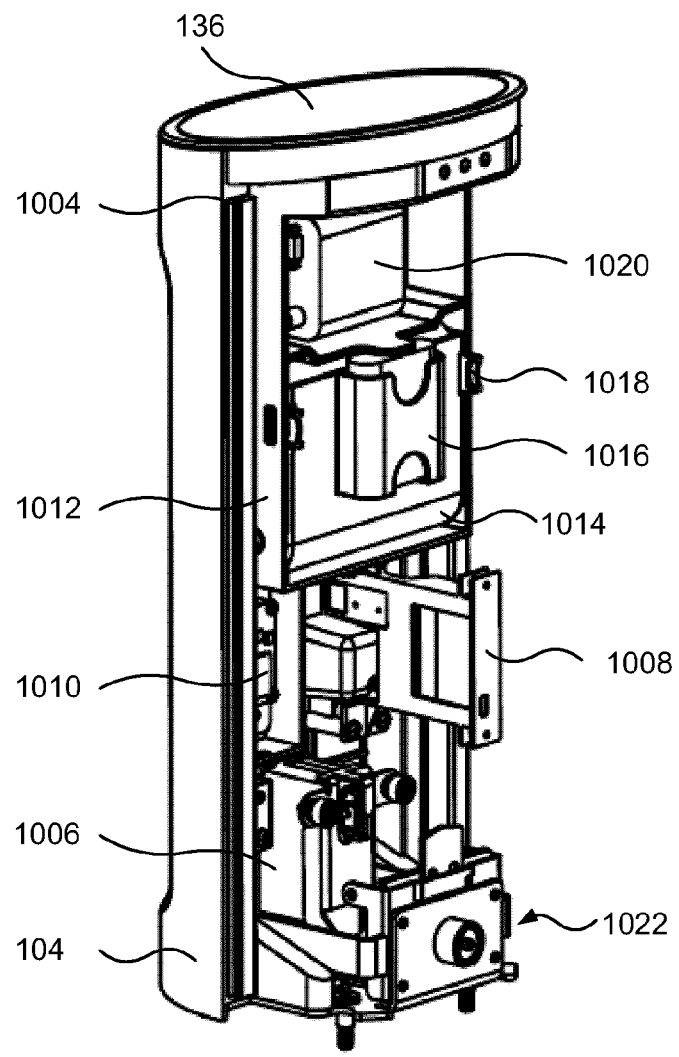
FIG. 10 depicts a rear isometric view of the parking meter mechanism.
Figure 12:
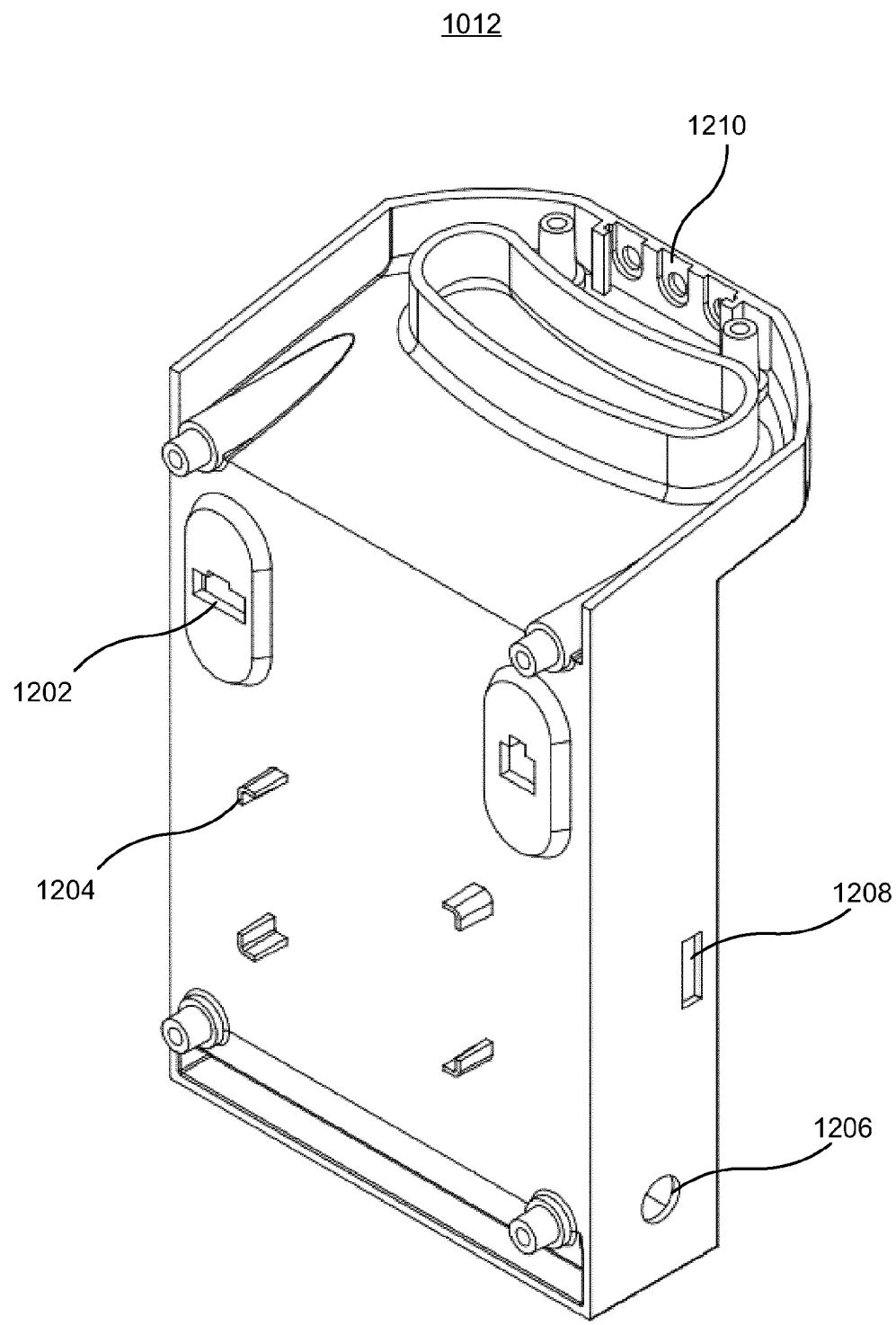
FIG. 12 depicts a front isometric view of the parking meter mechanism's inner frame.
Figure 13:
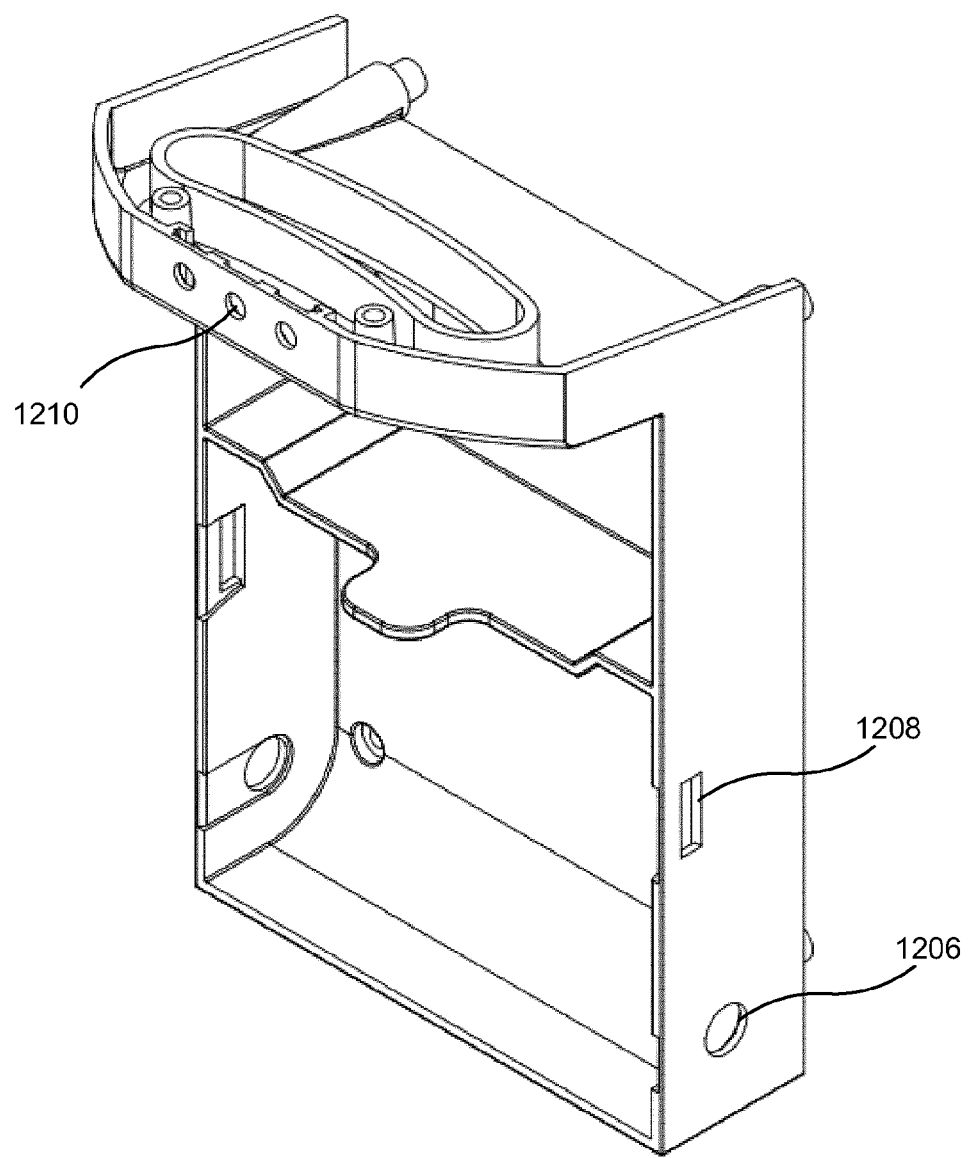
FIG. 13 depicts a rear isometric view of the parking meter mechanism's inner frame.

FIG. 10 depicts a rear isometric view of the front assembly. The front assembly 302 may provide a removable parking meter mechanism. The front assembly 302 comprises a front cover 104 and attached parking meter components. The front assembly 302 may include rail guides 1004 that engage with the rails 702 of the rear cover 102. The rail guides 1004 of the front assembly 302 may be formed as part of the front cover 104, or may be provided as separate components that may be attached to the front cover 104. If provided as separate components, the rail guides 1004 may be formed from metal and secured to the front cover by screws or bolts. In addition to providing a strong connection to the rear assembly, the engagement of the metal rails 702 with the rail guides 1004 may provide additional strength against vandalism. The front assembly 302 comprises a plurality of parking meter components mounted, either directly or indirectly, to the front cover 104. The parking meter components comprise a coin chute component 1006 that can discriminate a value of a coin inserted into the parking meter mechanism. The parking meter components may also comprise a magnetic stripe and chip card reader 1008, as well as a contactless payment reader 1010 for carrying out transactions. An inner frame 1012, which is depicted in greater detail in FIGS. 12 and 13, is mounted to the front cover 104 and may be used to mount electronic components, including, for example, a main processing board comprising a processor and associated memory for storing and executing control code to provide the desired software functionality of the parking meter. As well, a radio module or modem may be mounted to or in the vicinity of the inner frame 1012. A battery compartment 1014, described in further detail with reference to FIG. 14, may be pivotally connected to the inner frame 1012. The battery compartment 1014 may include a main battery compartment (not visible in FIG. 10) and rechargeable battery compartment 1016. The pivotally connected battery compartment 1014 may be secured in the position depicted in FIG. 10 by clasps or similar structures. The battery compartment 1014 may be released from the inner frame 1012, and so rotated outwards to allow replacement of the batteries, by pressing release tabs 1018. The front assembly 302 may further include a radio transceiver 1020 as well as a solar panel 136 located at the top of the front assembly 302. Further, the front assembly 302 may include a locking mechanism 1022 for securing the front assembly to the rear assembly 304, as well as for preventing the joined front and rear assemblies from rotating when connected to the saddle plate. Alternatively, the rear assembly 304 may include the locking mechanism 1022 for securing the front assembly 302 to the rear assembly 304, as well as for preventing the joined front and rear assemblies from rotating when connected to the saddle plate.

Figure 11:
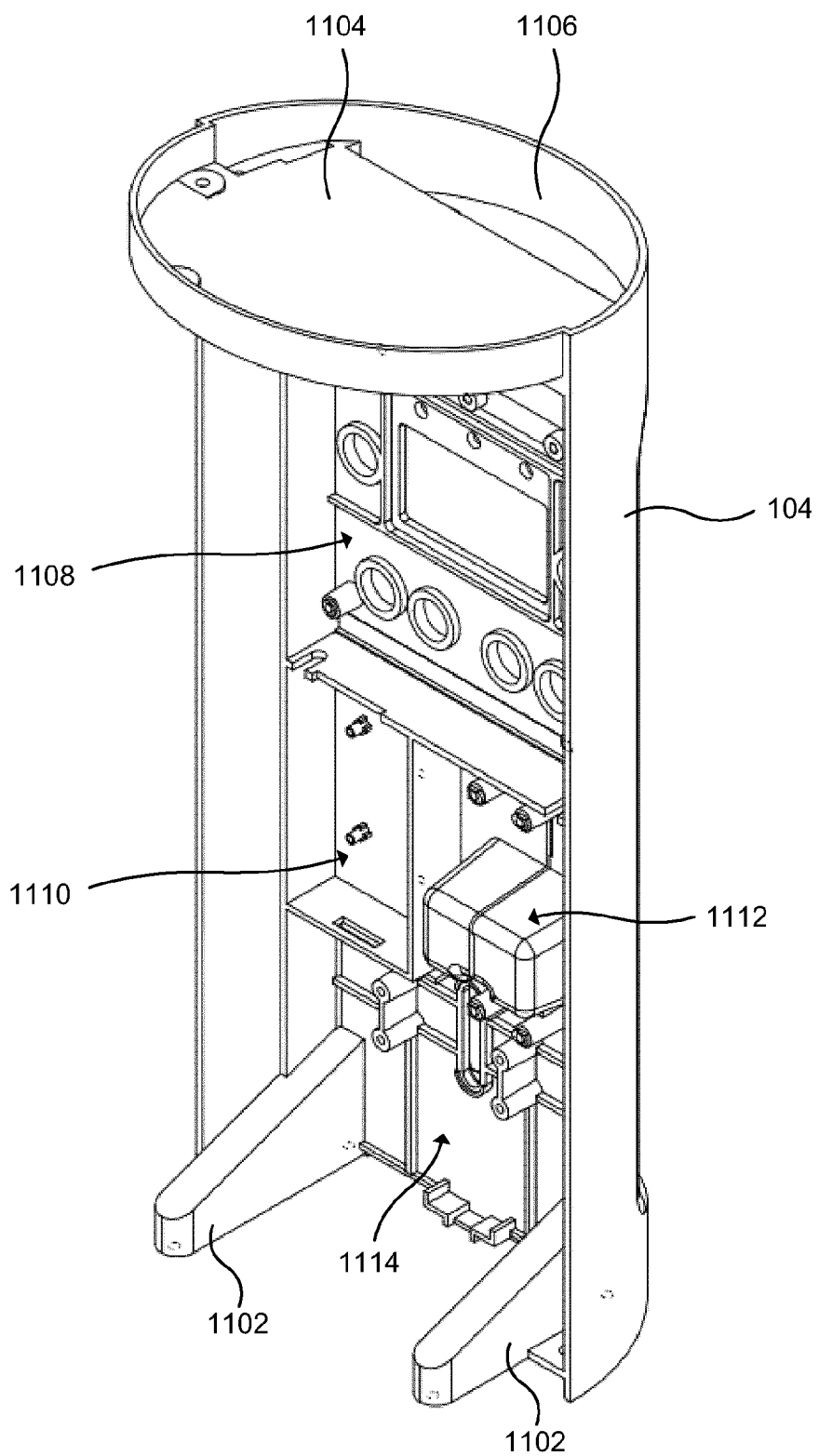
FIG. 11 depicts a rear isometric view of the parking meter mechanism's front cover.

FIG. 11 depicts a rear isometric view of the front assembly's front cover or housing. The front cover 104 may be formed from plastic or other high strength materials, including, for example, metals or alloys. Advantages of high strength plastic include lower interference with wireless communications from the parking meter and stronger protection of internal components (as compared to prior parking meters that included antennas with no high strength housing protection). The front cover 104 may be molded or otherwise machined to provide the exterior surface, as well as to provide a plurality of mounting points for connecting the parking meter components. The front cover 104 if injected molded using high strength plastic formulations, may include strategically placed features or projections on the inside surfaces for the attachment of steel rod or sheet metal which may provide additional vandal resistance against common cutting tools. In addition, the injected molded plastic formulations may include a mixture of small glass or ceramic beads providing anti-drilling protection. The front cover 104 may include rearward projecting protrusions 1102 that may extend toward the rear cover. The rearward projecting protrusions 1102 may provide screw or bolt holes for securing a lock plate, described further below with particular reference to FIGS. 15 and 16. The front cover 104 may include a recess 1104 at the top of the front cover 104 for receiving a solar panel. The solar panel recess 1104 may include a secondary radio antenna recess 1106 located towards the front of the front cover 104. The radio antenna recess 1106 may provide a location for a flexible antenna that may be used for various communications, including for example cellular data communications related to authorization of payment transactions, verification of parking meter status, and/or updating of parking meter functions. Preferably, the antenna is located at or close to the curved inner surface of the front cover 104 within the recess 1106. Alternatively, the antenna may be integrated into or surface mounted to the top facing surface of the solar panel. The solar panel recess 1104 and radio antenna recess 1106 may be fixedly part of, or rigidly attached to, the front cover 104, or, alternatively, the solar panel recess 1104 and radio antenna recess 1106 may be removable components that are replaceable in the field. The solar panel may optionally be covered with a transparent material that may be applied after the solar panel is received in the solar panel recess. Also, the solar panel may be permanently sealed or glued in the recess using an adhesive, such as a 3M adhesive gasket. In the alternative, the solar panel 136 may be provided in a solar panel assembly or module that slidably engages with or is removably coupled or secured to the front cover 104, and further electrically engages with a battery of the parking meter when the solar panel assembly is fully engaged with the front cover. The solar panel assembly allows the solar panel to be replaceable/serviceable in the event of vandalism, failure or other damage. Such solar panel assembly may include the one or more lights, such as LED-type lights, that may be positioned at or near where the top of the flat portion 114 transitions from the recessed flat portion 114 to the cylindrical perimeter of the front cover 104. Such solar panel assembly may further include status LEDs or holes for permitting the visibility of such status LEDs. In addition to the alternative solar panel assembly, the radio antenna may alternatively be provided in a radio antenna compartment that slidably engages with or is removably coupled or secured to the front cover 104, and further electrically engages with the main electronics board when the radio antenna compartment is fully engaged with the front cover. This allows the radio and antenna combination to be quickly and easily swapped out in the field for maintenance/service, to replace/inspect a SIM card, or to switch the meter from one cellular network to another alternative network that may have better coverage or signal strength than the original network. The inside surface of the front cover 104 comprises a number of mounting locations for other components. The mounting points may include, for example, a mounting location for display and input components 1108, a mounting location for a contactless reader 1110, a mounting location for a magnetic stripe and chip reader 1112 as well as a mounting location for a coin chute 1114. Although a specific molding of a front cover is depicted, it will be appreciated that the particular locations of the mounting points and other features may vary, and will depend upon the specific components incorporated into the parking meter.

FIG. 12 depicts a front isometric view of the parking meter mechanism's inner frame. FIG. 13 depicts a rear isometric view of the parking meter mechanism's inner frame. The inner frame 1012 may be mounted to the front cover in the display and input control mounting area 1108. The inner frame 1012 may include one or more expanded openings 1202, which may be shaped to allow different cable connectors to pass through, or may be oversized to allow different connectors to pass through. The inner frame 1012 may further incorporate standoffs 1204 or mounting points for securing main board electronics, or possibly other components, to the inner frame 1012. The inner frame 1012 may also include pivotal connection openings 1206 located on opposite side walls towards a lower end of the inner frame 1012. The pivotal connection openings 1206 may receive pivotal connection pins on the battery compartment and allow the battery compartment to pivot outwards about the pivot connection openings. The side walls of the frame also include slots or openings 1208 that engage with clasps on the battery compartment in order to prevent the battery compartment from pivoting outwards unexpectedly or unintentionally. The inner frame 1012 may include a rear status LED mounting location 1210 for holding rear status LEDs. Clear acrylic light pipes or alternatively a clear lexan material may be used in front of the rear as well as front status LEDs.

Figure 14:
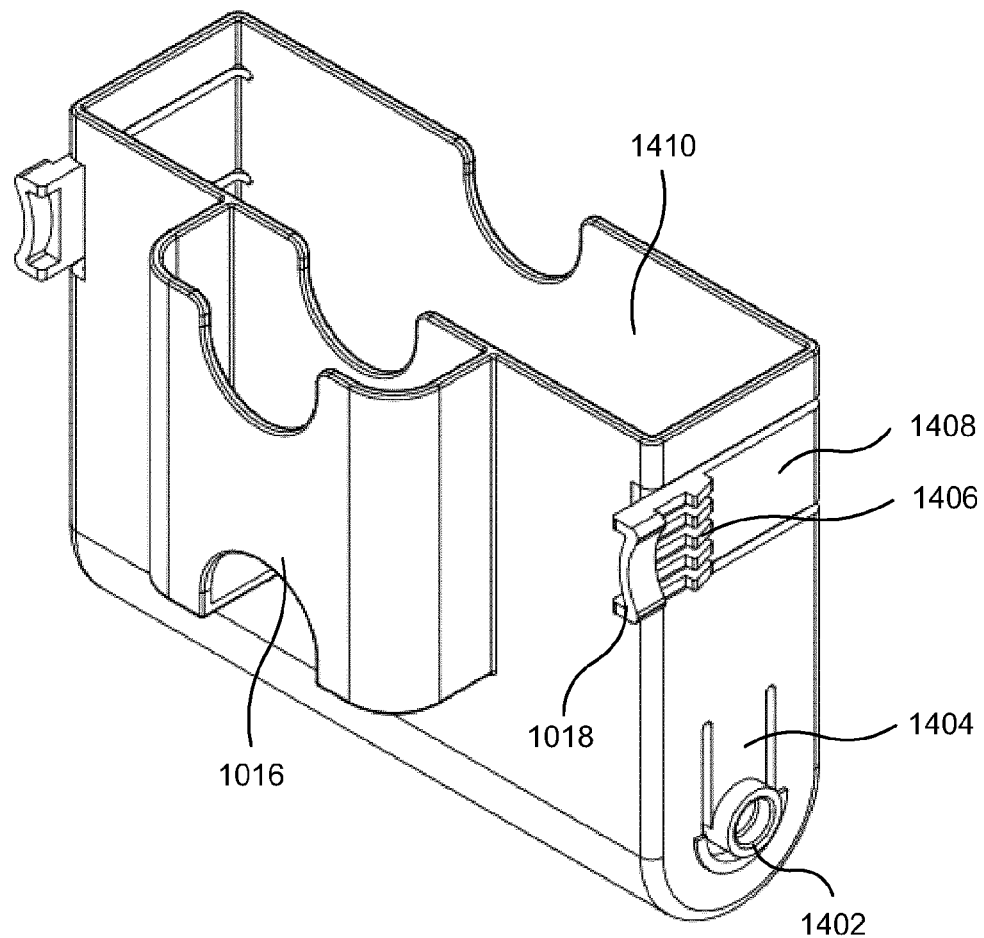
FIG. 14 depicts a battery housing.

FIG. 14 depicts a battery compartment housing. The battery compartment 1014 comprises a pair of pivot connection pins 1402 located on either side of the compartment. The pivotal connection pins 1402 may be located on a depressible portion of 1404 of the sides of the battery compartment 1014. The depressible portion 1404 may be provided by cutout at least partially surrounding the pivot connection pin 1402, thereby providing a resilient hinge at an end of the depressible portion 1404. The battery compartment 1014 may further comprise depressible release tabs 1018 on either side of the battery compartment 1014. The depressible release tabs 1018 may include outwardly extending clasps 1406 that can engage with openings 1208 in the side of the inner frame 1012. When pressed, the release tabs 1018 withdraw the clasps out of the openings 1208 of the inner frame 1012 to allow the battery compartment 1014 to pivot outwards. The battery compartment 1014 may include a main battery compartment 1410 for receiving a main power supply of the parking meter, as well as a secondary battery compartment 1016 for receiving a rechargeable battery that may be periodically charged by a solar panel. It will be appreciated that either battery compartment 1410 or 1016 may contain a battery that can supply power to the parking meter. Further battery compartment 1410 may alternatively accept a rechargeable battery that may also be periodically charged by a solar panel.

Figure 15:
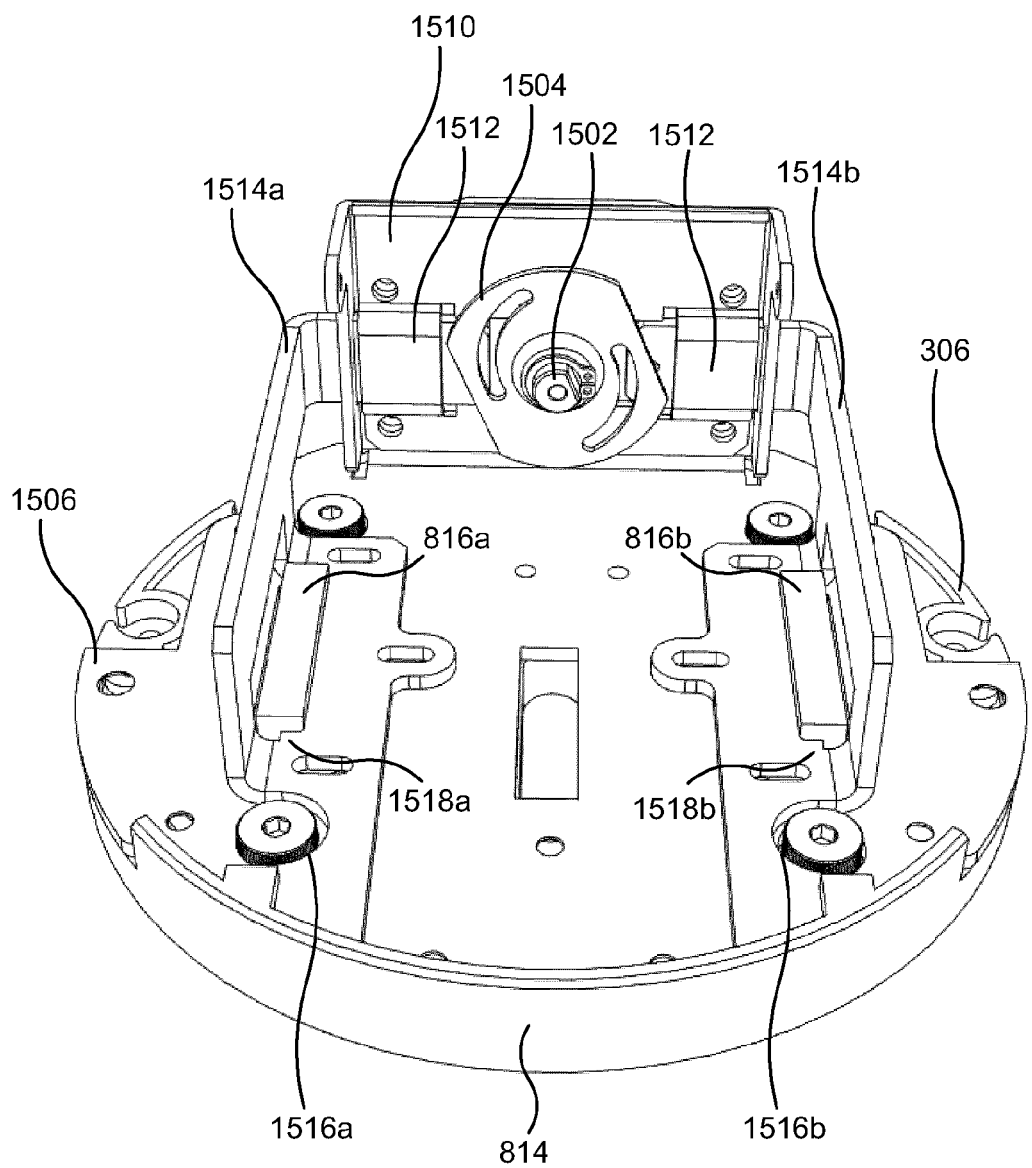
FIG. 15 depicts a locking mechanism.
Figure 16:
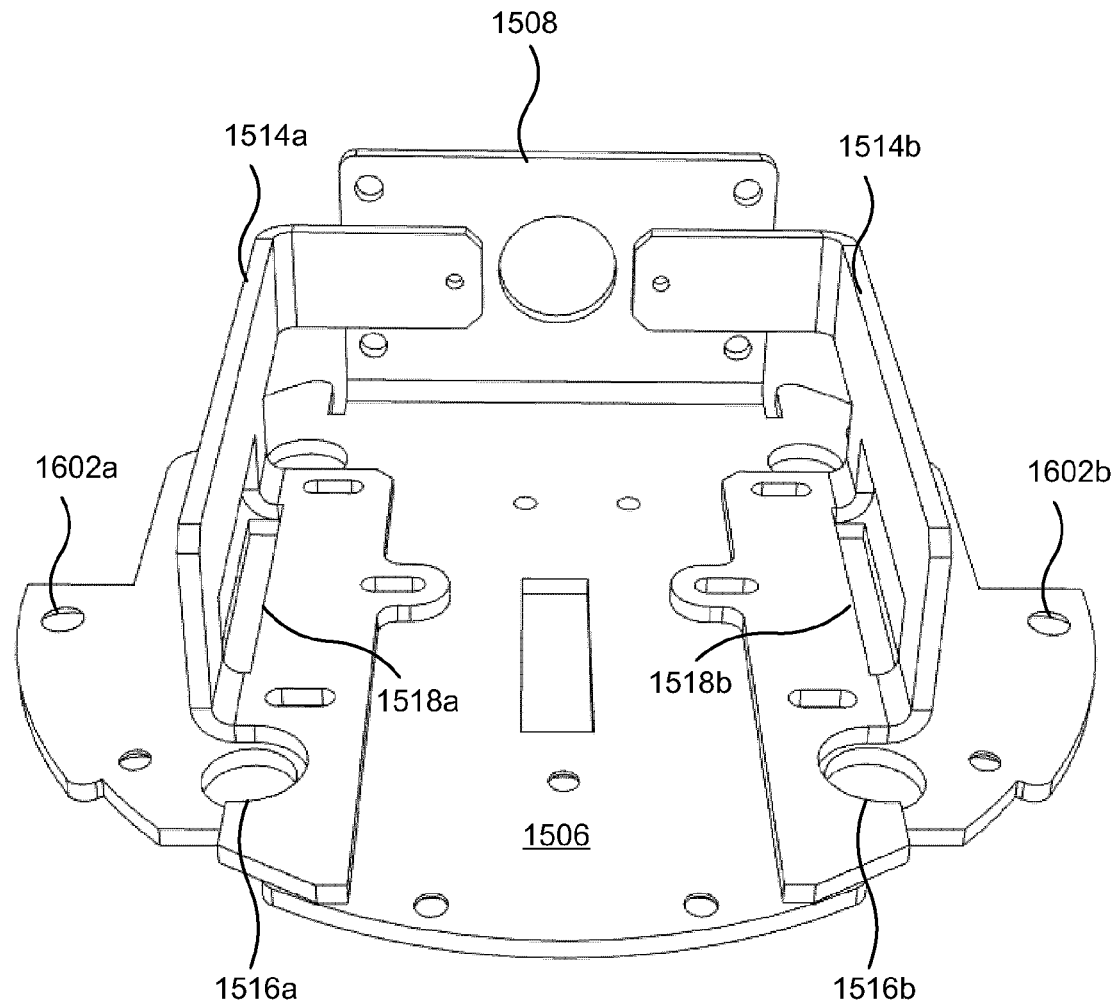
FIG. 16 depicts isolated components of the locking mechanism of FIG. 15.

FIG. 15 depicts a locking mechanism. FIG. 16 depicts components of the locking mechanism of FIG. 15. The locking mechanism 1022 may be secured to the front cover 104 and used to secure the front assembly 302 to the rear assembly 304, and also to prevent rotation of the rear assembly 304, and in particular to prevent rotation of the bottom plate 306, relative to the saddle plate 106. Alternatively, the locking mechanism 1022 may be secured to the rear cover 102 and used to secure the front assembly 304 to the rear assembly 302, and also to prevent rotation of the rear assembly 302. In particular, the locking mechanism 1022 in this regard may prevent rotation of the bottom plate 306 relative to the saddle plate 106. As depicted, the locking mechanism 1022 comprises a lower lock plate 1506 that is secured to the front cover 104. The lower lock plate 1506 includes openings 1518*a*, 1518*b* through which the elevated overhangs 816*a*, 816*b* of the bottom plate 306 may be received. The lower lock plate 1506 comprises an upwardly turned portion 1508 that provides a mounting location for other locking mechanism components, including a cylinder lock 1502. The cylinder lock has a rotating barrel that rotates when an appropriate key is turned. The rotating barrel is attached to an actuating cam plate 1504 that rotates and extends or retracts locking arms 1514*a*, 1514*b* attached to the cam plate. It is noted that the connection between the rotating cam plate 1504 and the locking arms 1514*a*, 1514*b* is not depicted in FIG. 15 for simplicity. A capture plate 1510 may be secured to the upturned section 1508 of the lower lock plate 1506. The capture plate 1510 may have bent sections 1512 on either end of the capture plate 1510. When attached to the lock plate 1506, the capture plate 1510, and in particular the bent sections 1512, provide a guide channel through which the lock arms 1514*a*, 1514*b* may pass. The guide channels allow the locking arms 1514*a*, 1514*b* to move inwards and outwards when the lock is turned. In FIG. 15, the locking arms 1514*a*, 1514*b* are depicted in the locked position. In the locked position, horizontal surfaces of the locking arms 1514*a*, 1514*b*, which are parallel to the lower lock plate 1506, are located under lower surfaces of the elevated overhangs 816*a*, 816*b* and adjacent to openings 1518*a*, 1518*b*, respectively. With the locking arms 1514*a*, 1514*b* retained or secured under the elevated overhangs 816*a*, 816*b* of the bottom plate 306 of the rear assembly 304, the locking mechanism 1022, and the attached front assembly 302 become rigidly coupled to the rear assembly 304. As a result, vertical separation of the front assembly 302 from the rear assembly 304 is prevented. In addition to vertically securing the front assembly to the rear assembly, the locking mechanism 1022 also prevents rotation of the bottom plate 306 relative to the saddle plate 106, as openings 1516*a*, 1516*b* engage the large diameter heads 420 of the bolts 402, which are stationary relative to the locking mechanism 1022 of the front assembly 302 when fully inserted into and engaged with the rear assembly 304. In the unlocked position, the horizontal surfaces of the locking arms 1514*a*, 1514*b* as described above are retracted out from under the elevated overhangs 816*a*, 816*b*, and as such the front assembly 302 may be slid vertically upward on or along the rear assembly 304, and in such situation the rear assembly 304 including bottom plate 306 may be rotated, thus permitting rotation of the full parking meter assembly 101. Having the ability to vertically slid the front assembly 302 alone in an upward direction when in the unlocked position is advantageous, as it allows, for example, maintenance personnel access to the electronic and other components of the front assembly 302 in the event that repair or replacement is required, or inspection of components (such as coin or card payment components) is desirable.

Although the locking mechanism described herein contemplates it being rigidly secured to the front assembly and engageable with the rear assembly, it will be appreciated that the opposite could be implemented, namely, a locking mechanism that is rigidly secured to the rear assembly and engageable with the front assembly.

Although the locking mechanism is described herein with regard to an actuating cam plate 1504 that rotates and extends or retracts locking arms 1514*a*, 1514*b* attached to the cam plate to prevent or allow vertical movement of the front assembly 302 relative to the rear assembly 304, as well as to prevent or allow rotation of the bottom plate 306 relative to the saddle plate 106, it will be appreciated that alternative locking methods or mechanisms are possible. To prevent rotation, a locking mechanism will preferably cause interference between some or all of the parking meter assembly and the coin vault housing, e.g., interference between the bottom plate and the saddle plate. A plurality of methods or locking mechanism designs could be employed to achieve this. For example, rotation of the bottom plate relative to the saddle plate can be prevented or allowed by manually engaging or disengaging a second, manually engageable set of locking arms during the retrofit process while the front assembly is elevated vertically relative to the rear assembly. Once manually engaged to prevent rotation, the front assembly can be lowered into place, and an additional and relatively simpler lock used to prevent or allow vertical movement of the front assembly 302 relative to the rear assembly 304. Thus, the locking mechanism in this example comprises a manually engageable set of locking arms to govern rotational movement, and an additional lock to govern vertical movement.

Figure 17:
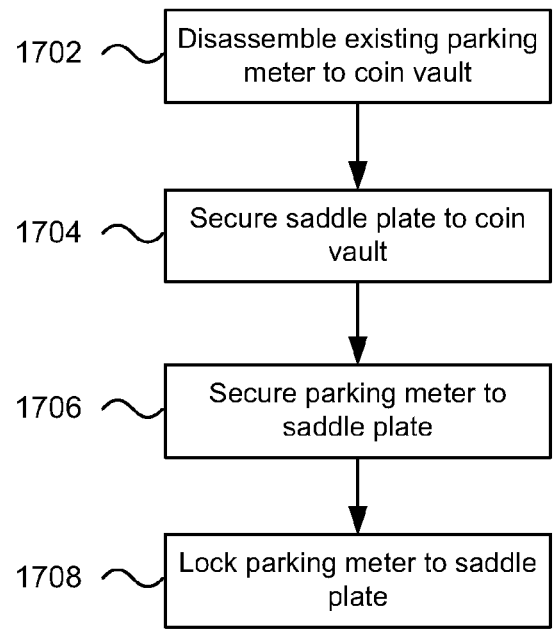
FIG. 17 depicts a method of retrofitting an existing parking meter.

FIG. 17 depicts a method of retrofitting an existing parking meter. The method 1700 begins with removing all of the existing parking meter components from the coin vault housing (1702). This may include removing a front or upper housing that is secured to a lower housing. A removable meter mechanism may be removed from the lower housing and the lower housing may be subsequently removed from the coin vault housing. Once the existing parking meter is disassembled to the coin vault, a saddle plate is connected to the coin vault housing (1704) and the retrofit parking meter may be coupled to the saddle plate (1706). The parking meter may then be locked (1706) to the saddle plate to prevent subsequent removal of the parking meter from the saddle plate and coin vault housing.

A parking meter assembly has been described above that engages with a coin vault assembly when a bottom surface of a protective outer covering of the parking meter assembly is positioned against or adjacent to an upper surface of the coin vault assembly. Although described above in detail, variations may be made to the above described parking meter assembly. For example, the display and/or user input buttons, as well as the payment means, may be arranged in different configurations and/or locations, or using an alternative size or type of display, input means, or payment means. Additionally, the locking, or engaging mechanism securing the parking meter assembly to the coin vault assembly may differ from the rotationally engageable mechanism described above.

Figure 18:
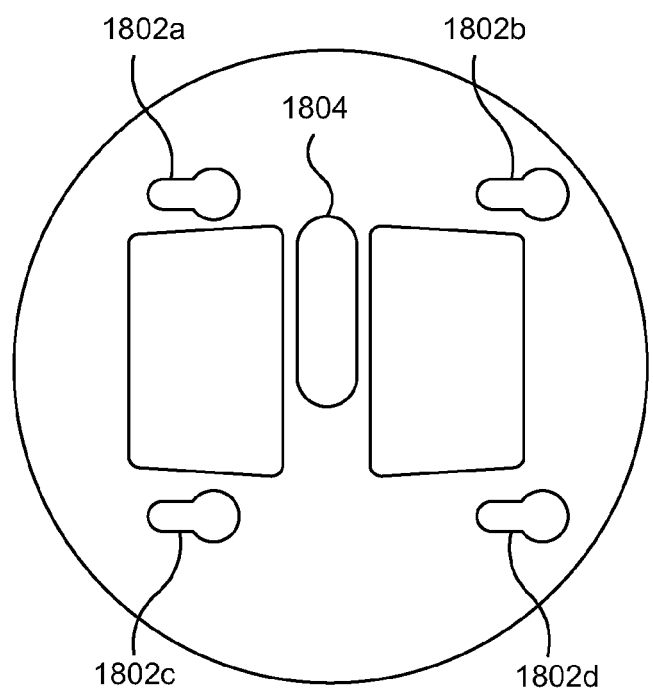
FIG. 18 depicts a top view of an alternative bottom plate.

FIG. 18 depicts a further bottom plate. The bottom plate 1800 may be used in the alternative to the bottom plate 306 described above. As described above, the bottom plate engages with the coin vault assembly to secure the parking meter assembly to the coin vault assembly. The above has described the bottom plate as engaging with the coin vault assembly by rotation. As depicted in FIG. 18, other types of engagement are possible. For example, the bottom plate 1800 provides a sliding engagement with the coin vault assembly. The keyhole openings 1802*a*, 1802*b*, 1802*c*, 1802*d* (referred to collectively as keyhole openings 1802) are arranged in the same orientation as each other. As such, when the bottom plate 1800 is placed over the large diameter bolt heads of the coin vault assembly, and the bolt heads pass through the large diameter openings of the keyholes 1802, the parking meter assembly with the bottom plate 1800 can slidably engage the bolts by sliding the parking meter assembly to the right (vis-à-vis FIG. 18) such that the bolts will be positioned in the smaller diameter openings of the keyholes 1802. The bottom plate 1800 may be secured to the rear cover of the parking meter assembly in various ways, including nuts and bolts as described above with reference to bottom plate 306. Alternatively, if the bottom plate is made from a metal, it is possible to weld the bottom plate 1800 to the rear cover. Other types of connections are possible for securely attaching the bottom plate 1800 to the remainder of the parking meter assembly. Alternatively, the bottom plate and the rear cover, or other portions of a protective outer covering of the parking meter assembly, may be integrally formed as a single component. As described above, the parking meter assembly, which may include bottom plate 1800, may provide a protective outer covering to protect the internal parking meter components. It is possible to secure the parking meter assembly to the coin vault assembly by positioning a bottom surface of the protective outer covering against or adjacent to an upper surface of the coin vault assembly. The protective outer covering may then be slid in order to secure the parking meter assembly to the coin vault assembly.

Figure 19:
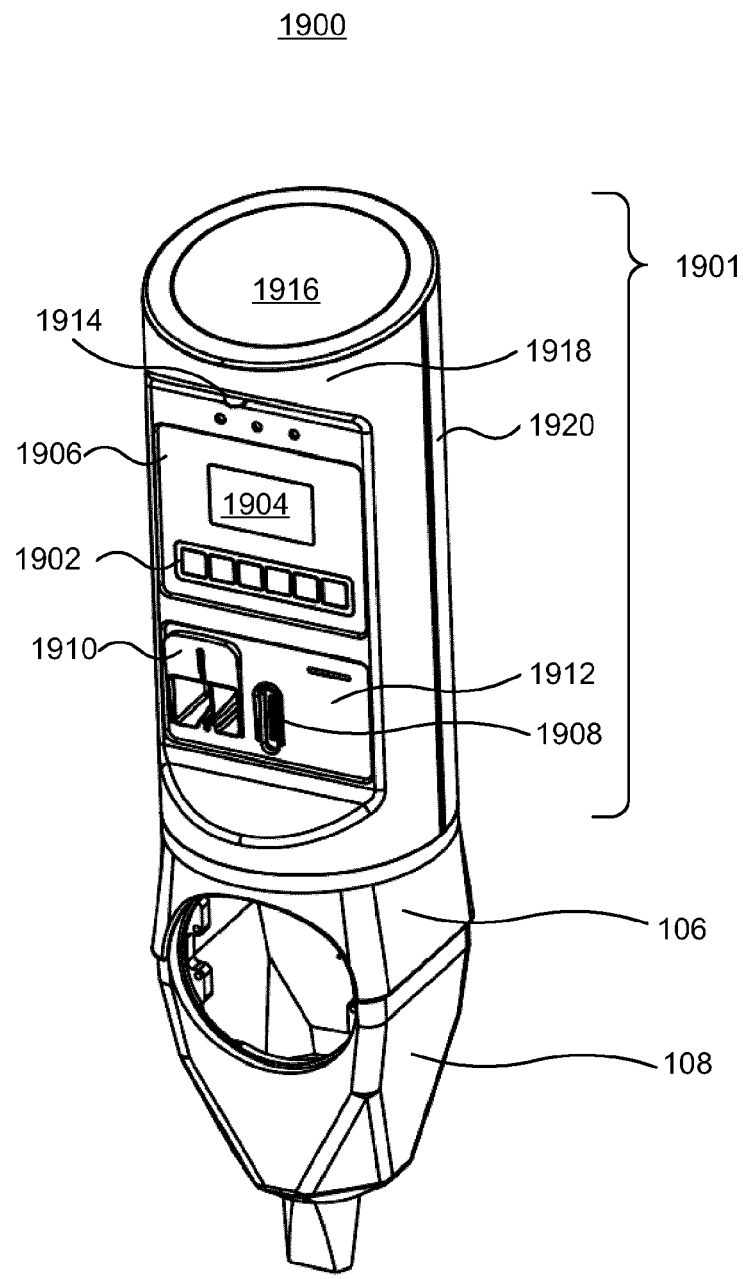
FIG. 19 depicts a front isometric view of an alternative single space parking meter.

FIG. 19 depicts a further parking meter. The parking meter 1900 is similar to the parking meter 100 described above. In particular, a parking meter assembly providing a protective outer covering to internal parking meter components includes a bottom plate for securing the parking meter assembly to a coin vault assembly. The protective outer covering may engage the coin vault assembly when a bottom surface of the protective outer covering is positioned against or adjacent to an upper surface of the coin vault assembly. Various components and features of the parking meter 1900 are substantially similar to those of parking meter 100 and, as such, the following description focuses on differences between the parking meters.

The parking meter 1900 provides a low-profile parking meter assembly 1901 that can be secured to a coin vault assembly, or similar structure. The parking meter assembly comprises an input area 1906 comprising a plurality of input controls 1902 arranged horizontally below a display 1904. It will be appreciated that other arrangements of input controls and/or displays are possible. Further, in order to reduce an overall height of the parking meter assembly 1901, the payment means are all located in the same general horizontal area located below the input area 1906. That is, the coin chute 1908 is located horizontally adjacent to the card slot 1910 for the card reader as well as a tap target, or antenna location, 1912 for the contactless payment reader. As depicted in FIG. 19, the payment means 1908, 1910 and 1912 are generally horizontally aligned with each other. This is in contrast to the coin chute 120 of parking meter 100, which is vertically offset from, and so not generally horizontally aligned with, the other payment means 122, 124. The parking meter 1900 may further comprise an overhead light 1914 projecting downwards from the front cover in order to illuminate at least a portion of the parking meter to facilitate user interactions in the evening or during dark periods. The parking meter may include a solar panel 1916 located at a top section of the parking meter. As described further below, the parking meter assembly 1901 may include an internal structure to which various parking meter components may be connected. A front cover 1918 may be secured to the internal structure and the internal structure and front housing 1918 may slide up and down a rear assembly 1920 that remains fixed to the coin vault.

Figure 20:
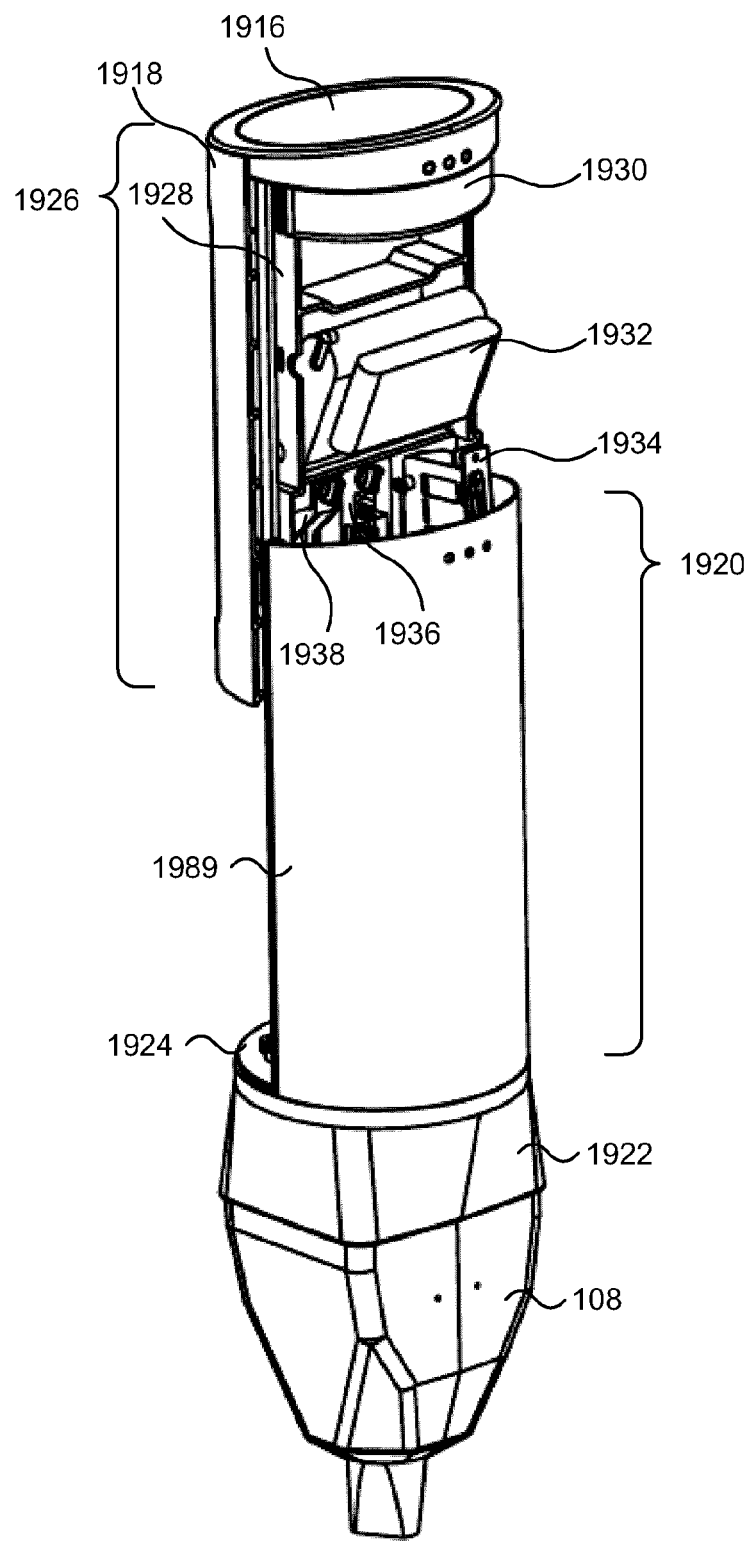
FIG. 20 depicts a rear isometric view of the single space parking meter of FIG. 19 with the parking meter mechanism partially raised.

FIG. 20 depicts a rear isometric view of the single space parking meter of FIG. 19 with the parking meter mechanism partially raised. As depicted, a rear assembly 1920 can be secured to the coin vault 108 and saddle plate 1922. The rear assembly 1920 may comprises a bottom plate 1924 that can be secured to bolts securing the saddle plate 1922 to the coin vault housing 108 using a twisting motion to capture the bolts within narrowing openings in the bottom plate. A rear cover 1989 may be secured to the bottom plate 1924 using any number of fastening techniques such as welding, screws, bolts, etc. Although not visible in FIG. 20, the rear assembly also includes a locking assembly that comprises a locking component that prevents rotation of the rear assembly 1920 relative to the bolts securing the saddle plate 1924 to the coin vault housing 108. As described above, bolt heads of the bolts cannot be withdrawn through the narrowed portion of the openings in the bottom plate, and, as such, when rotation of the rear assembly is prevented, removal of the rear assembly from the saddle plate and coin vault housing is also prevented. The locking assembly further comprises a locking component for preventing vertical movement of a front assembly 1926 relative to the rear assembly 1920 when engaged with the front assembly in a lowered position. When the vertical locking component is disengaged, the front assembly 1926 may be slid up and/or down the rear assembly 1920. The front assembly 1926 may be partially slid up the rear assembly 1920 to a service position as depicted in FIG. 20 that allows for inspection and servicing of internal parking meter components. Although described as sliding vertically to a service position, it is possible for other movements to be provided. For example, it is possible for the front assembly 1926 to slide vertically and then rotate or hinge so as to place the front assembly in an angled or at least partially horizontal position to facilitate servicing and inspections. The front assembly 1926 may be completely removed from the rear assembly 1920 for replacement or other purposes.

As depicted in FIG. 20, the front assembly 1926 may comprise the front cover 1918 which may be securely attached to an internal structure 1928. The internal structure 1928 and the front cover 1918 may provide mounting connections for securing various parking meter components to the front assembly 1926. The components may be secured using a quick-connection type of mechanism that allows individual components to be moved for inspection and/or removed for servicing or replacing without requiring any tools for such moving and/or removal. The components may include a solar panel assembly or module that includes a solar panel 1916, a radio board component or radio antenna compartment 1930, a battery compartment 1932 (depicted with a battery), a magnetic stripe and/or contact based card reader 1934, a coin chute 1936 and/or a contactless payment card reader and antenna 1938.

Figure 21:
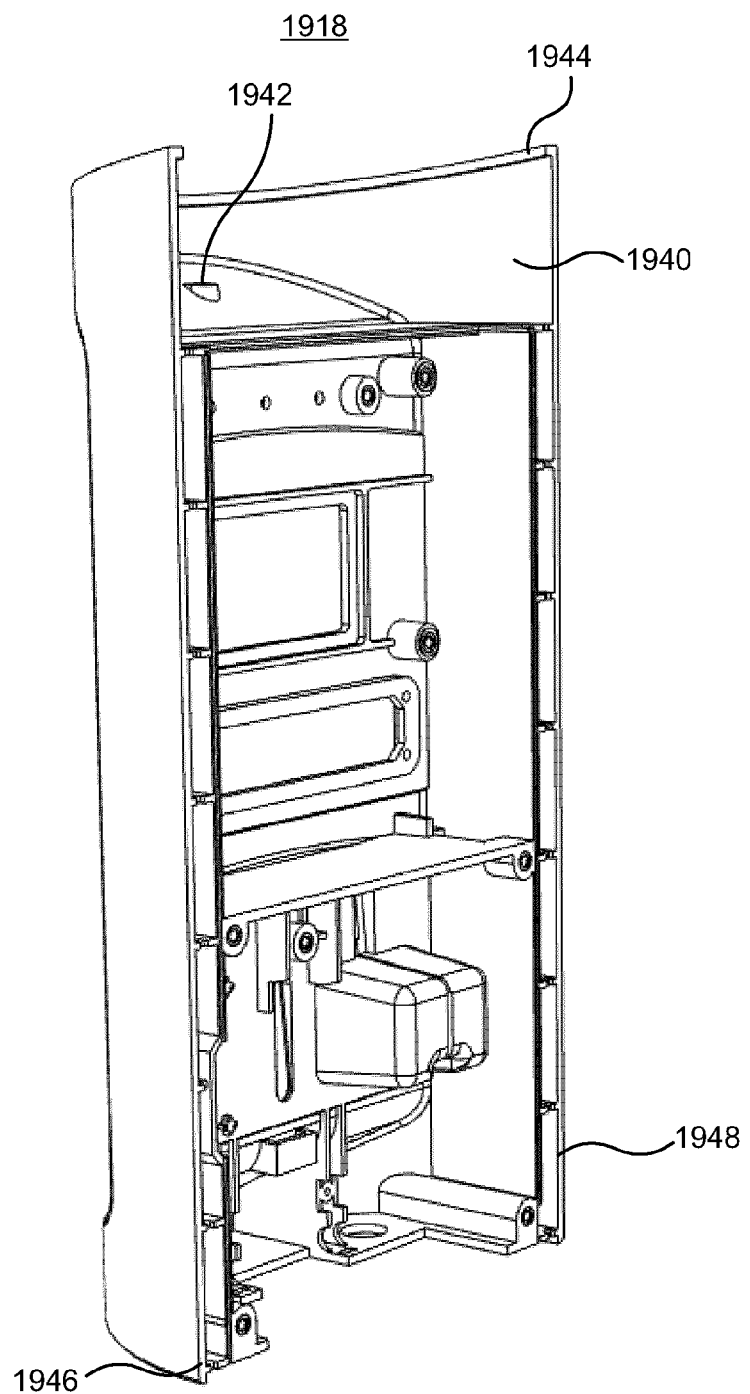
FIG. 21 depicts an internal isometric view of a front cover of the single space parking meter of FIG. 19.

FIG. 21 depicts an internal isometric view of a front cover of the single space parking meter of FIG. 19. As depicted, the front cover 1918 may provide various mounting structures for securing various components, such as displays, main circuit boards, input components, the internal structure, etc. to the front cover 1918. The front cover 1918 includes an upper portion 1940 where the solar panel assembly may be received. The upper portion may include a downward protrusion 1942 above a user interface panel to provide a housing for an LED to illuminate the user interface panel. The upper portion may also include a ridge 1944 for securely capturing the solar panel assembly when slid into the upper portion 1940. The front cover 1918 may include two side edge surfaces 1946, 1948 that provide a bearing surface that in conjunction with bearing surfaces of the internal structure 1928 capture rails of the rear assembly 1920 and allow the front assembly 1926 to slide up and down the rear assembly 1920.

Figure 22:
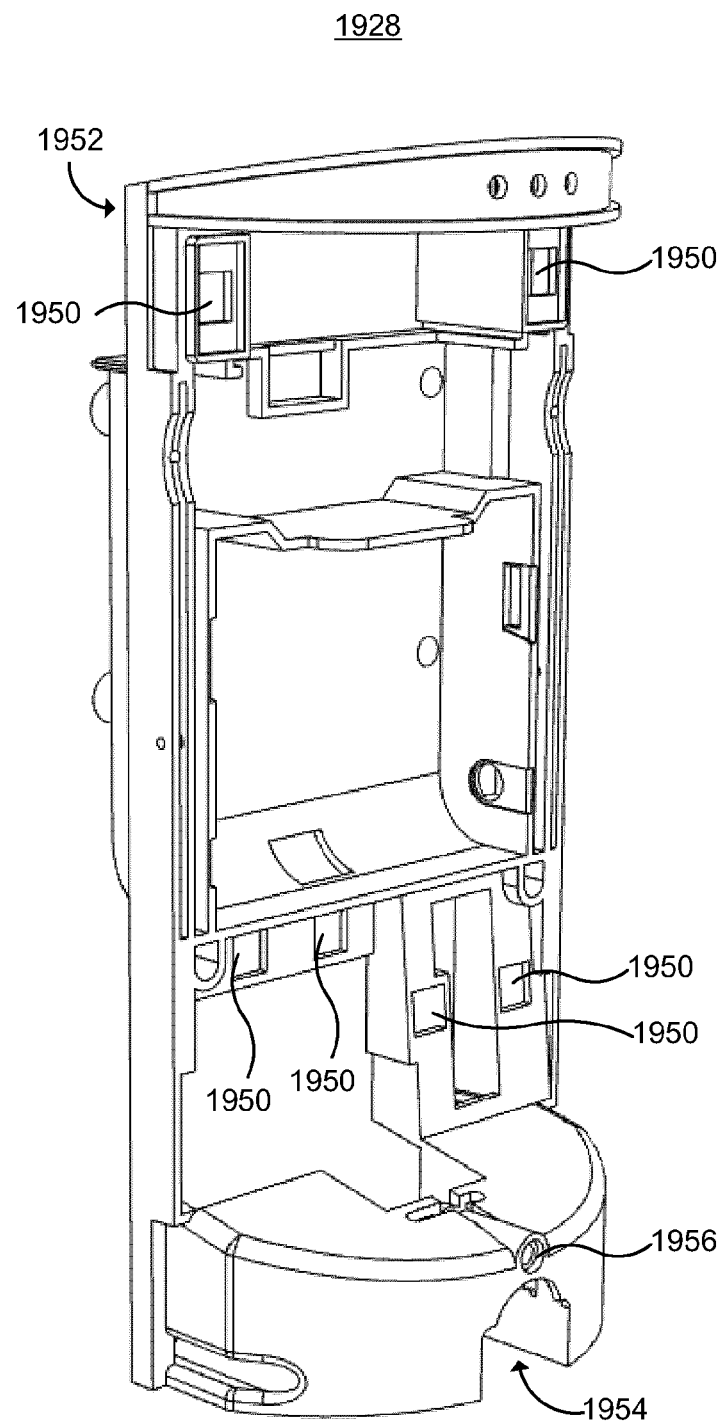
FIG. 22 depicts a rear isometric view of an internal structure of the single space parking meter of FIG. 19.

FIG. 22 depicts a rear isometric view of an internal structure 1928 of the single space parking meter of FIG. 19. The internal structure may include various mounting points for securing components to the parking meter. As described above, individual components may be connected using quick-connect connections such as thumbscrews or similar friction type connections to secure the components in place. The internal structure 1928 comprises a number of square openings 1950 that may receive capturing components that allow, for example, a thumbscrew to secure the component with a quarter turn. The internal structure 1928 includes two side edge surfaces 1952, only one of which is labeled, that provide bearing surfaces that cooperate with the bearing surfaces 1946, 1948 of the front cover to capture rails of the rear assembly 1920. The internal structure 1928 may also include an opening or section 1954 for receiving a cylindrical locking component used to secure the front assembly from vertical movement. A locking bar or rod 1956 is secured within the internal structure 1928 and may be captured by a hook (not shown) when the lock is engaged.

Figure 23:
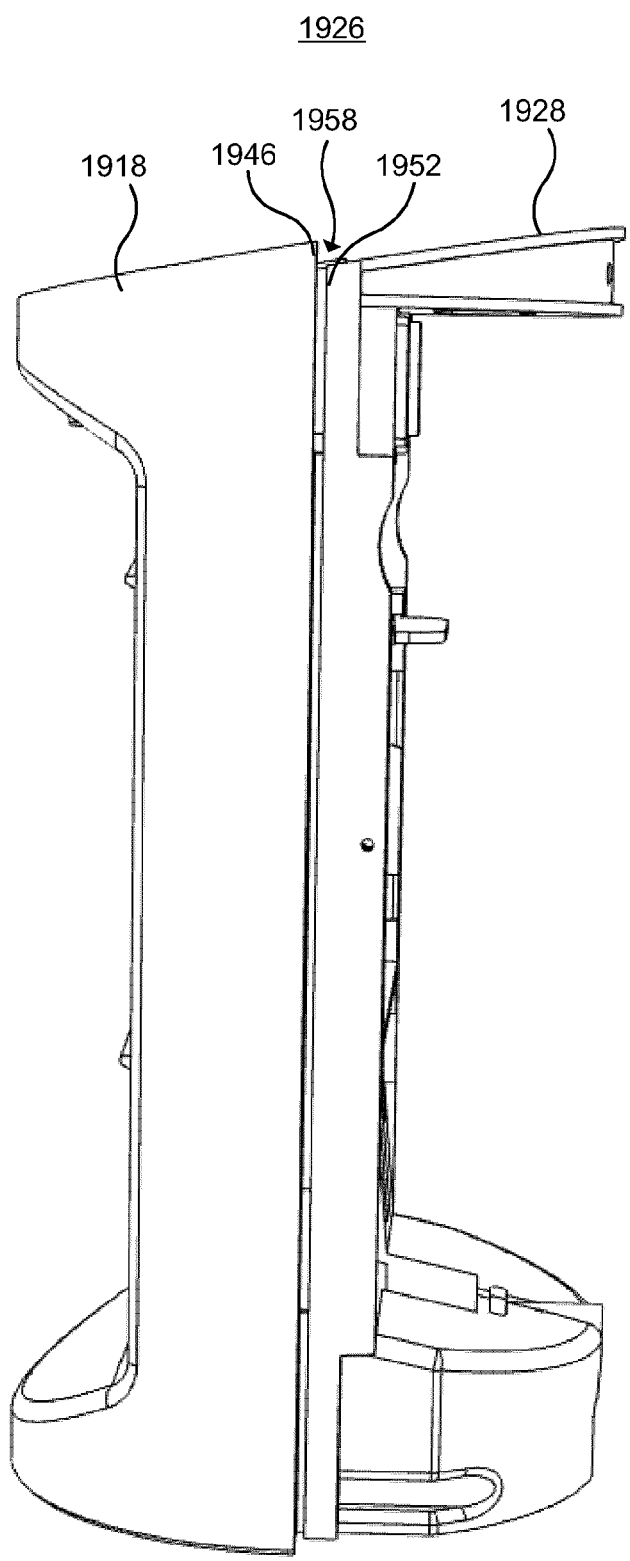
FIG. 23 depicts a side view of the internal structure of FIG. 22 attached to the front cover of FIG. 21.

FIG. 23 depicts a side view of the internal structure of FIG. 22 attached to the front cover of FIG. 21. As depicted, when the front cover 1918 is secured to the internal structure 1928, the corresponding bearing surfaces 1946, 1952 of the front cover 1918 and the internal structure 1928, respectively, are in close proximity to each other forming a channel 1958. The channel 1958 captures a rail of the rear assembly 1920 to secure the front assembly 1926 to the rear assembly 1920 while allowing the front assembly 1926 to slide up and down the rear assembly 1920.

Figure 24:
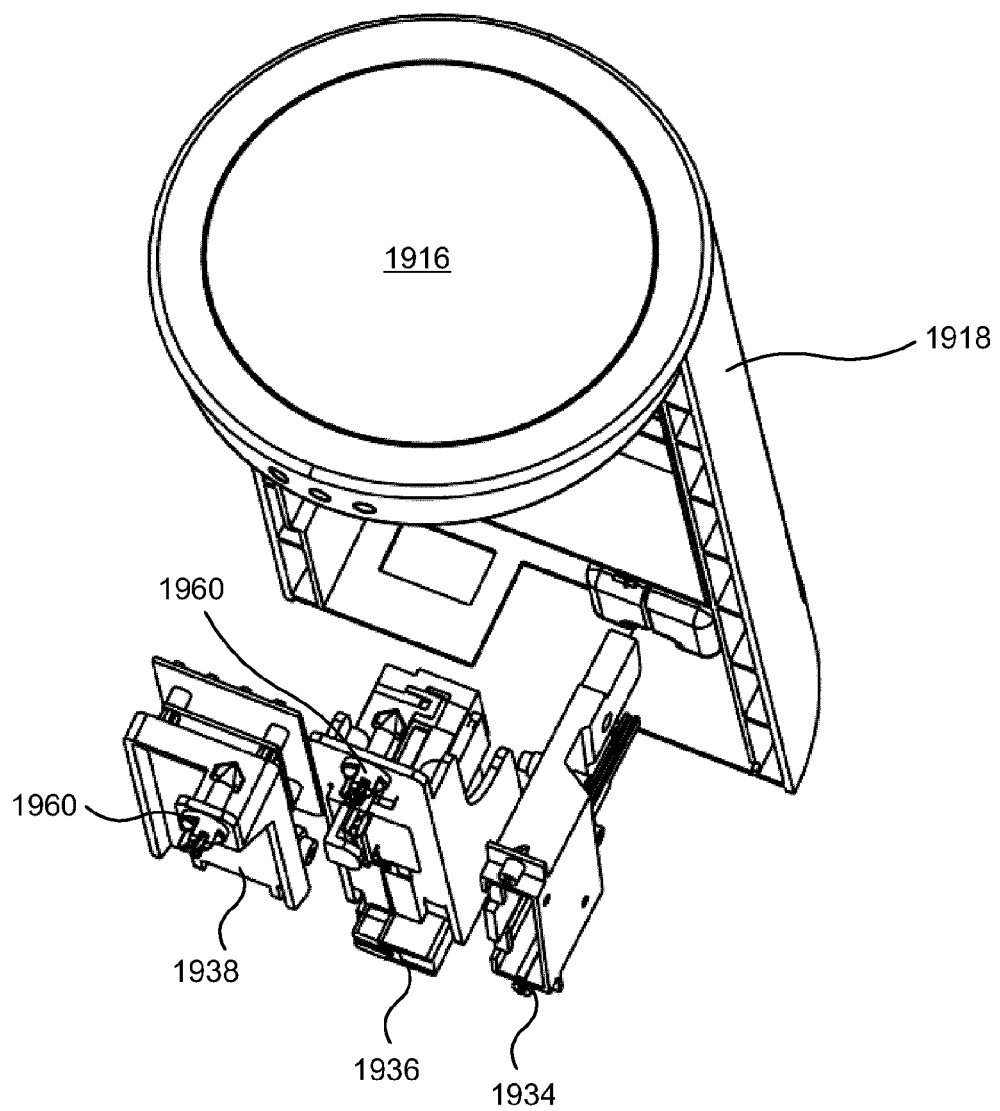
FIG. 24 depicts a top perspective view of removable components of the parking meter of FIG. 19.

FIG. 24 depicts a top perspective view of removable components of the parking meter of FIG. 19. As described above, the internal structure 1928 (not shown in FIG. 24) and the front cover 1918 may provide mounting features to allow the payment components, such as coin chute 1936, card reader 1934 and contactless payment reader 1938 to be releasably secured within the parking meter. As an example, the payment components may be secured to the front cover 1918 and internal structure 1928 using thumbscrews 1960. The thumbscrews 1960 allow the components to be easily disengaged from the meter housing or covering for inspection, service, or removal from the meter housing or covering if necessary. The thumbscrews 1960 may be inserted through a capturing component on the internal structure and turned an amount, such as a quarter turn, in order to secure the connection. For example, during routine maintenance on the street, a coin chute 1936 may be quickly replaced with another coin chute by unscrewing the thumbscrew or thumbscrews and removing the coin chute 1936. Additionally or alternatively, unscrewing the thumbscrew may allow the payment component to be moved to a partially attached position which allows the payment component to be easily inspected while not being fully separated from the parking meter. For example, the payment components may be pivotally connected to the parking meter's front cover. Unscrewing the thumbscrew may allow the payment component to become partially disengaged from the meter housing or covering and swing outwards into a disengagement position. Such a disengagement position may provide improved visibility for inspection and improved access for service without actual removal of the payment component from the parking meter. Once inspection or service has been completed, the payment component may be swung or rotated back to a fully engaged position and the thumbscrew re-attached to secure the payment device in the fully engaged position. If upon inspection or servicing it is determined that the payment component should be replaced, it can be removed from the disengagement position and a replacement component secured to the parking meter.

Figure 25:
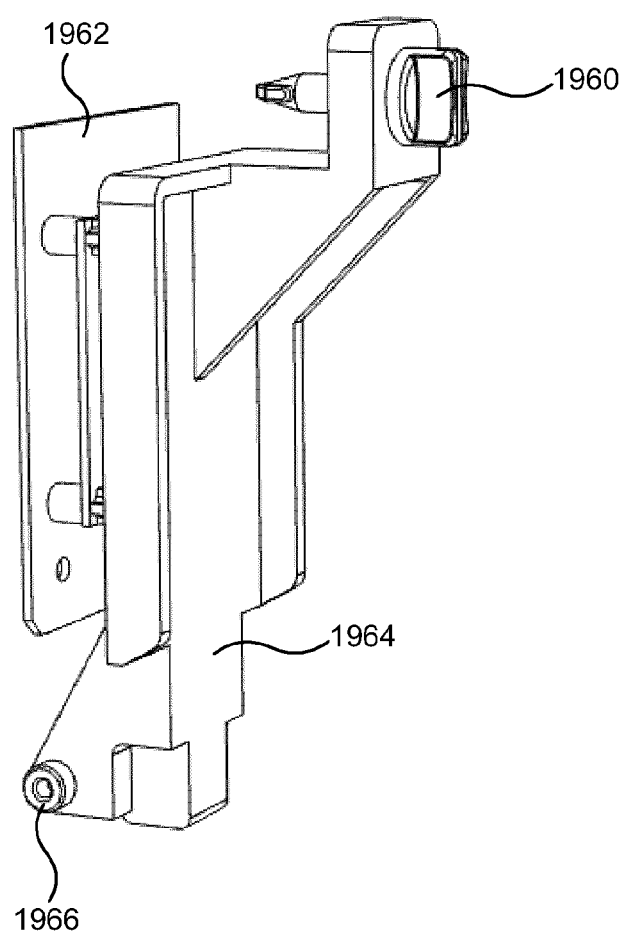
FIG. 25 depicts a detail perspective view of a removable contactless payment reader.

FIG. 25 depicts a detail perspective view of a removable contactless payment reader 1938. The removable contactless payment reader 1938 may include electronic components, such as the reader circuitry and antenna secured to, or formed on, one or more boards 1962 that can be secured to a frame 1964. The frame 1964 includes a thumbscrew 1960 that can be used to secure the removable contactless payment reader 1938 in place. The frame 1964 includes a lower portion that has a protruding cylindrical portion 1966 that may act as a pivot point of the connection.

Figure 26:
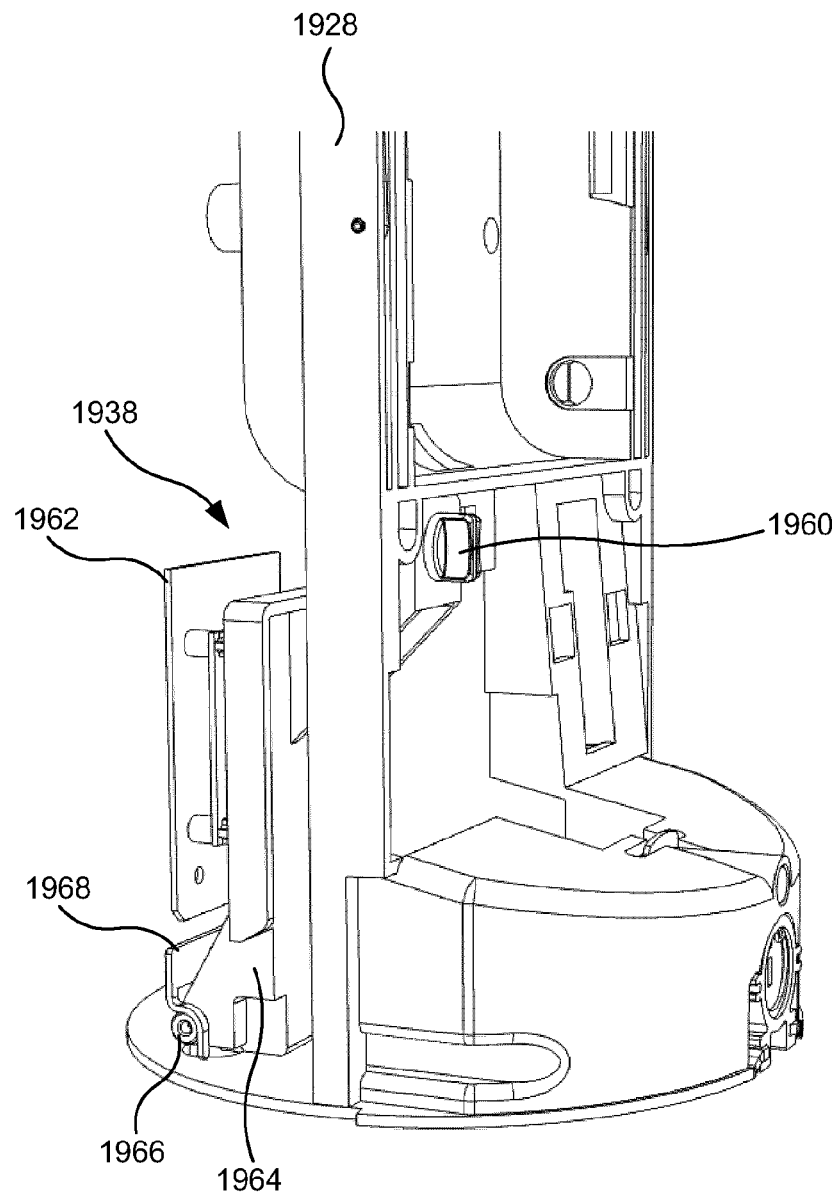
FIG. 26 depicts details of the mounting of the removable contactless payment reader of FIG. 25.

FIG. 26 depicts details of the mounting of the removable contactless payment reader of FIG. 25. The contactless payment reader 1938 is secured within the parking meter by a thumbscrew 1960 that secures the reader 1938 to the internal structure 1928. Additionally the cylindrical protrusion 1966 of the frame 1964 provides a second connection point that can help provide a secure connection of the removable contactless payment reader to the parking meter. The cylindrical protrusion may be partially secured against a retaining bar 1968 that may be secured to the parking meter, for example by screws or other attachment means. When the internal structure 1928, and front cover (not shown) are raised, the removable contactless payment reader 1938 may be removed by disengaging the thumbscrew 1960 and lowering the removable contactless payment reader 1938 so that the cylindrical protrusion clears the retaining bar 1968 and the reader 1938 can be fully removed from the parking meter. The contactless payment reader 1938 may be partially disengaged from the internal structure by disengaging the thumbscrew 1960, but maintaining contact between the cylindrical protrusion 1966 and the retaining bar 1968. Such partial disengagement may allow the component to be rotated for quick inspection. The component may then be easily re-secured to the internal structure 1918 by the thumbscrew 1960.

Figure 27:
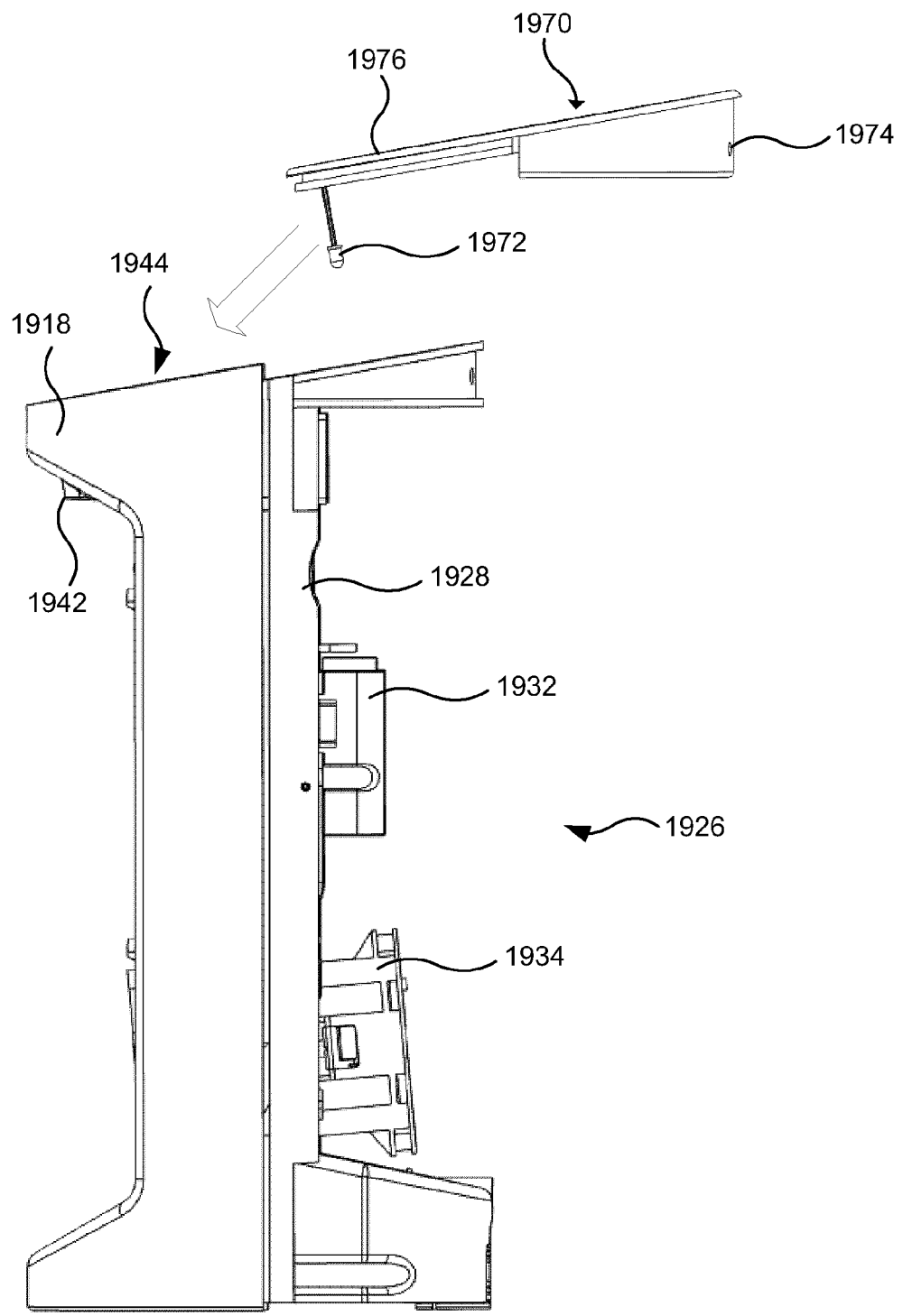
FIG. 27 depicts a side view of the front cover, internal structure and solar panel assembly.

FIG. 27 depicts a side view of the front cover, internal structure and solar panel assembly. The parking meter may include a solar panel that is located in a solar panel assembly 1970 that can be inserted into the front assembly 1926, and further electrically engages with a battery of the parking meter when the solar panel assembly is fully engaged with the front assembly. This allows the solar panel assembly 1970 to be easily replaceable and/or serviceable in the event of vandalism, failure, or other damage or malfunction. The solar panel assembly 1970 may include the one or more lights 1972 that can be exposed through a small opening or downward protrusion 1942 in the front cover 1918 for illuminating the user interface of the parking meter. The solar panel assembly 1970 may further include status LEDs or holes 1974 for permitting the visibility of such status LEDs. As depicted, the solar panel assembly 1970 may include a channel 1976 that matches with the ridge 1944 to secure the solar panel assembly 1970 within the front assembly 1926. FIG. 27 also depicts rotatable battery compartment 1932 as well as the card payment reader 1934.

Figure 28:
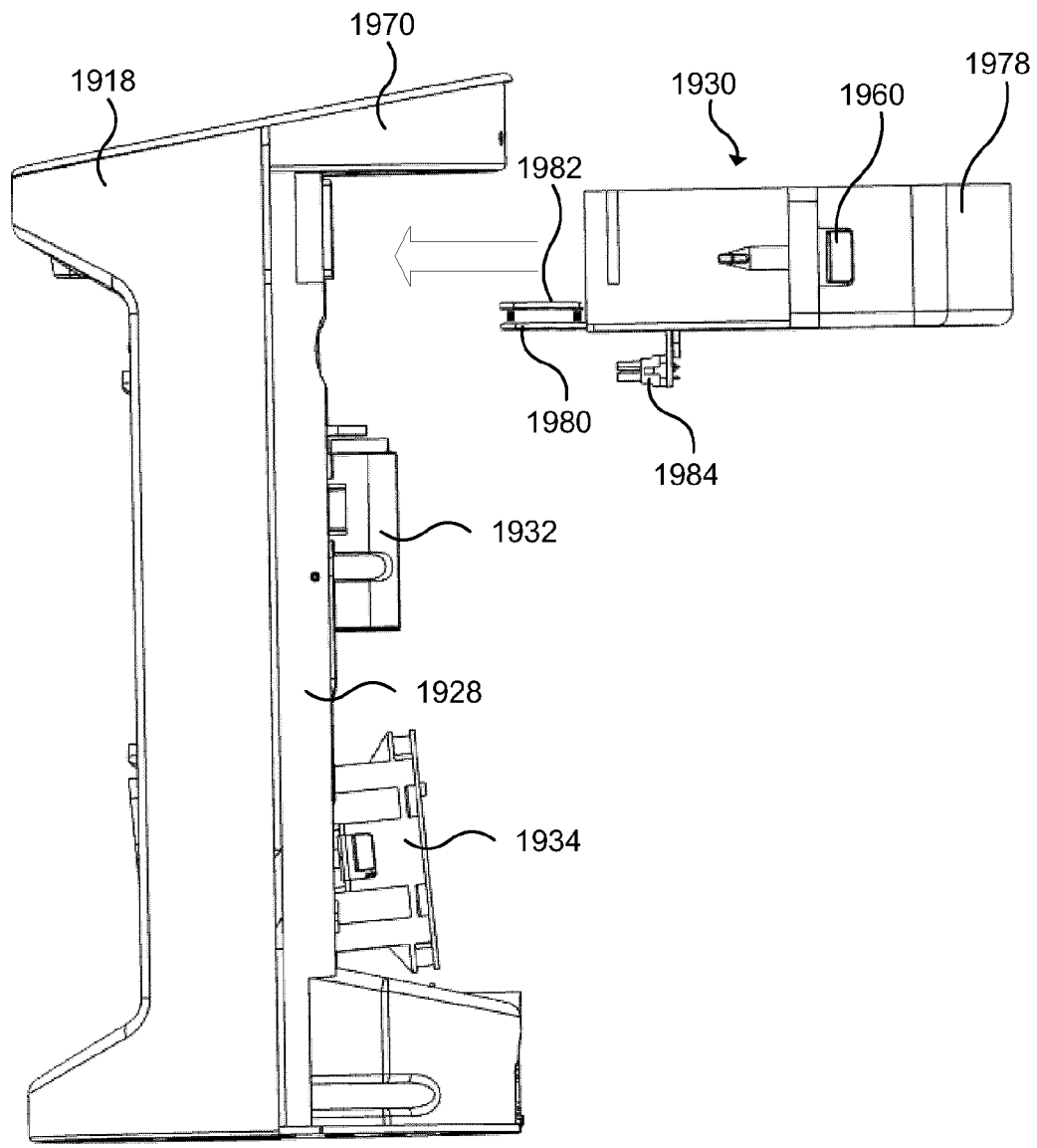
FIG. 28 depicts a side view of the front cover, internal structure, solar panel assembly and radio assembly.
Figure 29:
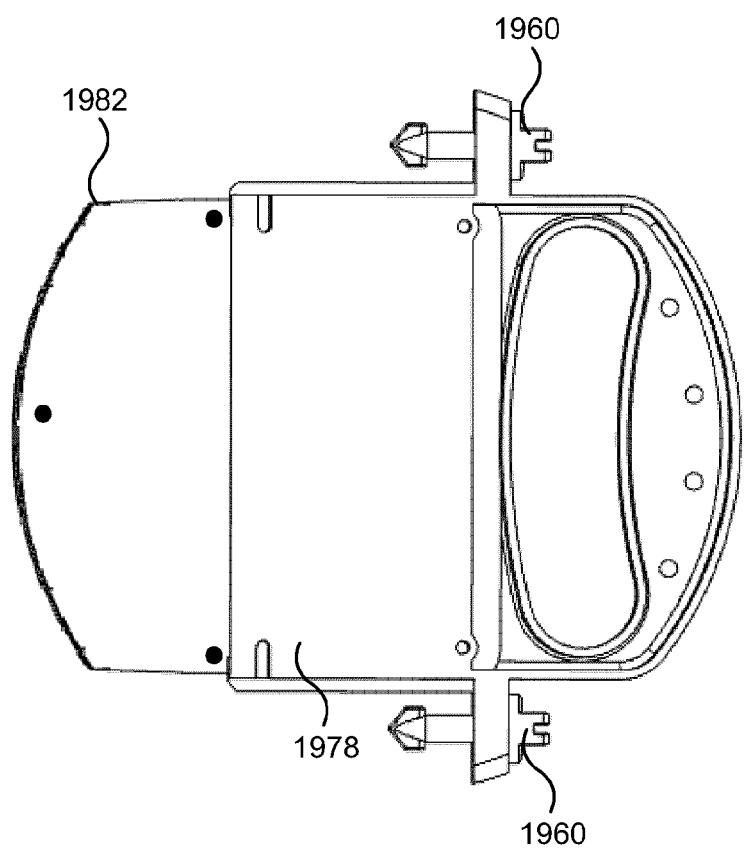
FIG. 29 depicts a top view of the radio assembly.

FIG. 28 depicts a side view of the front assembly and radio assembly (or radio communication component). In addition to the slidable solar panel assembly 1970 described above, the radio antenna of the parking meter may be provided in a radio antenna compartment or removable radio module 1930 that slidably engages with or is removably coupled or secured to the front assembly 1926 and further electrically engages with the main electronics board when it is fully engaged onto the front assembly. The radio antenna compartment 1930 may be secured in position by, for example, thumbscrews 1960. The radio antenna compartment 1930 comprises a housing 1978 that can enclose radio electronics such as radio transceivers. An electrical connector 1984 may be secured to the housing 1978 so that when the radio antenna compartment is slid into the front assembly, the electrical connector mates with a corresponding connection to establish power and data connections. This allows the radio and antenna combination to be quickly and easily swapped out in the field for maintenance/service, to replace/inspect a SIM card, or to switch the meter from one cellular network to another alternative network that may have better coverage or signal strength than the original network. The radio antenna compartment 1930 may include a metal ground plane 1980 above which an antenna board 1982 may be located. As will be appreciated, the metal ground plane may be used to provide desired radio frequency (RF) transmission performance from the antenna of the antenna board 1982. The radio antenna compartment 1930 may also include conductive sprays applied onto inside surfaces of the compartment for the purpose of shielding the radio and reducing spurious emissions. As depicted in FIG. 29, the radio antenna board 1982 (as seen from above) may be contoured in order to follow the shape of the front cover 1918 in order to locate the antenna in a favorable location adjacent the front cover.

Figure 30:
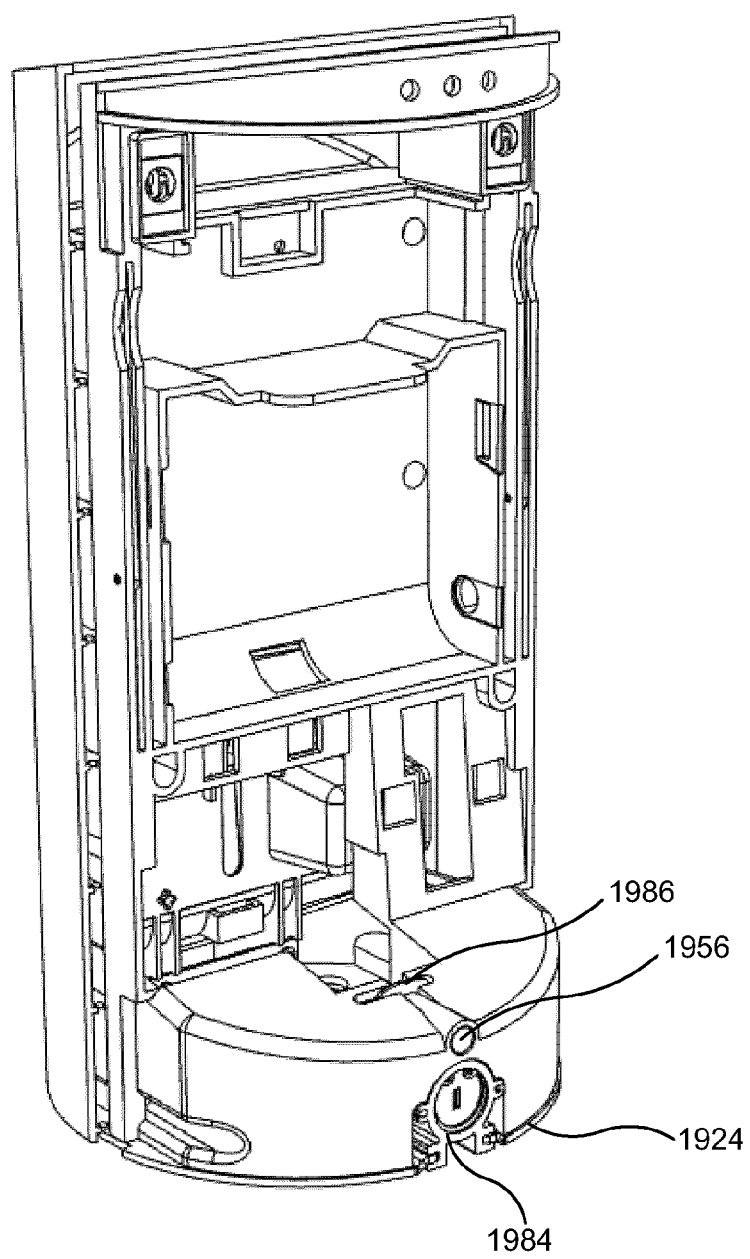
FIG. 30 depicts a rear perspective view of the front cover, internal structure and locking assembly.

FIG. 30 depicts a rear perspective view of the front cover, internal structure and locking assembly with the rear cover removed for visibility. The locking assembly comprises a cylindrical locking component 1984 that is secured to the bottom plate 1924. Upon rotation of the cylindrical lock, a hook bar 1986 rotates so that a hook portion captures a locking rod 1956 fixed within the front assembly 1926. By rotating the cylindrical lock 1984 to a locked position with the hook bar engaged with the locking rod 1956, the front assembly cannot be raised from the bottom plate, which in turn is secured to the coin vault assembly.

Figure 31:
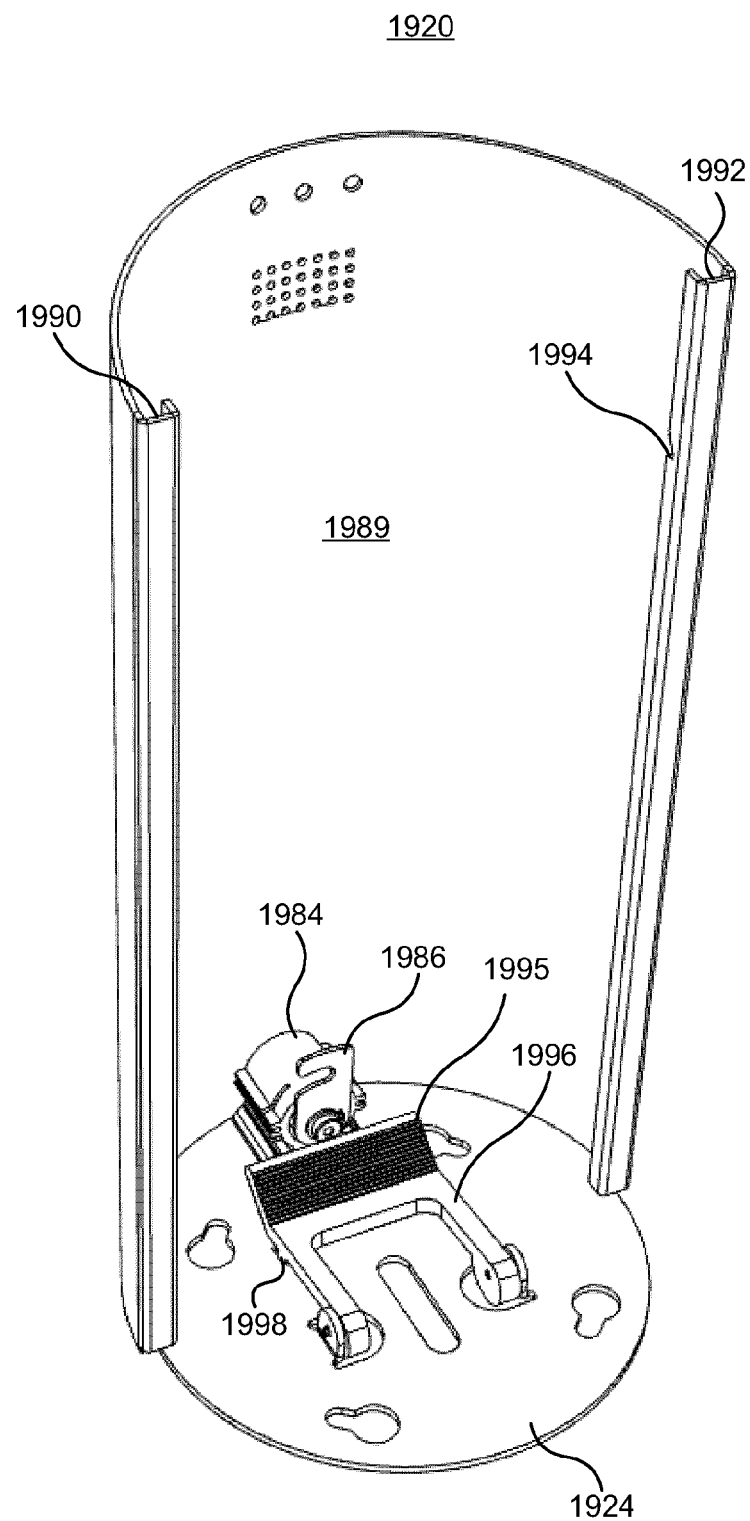
FIG. 31 depicts a perspective view of the rear cover, base plate and locking assembly.

FIG. 31 depicts a perspective view of the rear assembly. The rear assembly 1920 includes a rear cover 1989 that provides the rear portion of the protective housing. The rear cover 1989 includes two rails 1990, 1992 that can be received within the channel 1958 between the bearing surfaces of the front cover 1918 and the internal structure 1928 (as shown in FIG. 23). The front assembly can be slid up and down the rails 1990, 1992. The rails may include an indent 1994 that can engage a releasable locking pin to maintain the front assembly in a partially raised position, such as that of FIG. 20, to facilitate servicing and inspections. The rear assembly 1920 further includes the cylindrical lock 1984 and attached hook bar 1986 for securing the front assembly to the rear assembly and preventing vertical movement. The rear assembly further includes a second locking component 1995 that prevents rotation of the rear assembly 1920. As described above, the rear assembly may be secured to the coin vault housing by twisting the rear cover, and attached bottom plate, so that expanded bolt heads secured to the coin vault housing are positioned above a reduced-sized opening. The bolt heads in this position, in combination with the reduced-sized openings of the bottom plate, prevent the rear assembly from being lifted away from the coin vault assembly. As a result, the combination of the second locking component 1995 and bolt heads positioned above reduced-sized openings prevents withdrawal or removal of the rear assembly from the coin vault assembly and ensures the two assemblies are secured together. The second locking component or rotational lock 1995 comprises a locking arm 1996 pivotally connected to the bottom plate 1924. The locking arm 1996 includes two protrusions 1998, although other numbers of protrusions are possible, that when the locking arm is in a lowered locked position, protrude through openings in the bottom plate and are received in corresponding apertures in the coin vault assembly to prevent rotation. When in an unlocked position, the protrusions 1998 do not extend into the apertures of the coin vault assembly, and the rear assembly can be rotated such that the securing bolt heads of the coin vault assembly may be positioned within the expanded portions of the bottom plate openings. As such, the securing bolt heads can be lifted or withdrawn through the openings. Alternatively, the rear assembly may be secured to the coin vault housing using other fastening techniques such as screws or bolts, wherein the bottom plate is not rotatable in the manner as described above.

Figure 32:
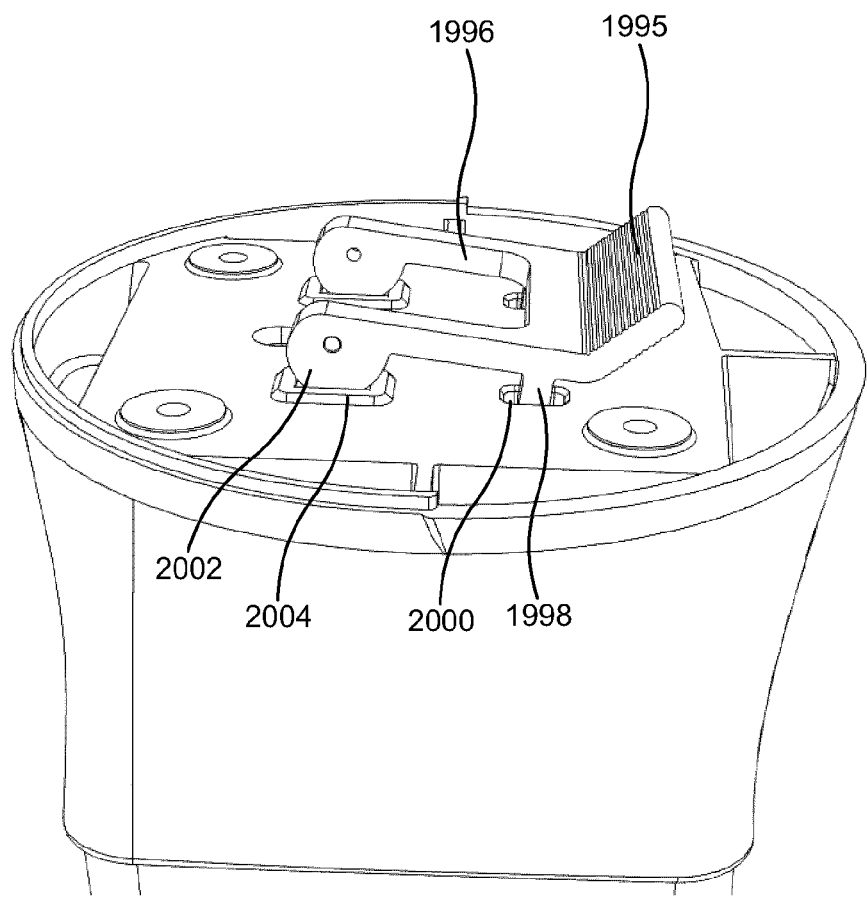
FIG. 32 depicts a side perspective view of the saddle plate, base plate and locking assembly.

FIG. 32 depicts a side perspective view of a portion of the coin vault assembly and a portion of the rotational lock 1995. The bottom plate is removed from FIG. 32 to more clearly illustrate the interaction between the protrusions 1998 of the locking arm 1996 and apertures 2000 in the coin vault assembly. As depicted, the apertures are sized so as to prevent any substantial rotation of the locking arm 1996, and so the rear assembly to which the locking arm 1996 is secured. In addition to the protrusions 2000, the locking arm may include cam surfaces 2002 that bear against a mating surface 2004 of the coin vault assembly when in the locked position. The cam surfaces 2002 may provide an upward force to the rear assembly, which may provide a securing force against minor movement of the components.

Figure 33:
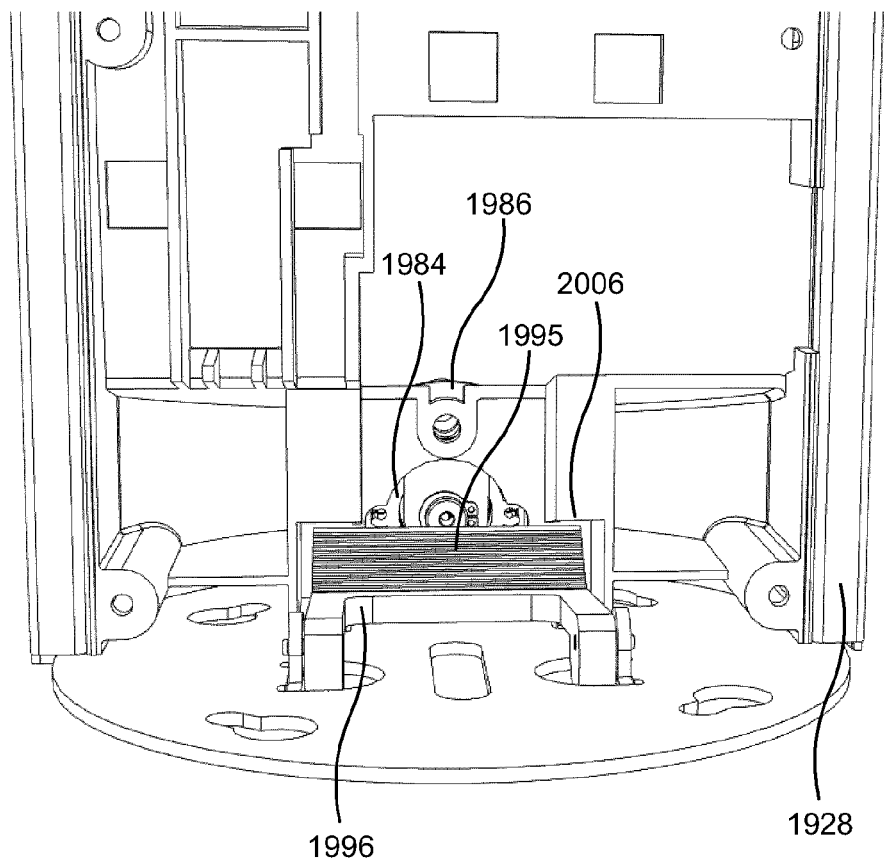
FIG. 33 depicts a rear perspective view of the internal structure and locking assembly.

FIG. 33 depicts a rear perspective view of the internal structure 1928 and locking mechanisms 1984 and 1995. As will be appreciated from FIGS. 30 and 31, in order to secure the front assembly 1926 to the rear assembly 1920, the front assembly must be fully lowered so that the hook bar 1986 can engage with the locking rod 1956. In order to ensure that the rear assembly 1920 is secured to the coin vault assembly before locking the front assembly 1926 to the rear assembly 1920, the front assembly includes a housing section or structure 2006 that will prevent the front assembly from fully lowering unless the locking arm 1996 is in the fully lowered and locked position. The locking arm can only be in the fully lowered and locked position when the protrusions 1998 extend into the corresponding apertures. Accordingly, if the rear assembly has not been twisted to secure it onto the coin vault assembly, the locking arm cannot be fully lowered, and the front assembly will be prevented from being fully lowered into the lockable position. Accordingly, the two stage locking components interact to ensure that each lock is properly secured.

Figure 34:
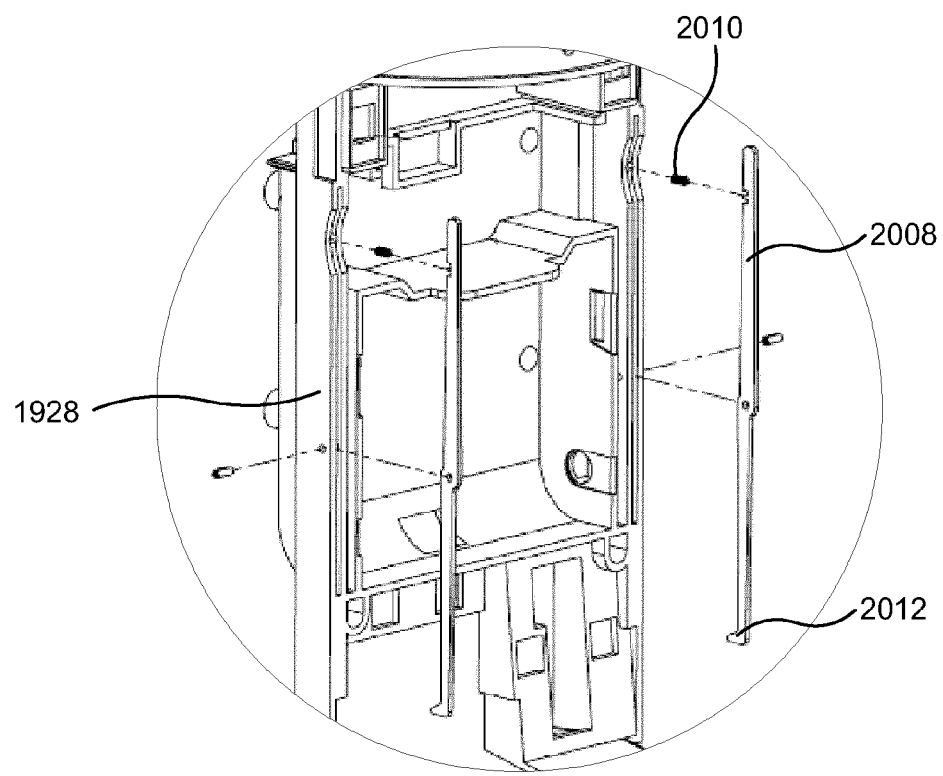
FIG. 34 depicts details of service locks.

FIG. 34 depicts details of service locks. As described above with reference to FIG. 31, the rails 1990, 1992 upon which the front assembly slides up and down may include indents or notches 1994. Service locking bars 2008 may be pivotally connected to the internal structure 1928. The locking bars 2008 may include a biasing spring 2010 at one end of the locking bars 2008 to bias the locking bars 2008 into a locked position. The locked position forces the lower end of the locking bars which includes a foot protrusion 2012 into the rail's notch as it slides past. The notch 1994 and foot protrusions 2012 may have an angled surface to allow the foot protrusion to be forced out of the notch 1994 when sliding the front assembly upwards. However, a bottom of the foot protrusions 2012 and notches may be relatively flat so that upon sliding the front assembly down the rails, the foot protrusions may engage with the notches 1994 to prevent further sliding down of the front assembly. The locking bars 2008 may be manually disengaged from the notches 1994 by pressing the spring biased portion inwards to release the foot protrusions 2012 from the notches. In addition, and as discussed in greater detail above, the front assembly may be raised to a first position such that rail guides at the top of the front assembly may be released from the rails of the rear assembly at this first position, while the bottom of the front assembly remains engaged with the rear assembly. Under this configuration, there would also be a hinge, such as a telescoping or folded metal rod, located at a release point, thus allowing movement or rotation of the front assembly so that even more convenient access to the internal components for servicing or removal is made possible.

As described above, the parking meter may include a radio frequency (RF) antenna for transmitting and/or receiving RF signals. In some embodiments, there may be a plurality of RF antennas or RF transmitters in, on or at the parking meter. In this regard, such RF transmitters may comprise one or more of a near-field communication (NFC) reader, a Bluetooth radio, a ZigBee® radio, a WiFi® radio, and a cellular radio.

With respect to the WiFi radio, it may use a private communication channel, or any public or otherwise available hotspot for carrying out communications. For example, an owner or operator of one or more parking meters may engage or contract with an Internet service provider (ISP) to provide for Internet access over WiFi for the parking meter(s). In one example, the arrangement with the ISP may involve the use of additional or secondary channels, such as secondary ISDN channels that may be referred to as "service flow" channels, associated with one or more WiFi routers located within wireless communication range of the parking meter(s). Typically, the WiFi routers in this example are located at an ISP's customer premises, and are such that they have the ability to concurrently route or support one or two additional or secondary non-overlapping and non-interfering ISDN service flow channel(s). The service flow channel(s) is in addition to the primary ISDN channel used by the customer, and all channels use the same wire or other physical connection to the ISP's network equipment located outside the customer premises. The result is that the router acts as a secured WiFi hotspot for one or both of the two additional channels, and, in parallel, routes any associated data or traffic separately and independently from the data and traffic of the primary ISP customer. Use of one or more of the additional service flow channels by a parking meter system operator establishes a connection between a parking meter and the Internet so that regular two-way flow of data between the meter and a backend meter management system is possible.

The foregoing describes one example of how a WiFi radio and communication system may be used; other approaches would be understood to be possible. Use of WiFi as described or otherwise for parking meter communications may be advantageous, as purchasing or inclusion of additional hardware by parking meter vendors, installers or operators may be unnecessary. This is in contrast to cellular communications and other alternative ISM band solutions such as ZigBee where additional hardware may be required. In this regard, and by way of example, a transceiver or repeater with antenna may need to be located relatively close to a parking meter, and may need to be mounted to a pole, building or other structure, which may further complicate installation and/or implementation of a parking meter system. In addition, use of WiFi as described or otherwise may be advantageous in that regulatory requirements (e.g., FCC requirements) may be less restrictive or onerous, the WiFi radios may be less expensive than other radios, and the data transmission costs associated with cellular communications may be reduced or eliminated as a result of a greater amount of data being transmitted over WiFi as opposed to cellular. Further, with respect to the example approach described above, reliability of transmissions may be improved because of the use of a managed, secured and/or restricted Internet access point (as compared to a public WiFi hotspot, which may be less reliable and/or provide poor performance due to heavy use or data loading).

In addition, the parking meter may include a low power and short range RF radio that is a Bluetooth® type radio, although other types of RF radios are possible, including, for example, WiFi, ZigBee, etc., as described above. More specifically, the low power and short range RF radio may be a Bluetooth low energy (also known as Bluetooth LE, BLE or Bluetooth Smart) radio, which provides lower power consumption than traditional Bluetooth but maintains a similar communication range. The RF radio may be mounted within the interior of the housing and may be constantly supplied with power, or supplied with power while there is sufficient power to power the RF radio. The housing, which may be made either significantly or substantially of polycarbonate copolymer resin, will not significantly attenuate RF signals from the RF radio. Accordingly, the housing may provide flexibility in the placement and mounting of the RF radio within the meter interior. The RF radio may have an electrical connection, or interface, to the meter controller board allowing the constantly powered RF radio to notify or interrupt the controller board, even if the meter is in a low powered or sleep state, as well as send and receive data and/or commands to and from the controller. By having the RF radio continuously powered, there is no need for a user having a mobile device to initially interact with the meter such as by pressing a user button, inserting a card, etc. in order to ensure the parking meter is in a wake, or operation, mode. Rather, the user, or more particularly the user's mobile device communicating with the RF radio, may place the meter in the wake or operation mode.

The primary power source for the Bluetooth low energy radio may comprise one or more battery packs located inside the parking meter. A supplementary source of power for the Bluetooth low energy radio, and/or for other devices, components or circuits within the parking meter, may comprise an alternative energy harvesting mechanism or device. For example, the parking meter may include an alternative energy harvesting mechanism or device that harvests energy from ambient RF signals, variations or differentials in nearby materials temperatures, and/or street vibrations. Energy harvested in this regard may be used to at least partially power the Bluetooth low energy radio and/or other devices, components or circuits within the parking meter. Such supplemental power source may allow a device such as a Bluetooth low energy radio to be more autonomous from and self-sufficient relative to the primary parking meter power sources and circuits, including the one or more battery packs of the parking meter.

The RF radio device may be used to facilitate purchases of park time from mobile devices or vehicles which have paired, or otherwise associated, with it. An associated mobile app may be used by the owner of the mobile device or vehicle to request and make the park time purchase. An identifier or name of the RF radio device in a particular meter being paired with, or otherwise associated with, the mobile device or vehicle may be associated with the meter's location or an ID label found on the exterior of the meter housing. Such a visible identifier or name allows the mobile device or vehicle owner to visually check to ensure they are pairing with, or otherwise associating with, the desired meter from or within a group of nearby meters that may also be outfitted with RF radio devices and possibly be within reception range of the mobile device or vehicle. The application on the mobile device may also provide the ability to scan or read barcodes, 2-D 'QR' codes, or RFID tags attached to the exterior of the meter, which can provide additional information about the meter including the meter location identifier or ID. Scanning a bar code, QR code or RFID tag may reduce the amount of user keyboard entry, thus speeding up the park time request process. The owner of the mobile device or vehicle may have previously registered the mobile app and associated it with a payment means such as a credit or debit card or other financial payment means such as PayPal, Applepay, GoogleWallet or Android Pay.

Once the mobile app or vehicle has paired with, or otherwise associated with, the selected RF radio device in a given meter, the current meter parking rate information is made available to the app, and the user completes their request for park time and confirms payment. Once payment is confirmed by the mobile app or vehicle, payment information, such as payment amount, park time, expiry time and/or authorization details may be provided from the app or vehicle to the meter via the RF radio device. The meter may then show paid status as well as the amount of park time purchased and/or remaining.

The low power RF radio may also be used by parking authority meter repair staff (e.g., city or municipality staff) to interact with the meter using an app on their mobile devices, without the use of any other special service cards, pressing any buttons, or physically opening up the meter housing. The app may allow for meter diagnostics, meter data collection, meter configuration, as well as repair staff time management. This alternative meter communication channel is particularly helpful to parking authority meter repair staff if the meter's cellular radio is not functional or the meter is located in an area with particularly poor cellular coverage.

Although various individual features and/or functionality may have been described with reference to a specific embodiment, such features and/or functionality may be incorporated into other embodiments.

Parking meters for retrofitting to existing coin vault housings have been described by way of examples. It will be appreciated that components of one example may be incorporated into another example. For example, the use of polycarbonate co-polymer resin covers may be included in any of the examples described. Further, features such as quick-connections of individual components may be incorporated into parking meters of different structures. Similarly, other features such as the locking mechanism may be incorporated into parking meters that do not incorporate all of the other features of parking meter embodiments described above. Likewise, the service locks for securing a parking meter mechanism into a service position may be applied to other parking meter designs that do not incorporate all of the other features of parking meter embodiments described above. Although specific embodiments of a retrofit parking meter are described, it will be appreciated that other parking meter designs, including other parking meter components or configurations of parking meter components, may be implemented. Variations and modifications not described herein will be apparent to one of ordinary skill in the art having regard to the description herein.

What is claimed is:

1. A single space parking meter assembly for retrofitting onto an existing coin vault assembly, the coin vault assembly comprising a coin vault housing, the parking meter assembly comprising:
    at least one battery for supplying power for the parking meter assembly;
    a display;
    at least one payment means for accepting payment for parking time selected from the group comprising a coin chute, a card slot and a contactless payment reader;
    a radio transceiver; and
    a protective outer covering that at least partially houses the at least one battery, the display, the at least one payment means, and the radio transceiver, wherein the protective outer covering is rotatably or slidably engageable along a first axis with one or more structures secured to the coin vault assembly when a bottom surface of the protective outer covering is positioned against or adjacent to an upper surface of the coin vault assembly, the one or more structures secured to the coin vault assembly preventing separation between the protective outer covering and the coin vault assembly along a second axis different from the first axis when engaged with the protective outer covering; and
    a locking mechanism at least partially housed within the protective outer housing,
    the locking mechanism comprising:
        at least one opening, cutout or recess within which at least one of the one or more structures can be received;
        at least one bar, rod, rail, plate, or tube member moveable between:
            an unlocked position in which the protective outer covering is free to rotate or slide along the first axis to disengage the at least one opening, cutout or recess at least partially housed within the protective outer covering from the one or more structures secured to the coin vault assembly; and
            a locked position in which the at least one bar, rod, rail, plate, or tube member prevents relative movement between the at least one opening, cutout or recess at least partially housed within the protective outer covering and the one or more structures secured to the coin vault assembly to prevent further rotation or sliding of the protective outer housing along the first axis, thereby securing the protective outer covering to the coin vault assembly when the protective outer covering is engaged with the coin vault assembly.

2. The single space parking meter assembly of claim 1, wherein the existing coin vault assembly is fitted with a saddle plate adapted to be received over a portion of the coin vault housing, wherein the saddle plate is rigidly and fixedly attached to the coin vault housing, and the protective outer covering is rotatably or slidably engageable with the one or more structures secured to the coin vault assembly when a bottom surface of the protective outer covering is positioned against or adjacent to an upper surface of the saddle plate.

3. The single space parking meter assembly of claim 1, wherein the protective outer covering comprises a front cover, a rear cover and a bottom plate.

4. The single space parking meter assembly of claim 1, wherein the protective outer covering comprises a front cover, a rear cover and a bottom plate, wherein the front cover and rear cover are slidably engageable with one another.

5. The single space parking meter assembly of claim 4, wherein the locking mechanism when engaged in the locked position prevents rotation or sliding of the bottom plate, and prevents sliding of the front cover relative to the rear cover.

6. The single space parking meter assembly of claim 1, further comprising a solar panel assembly that is removably engageable with the parking meter assembly, wherein the solar panel assembly comprises a solar panel.

7. The single space parking meter assembly of claim 6, wherein the solar panel is rotatably adjustable.

8. The single space parking meter of claim 6, wherein the solar panel can be vertically angled or sloped to two or more different positions.

9. The single space parking meter of claim 1, wherein the protective outer covering is formed from injection molded plastic.

10. The single space parking meter of claim 1, wherein the protective outer covering is formed from injection molded polycarbonate co-polymer resins.

11. The single space parking meter assembly of claim 1, wherein the locking mechanism further comprises a cylindrical lock accessible from the exterior of the protective outer covering, wherein rotation of the cylindrical lock moves the at least one bar, rod, rail, plate, or tube member between the unlocked and locked positions.

* * * * *